(12) United States Patent
Munetomo et al.

(10) Patent No.: US 9,759,333 B2
(45) Date of Patent: Sep. 12, 2017

(54) GATE VALVE BONNET REMOVAL METHOD, VALVE REMOVAL METHOD, ATTACHMENT FOR REMOVING BONNET, AND GATE VALVE

(71) Applicants: OKAYAMA CITY, Okayama (JP); TAISEI KIKO CO., LTD., Osaka (JP)

(72) Inventors: Nobuo Munetomo, Okayama (JP); Mitsunobu Yano, Okayama (JP); Shinobu Yasui, Okayama (JP); Mitsuhiro Mori, Osaka (JP)

(73) Assignees: Okayama City, Okayama (JP); Taisei Kiko Co., Ltd., Osaka (JP)

( * ) Notice: Subject to any disclaimer, the term of this patent is extended or adjusted under 35 U.S.C. 154(b) by 0 days.

(21) Appl. No.: 15/027,348

(22) PCT Filed: Jan. 31, 2014

(86) PCT No.: PCT/JP2014/052311
§ 371 (c)(1),
(2) Date: Apr. 5, 2016

(87) PCT Pub. No.: WO2015/059939
PCT Pub. Date: Apr. 30, 2015

(65) Prior Publication Data
US 2016/0230897 A1    Aug. 11, 2016

(30) Foreign Application Priority Data

Oct. 21, 2013   (JP) ................................ 2013-218635

(51) Int. Cl.
*F16K 3/02* (2006.01)
*F16K 43/00* (2006.01)
*F16K 27/04* (2006.01)

(52) U.S. Cl.
CPC .......... *F16K 3/0272* (2013.01); *F16K 27/044* (2013.01); *F16K 43/00* (2013.01)

(58) Field of Classification Search
USPC ........................................... 137/15.23, 454.6
See application file for complete search history.

(56) References Cited

U.S. PATENT DOCUMENTS 3,170,226 A    2/1965   Larry
3,198,484 A    8/1965   Martindale
(Continued)

FOREIGN PATENT DOCUMENTS

BE    845 306 A2    12/1976
DE    691 02 084 T2    9/1994
(Continued)

OTHER PUBLICATIONS

Office Action in JP2012-170465.
(Continued)

*Primary Examiner* — John Fox
(74) *Attorney, Agent, or Firm* — Dilworth & Barrese, LLP

(57) ABSTRACT

A bonnet is pressed and fixed to a valve body using a pressing means of an attachment fixed to the valve body, and also a coupling means is released from coupling, and a work housing is attached to the attachment, the pressing means is released from pressing and fixing, the bonnet is taken out to an inside of a storage space of the work housing and is removed, and thereafter a short pipe that has an inner plug is attached to the valve body, the short pipe is pressed and fixed to the valve body using the pressing means of the attachment, the work housing is removed from the attachment, the short pipe and the valve body are coupled and fixed to each other in a sealed state using a second coupling means, and the attachment is removed from the valve body.

20 Claims, 44 Drawing Sheets

(56) References Cited

U.S. PATENT DOCUMENTS

| | | | |
|---|---|---|---|
| 3,658,087 A | 4/1972 | Nelson | |
| 3,993,285 A | 11/1976 | Conley | |
| 4,223,868 A | 9/1980 | Humes et al. | |
| 4,389,037 A | 6/1983 | Anders | |
| 6,776,184 B1 | 8/2004 | Maichel et al. | |
| 7,225,827 B2 * | 6/2007 | Maichel | F16K 3/0272 |
| | | | 137/318 |
| 8,281,863 B2 * | 10/2012 | Voss | F16K 3/0254 |
| | | | 166/332.4 |
| 9,004,090 B2 * | 4/2015 | Asai | E03B 7/006 |
| | | | 137/15.09 |
| 9,310,235 B2 * | 4/2016 | Pila Gonzalez | F16K 3/0272 |

FOREIGN PATENT DOCUMENTS

| | | |
|---|---|---|
| JP | 58-44589 U | 3/1983 |
| JP | 1993-64578 U | 8/1993 |
| JP | 05-280685 A | 10/1993 |
| JP | 08-305 U | 2/1996 |
| JP | 11-201298 A | 7/1999 |
| JP | 2007-177945 A | 7/2007 |
| JP | 2012-172731 A | 9/2012 |
| JP | 2013-92220 A | 5/2013 |

OTHER PUBLICATIONS

English Translation of International Preliminary Report on Patentability mailed May 6, 2016 (Forms PCT/IB/338, PCT/IB/373 & PCT/ISA/237).

* cited by examiner

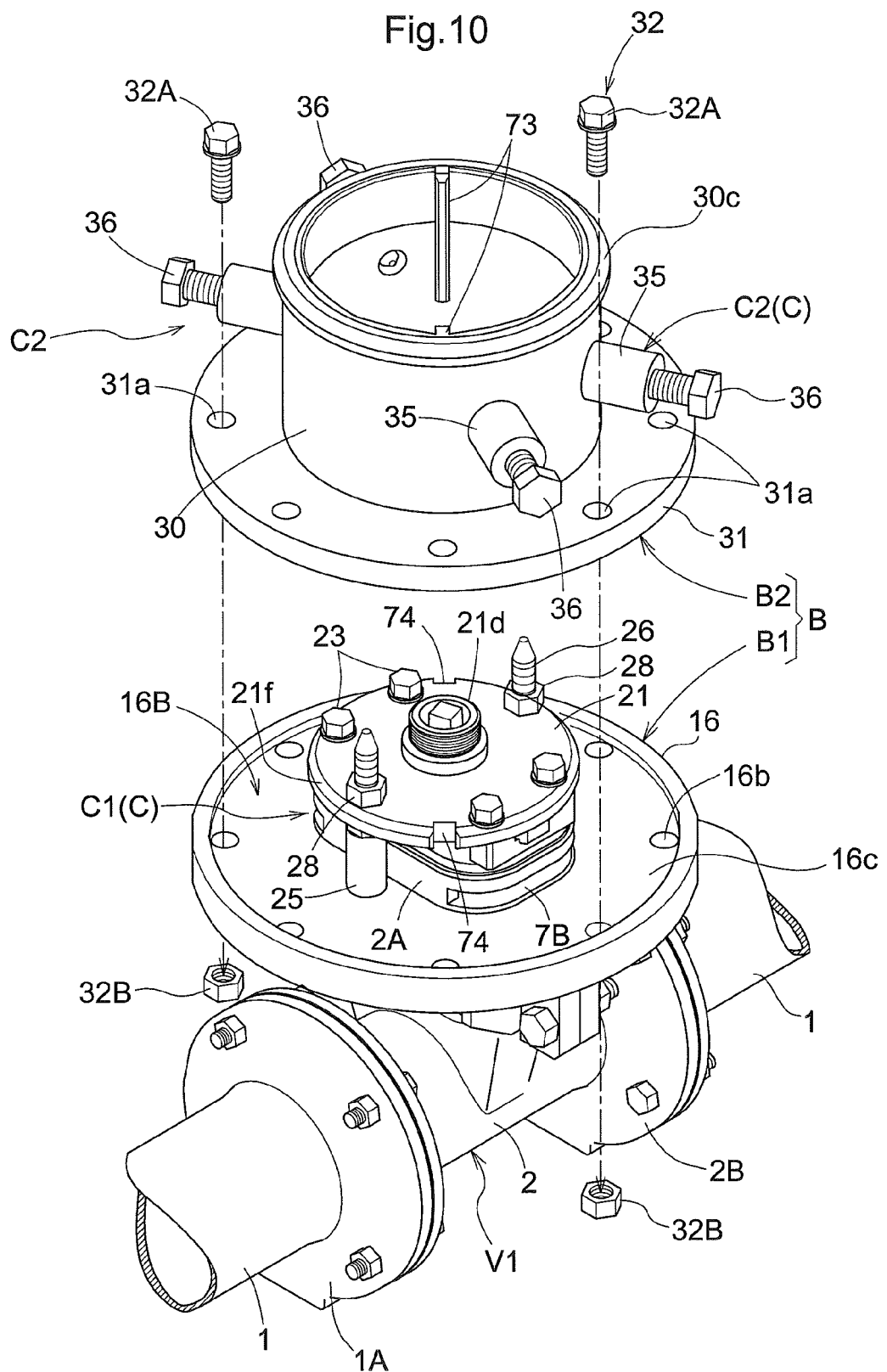

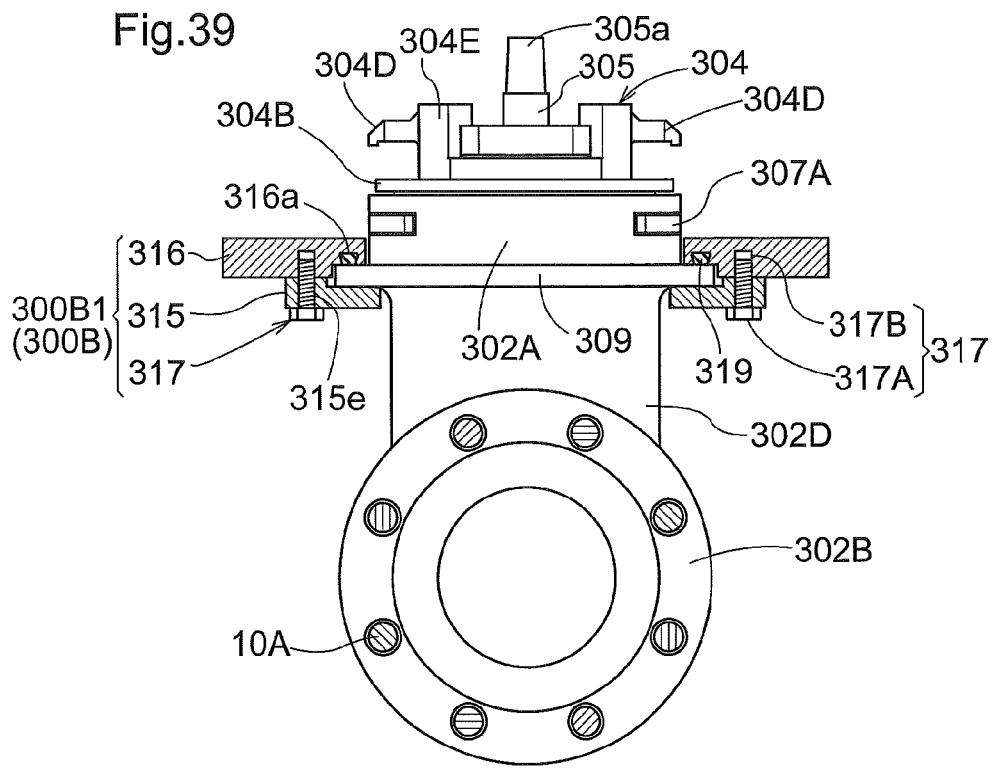
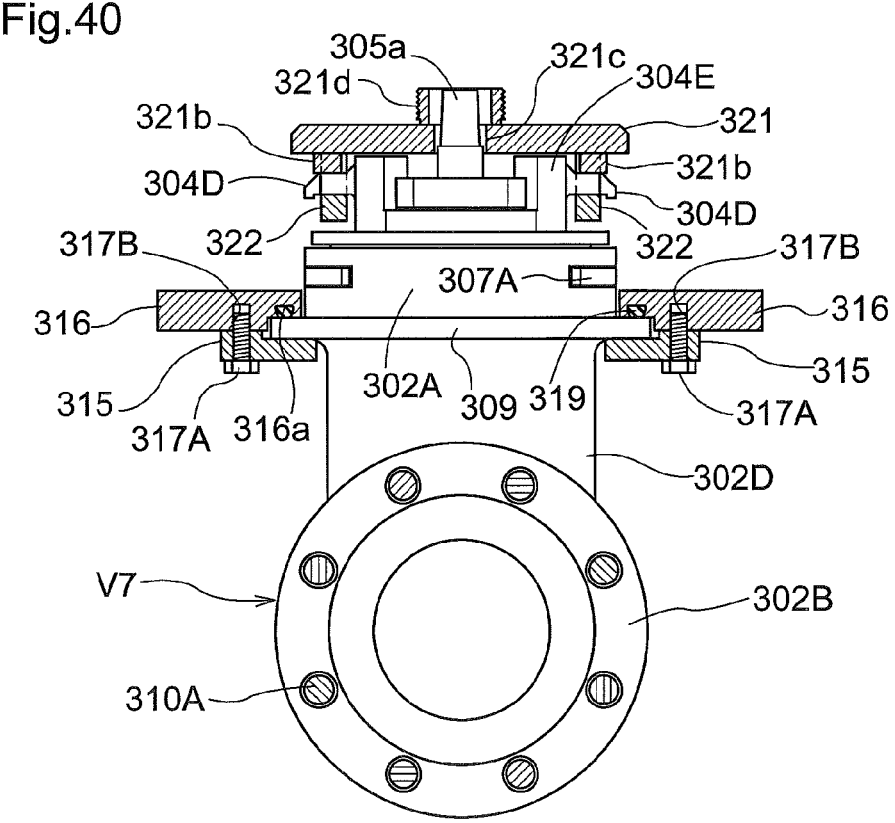

GATE VALVE BONNET REMOVAL METHOD, VALVE REMOVAL METHOD, ATTACHMENT FOR REMOVING BONNET, AND GATE VALVE

TECHNICAL FIELD

The present invention relates to: a gate valve bonnet removal method for removing a bonnet provided with a disc and a stem from a valve body of a gate valve connected to a fluid piping system without stopping the flow of water when the disc, which has a shorter lifespan than the valve body, reaches the end of the rated useful life thereof or when an operation failure of the disc occurs, for example; a valve removal method; a bonnet removal attachment used for bonnet removal; and technology for improving the gate valve used in the bonnet removal method.

BACKGROUND ART

Typically, a gate valve in which a flange that is continuously formed on the periphery of an opening of a disc attaching port of the valve body (or is formed on the disc attaching port of the valve body) and a flange that is formed on the bonnet are fastened to each other in a watertight state using bolts and nuts is used as a gate valve to be connected to a fluid piping system.

A bonnet removal method including:

the step of attaching a lower housing of a dividable structure to upstream and downstream fluid pipes that are connected to and in communication with a valve body of the gate valve, such that a watertight state is achieved, the dividable structure surrounding approximately the entirety of the gate valve so as to include part of the two fluid pipes;

the step of externally clamp-fixing the flange of the valve body and the flange of the bonnet using a flange clamping device that is provided for the lower housing, thereby maintaining the two flanges in a watertight state;

the step of removing bolts and nuts that fasten the flange of the valve body and the flange of the bonnet to each other;

the step of coupling, to an upper end portion of a stem of the gate valve, a lower end portion of a lower divisional elevation shaft portion out of a plurality of divisional elevation shaft portions that constitute an elevation shaft of an elevation transport device that is to be installed to the upper housing;

the step of coupling and fixing a lower flange of a work open/close valve to a flange of an upper opening portion of the lower housing using bolts and nuts such that a watertight state is achieved;

the step of coupling the upper divisional elevation shaft portion of the elevation transport device installed to the upper housing, to the lower divisional elevation shaft portion coupled to the stem of the gate valve, and coupling and fixing the lower flange of the upper housing to the upper flange of the work open/close valve using bolts and nuts such that a watertight state is achieved;

the step of releasing the clamp fixing of the flange of the valve body and the flange of the bonnet performed by the flange clamping device, thereafter performing an operation to move up the elevation shaft of the elevation transport device, taking out the bonnet provided with the disc and the stem to the inside of a storage space of the upper housing, and performing an operation to close the work open/close valve; and the step of removing the bonnet taken out to the inside of the storage space of the upper housing is proposed as a conventional bonnet removal method in which such a typical gate valve is used (see Patent Document 1, for example).

CITATION LIST

Patent Literature

Patent Document 1: JP 2007-177945A

SUMMERY OF INVENTION

Technical Problem

According to the conventional gate valve bonnet removal method, there is a need for a lower housing of a large dividable structure that is for surrounding approximately the entirety of the gate valve so as to include part of the two fluid pipes, and accordingly the volume of a work pit required to be drilled is large, and there is a problem in which work becomes extensive and the cost of work increases.

Also, the invention disclosed in the aforementioned Patent Document 1 is a method for replacing the bonnet with a bonnet provided with a new disc and a new stem, and there also is work for attaching a bonnet to merely seal the disc attaching port of the valve body, and then removing the bonnet and installing a repair valve at a later date.

In the case of performing the repair valve installation work, a lower housing of a large dividable structure for surrounding the entirety of the valve body and the bonnet so as to include part of the fluid pipes is required. Also, regarding the work open/close valve that is to be attached to the lower housing and the upper housing, a large inner space that allows the repair valve with a handle to be moved down is required, and there is a problem in which the repair valve installation work becomes extensive and the cost of work increases.

Furthermore, the flange of the valve body and the flange of the bonnet are fastened to each other using a large number of bolts and nuts, and also, it is necessary to perform removal work on the large number of bolts and nuts within a limited space in the lower housing. Therefore, there is a problem in which it is troublesome to release the coupling between the flange of the valve body and the flange of the bonnet.

The present invention was made in light of the above-described situation, and a first main objective thereof is to provide: a gate valve bonnet removal method that makes it possible to reduce the cost of the work for removing a bonnet provided with a disc and a stem without stopping the flow of fluid, and to also efficiently and easily perform the work to install a repair valve or the like at a later date; a valve removal method; and a bonnet removal attachment that is useful for the bonnet removal method. A second main objective thereof is to provide: a gate valve bonnet removal method that makes it possible to efficiently and easily perform the work to remove a bonnet provided with a disc and a stem without stopping the flow of water while reducing the cost of the work; and a gate valve that contributes to the efficiency and the easiness of the removal work.

Solution to Problem

A first characteristic configuration according to the present invention is a gate valve bonnet removal method for removing a bonnet provided with a disc and a stem from a valve body of a gate valve while maintaining a flow of fluid in a fluid piping system, the gate valve being provided with: the valve body that is connected to the fluid piping system; the bonnet that is detachably coupled and fixed to the valve body by a coupling means; and the disc that is detachably attached to the gate valve from a disc attaching port of the valve body via the stem that is provided to penetrate the bonnet, the gate valve bonnet removal method including:

a step of detachably fixing an attachment to the valve body, the attachment surrounding an outer peripheral side of the bonnet;

a step of pressing and fixing the bonnet to the valve body in a sealed state by using a pressing means provided for the attachment;

a step of releasing the coupling means from coupling, in a state where the bonnet is being pressed and fixed by the pressing means;

a step of attaching a work housing to the attachment and sealing a work target part of the gate valve, the work housing being provided with a work open/close valve and an elevation transport means that is to be connected to the bonnet;

a step of releasing the pressing and fixing by the pressing means, taking out the bonnet provided with the disc and the stem to an inside of a storage space of the work housing by using the elevation transport means, and thereafter performing an operation to close the work open/close valve and removing the bonnet thus taken out;

a step of attaching a short pipe to the elevation transport means of the work housing, the short pipe having a flow channel that is in communication with the disc attaching port of the valve body and to which an inner plug has been detachably attached;

a step of performing an operation to open the work open/close valve, attaching the short pipe to the valve body by using the elevation transport means, and pressing and fixing the short pipe to the valve body in a sealed state by using the pressing means provided for the attachment; and a step of removing the work housing provided with the work open/close valve and the elevation transport means from the attachment, coupling and fixing the short pipe and the valve body, which have been pressed and fixed to each other by the pressing means, to each other by using a second coupling means, and thereafter removing the attachment provided with the pressing means from the valve body.

According to the configuration above, when it becomes necessary to remove the bonnet provided with the disc and the stem from the valve body of the gate valve connected to the fluid piping system without stopping the flow of fluid, for example when the disc, which has a shorter lifespan than the valve body, reaches the end of the rated useful life thereof or when an operation failure of the disc occurs, first, the bonnet is pressed and fixed to the valve body in a sealed state using the pressing means of the attachment fixed to the valve body.

In this state, even if the coupling means that couples and fixes the valve body and the bonnet to each other is released from coupling, the bonnet does not jump out due to fluid pressure.

Next, the work housing provided with the work open/close valve and the elevation transport means is attached to the attachment so as to seal the work target part of the gate valve, and thereafter the pressing means is released from pressing and fixing.

In this state, the elevation transport means of the work housing and the bonnet are coupled to each other, and therefore the bonnet does not jump out due to fluid pressure, and it is possible to reliably take out the bonnet provided with the disc and the stem to the inside of the storage space of the work housing, using the elevation transport means. The bonnet thus taken out is removed after the work open/close valve is closed.

Subsequently, the short pipe that is provided with the inner plug and that has been attached to the elevation transport means of the work housing is fed in via the work open/close valve that has been operated to open, and is attached to the valve body, the short pipe is pressed and fixed to the valve body in a sealed state using the pressing means of the attachment, and thereafter the work housing provided with the work open/close valve and the elevation transport means is removed from the attachment.

Even if the work housing is removed, the short pipe is pressed and fixed to the valve body in a sealed state by the pressing means of the attachment, and the flow channel of the short pipe per se is also sealed with the inner plug, and therefore the fluid does not leak.

Also, unlike the repair valve or the like, the short pipe does not have a handle or the like that protrudes outward by a large amount, and therefore a small work housing can be used.

After the work housing is removed, the short pipe and the valve body that are pressed and fixed to each other by the pressing means is coupled and fixed to each other in a sealed state using the second coupling means, and thereafter the attachment provided with the pressing means is removed from the valve body.

In this state, it is merely the case that the flow channel of the short pipe is closed by the inner plug. Therefore, even if it becomes necessary to install a repair valve or the like to the short pipe coupled and fixed to the valve body after the attachment is removed, it is only necessary to remove the inner plug, which has been attached to the short pipe, via the internal flow channel of the repair valve or the like, using the repair valve or the like, which is to be installed, as a work open/close valve. Thus, it is possible to reduce the number of pieces of equipment required for collecting the inner plug, and to downsize the pieces of equipment.

For the reasons above, it is possible to reduce the cost of the work for removing a bonnet provided with a disc and a stem, which is performed without stopping the flow of fluid, and to efficiently and easily perform the work to install a repair valve or the like after the attachment is removed.

A second characteristic configuration according to the present invention lies in that:

a step of coupling and fixing a repair valve to the short pipe or a second short pipe connected to the short pipe, the repair valve being provided with a flow channel through which the inner plug can pass;

a step of coupling and fixing a work case to the repair valve, the work case being able to house the inner plug;

a step of removing the inner plug from the short pipe by using an operation rod connected to the inner plug of the short pipe, and collecting the inner plug thus removed to an inside of the work case via the repair valve that is open; and a step of performing an operation to close the repair valve and removing the work case in which the inner plug has been collected are performed after the step of removing the attachment.

According to the configuration above, if it becomes necessary to install a repair valve to the short pipe coupled and fixed to the valve body after the attachment is removed, first, the repair valve is coupled and fixed to the short pipe or the second short pipe coupled to the short pipe, and the repair valve is used as a work open/close valve for collecting the inner plug.

The work case, in which the inner plug can be housed, is coupled and fixed to the repair valve, and then it is possible to remove the inner plug and promptly collect the inner plug to the inside of the work case via the internal flow channel of the repair valve by operating the operation rod coupled to the inner plug of the short pipe. Therefore, it is only necessary to prepare the work case and the operation rod as the pieces of equipment for collecting the inner plug, and even after the inner plug is collected to the inside of the work case, it is only necessary to perform an operation to close the repair valve, and to remove the work case together with the inner plug.

Therefore, it is possible to efficiently and easily perform the repair valve installation work after the attachment is removed. Furthermore, it is possible to reduce the number of pieces of equipment required for collecting the inner plug, to downsize the pieces of equipment, and to thereby reduce the cost of the repair valve installation work.

A third characteristic configuration according to the present invention lies in that a step of installing an air valve to the repair valve is performed after the step of removing the work case.

According to the configuration above, it is possible to efficiently install the air valve during the repair valve installation work and the series of work steps.

A fourth characteristic configuration according to the present invention lies in that the coupling means is configured with a lock means that has a lock member that can be externally inserted into and removed from a fitting connection part between a coupling outer fitting portion of the valve body and a coupling inner fitting portion of the bonnet, and that, in an engaged state where the lock member is inserted, couples and fixes the coupling outer fitting portion of the valve body and the coupling inner fitting portion of the bonnet to each other in a sealed state, and in the step of releasing the coupling means from coupling, the lock member of the lock means is removed and the coupling and fixing of the coupling outer fitting portion of the valve body and the coupling inner fitting portion of the bonnet is released.

According to the configuration above, the gate valve connected to the fluid piping system is provided with the lock means serving as the coupling means and having the lock member that can be externally inserted into and removed from the coupling outer fitting portion on the valve body's side and the coupling inner fitting portion on the bonnet's side, and that, in an engaged state where the lock member is inserted, couples and fixes the valve body and the bonnet to each other in a watertight state. Therefore, even in the case of releasing the coupling and fixing of the valve body and the bonnet, it is only necessary to perform an operation to pull out the lock member, and it is possible to more efficiently and more easily perform the work to release the fixing and coupling of the bonnet, compared to a gate valve to which a valve body and a bonnet are fastened using a large number of bolts and nuts.

Furthermore, when an operation is to be performed to insert/remove the lock member, the bonnet is pressed against the valve body by the pressing means provided for the attachment, and the coupling inner fitting portion of the bonnet and the coupling outer fitting portion of the valve body are maintained in a watertight state. Therefore, it is possible to stop or prevent the reaction force for maintaining the watertight state from serving as the insertion/removal resistance that acts against the operation using the lock member, and it is possible to easily perform the operation to insert/remove the lock member with a small amount of force.

Therefore, it is possible to more efficiently and more easily perform the work to remove the bonnet provided with the disc and the stem without stopping the flow of fluid.

A fifth characteristic configuration according to the present invention is a valve removal method for, after the air valve is installed to the repair valve using the gate valve bonnet removal method according to the third characteristic configuration, removing the air valve and the repair valve without stopping a flow of fluid, and sealing a flow channel of the short pipe with the inner plug, the valve removal method including:

a step of performing an operation to close the repair valve, and removing the air valve from the repair valve;

a step of coupling and fixing the work case provided with the operation rod to the repair valve from which the air valve has been removed, the operation rod having a tip to which the inner plug has been detachably attached;

a step of performing an operation to open the repair valve, thereafter performing an operation to push in the operation rod, and attaching the inner plug from the work case to the short pipe in a sealed state via the repair valve or via the repair valve and an inside of the second short pipe; and a step of, after attaching the inner plug, removing the repair valve and the work case, or the second short pipe and the repair valve and the work case from the short pipe.

According to the configuration above, if it becomes necessary to remove the air valve and the repair valve from the valve body without stopping the flow of fluid after the air valve is installed to the repair valve using the gate valve bonnet removal method, first, an operation is performed to close the repair valve and remove the air valve, using the repair valve as a work open/close valve for removing the air valve.

The work case, provided with the operation rod, to which the inner plug has been attached, is coupled and fixed to the repair valve from which the air valve has been removed, an operation is performed to open the repair valve, and thereafter, it is possible to attach the inner plug to the short pipe in a sealed state by operating the operation rod. Therefore, it is only necessary to prepare the work case, the operation rod, and the inner plug as the pieces of equipment for removing the air valve and the repair valve.

Therefore, it is also possible to efficiently and easily perform the work to remove the repair valve and the air valve after the work for installing the repair valve and the air valve according to the gate valve bonnet removal method. Furthermore, it is possible to reduce the number of pieces of equipment required for removal, to downsize the pieces of equipment, and to thereby reduce the cost of the valve removal work.

A sixth characteristic configuration according to the present invention is the attachment that is used in the gate valve bonnet removal method according to any one of the characteristic configurations 1 to 4, including: a first attachment configured to be detachably fixed to a locking stepped portion formed on an outer surface of the valve body; and a second attachment configured to be detachably coupled and fixed to the first attachment so as to surround an outer peripheral side of the bonnet, wherein the attachment is provided with the pressing means that presses and fixes a coupling target portion of the bonnet to a coupling portion of the valve body in a sealed state via a pressing member detachably attached to the bonnet.

According to the configuration above, it is possible to fix the first attachment using the locking stepped portion formed on the outer surface of the valve body. Furthermore, it is possible to easily couple and fix the second attachment that surrounds the outer peripheral side of the bonnet via the first attachment thus fixed.

Moreover, the coupling target portion of the bonnet is pressed and fixed to the coupling portion of the valve body in a sealed state via the pressing member detachably attached to the bonnet, using the pressing means of the attachment. Therefore, it is possible to reliably and easily press and fix the bonnet to the valve body via the pressing member attached to the bonnet without being obstructed by constitutional members existing on the upper surface of the bonnet, and it is also possible to simplify the pressing means.

A seventh characteristic configuration according to the present invention lies in that the first attachment is detachably fixed to a protruding portion serving as the locking stepped portion, in a clamping state.

According to the configuration above, it is possible to firmly fix the first attachment in a clamping state, using the protruding portion that is formed as the locking stepped portion so as to protrude on the outer surface of the valve body. Furthermore, it is possible to easily couple and fix the second attachment that surrounds the outer peripheral side of the bonnet via the first attachment thus firmly fixed.

An eighth characteristic configuration according to the present invention lies in that the pressing means is configured with: a first pressing jig that is provided for the first attachment so as to allow an operation to press and fix the pressing member to the first attachment's side; and a second pressing jig that is provided for the second attachment so as to allow an operation to press and fix the pressing member to the first attachment's side from an outside.

According to the configuration above, when the coupling means that couples and fixes the valve body and the bonnet to each other is released from coupling, the pressing member attached to the bonnet is pressed and fixed to the first attachment's side using the first pressing jig provided for the first attachment. Therefore, it is possible to easily perform an operation to release the coupling means from coupling, under fewer spatial restrictions, before the second attachment is fixed to the first attachment.

Furthermore, when the second attachment is fixed to the first attachment and the pressing member attached to the bonnet using the second pressing jig is pressed and fixed to the first attachment's side, it is possible to easily perform an operation to release the pressing and fixing by the first pressing means on the first attachment's side via the upper opening portion of the second attachment.

A ninth characteristic configuration according to the present invention lies in that an engaging portion and an engaged portion are formed on opposing parts of the pressing member or a second pressing member and of an inner circumferential surface of the second attachment, the second pressing member being provided for an attachment jig for attaching the short pipe to the elevation transport means, and the engaging portion and the engaged portion engaging with each other in a vertical direction only when the pressing member or the second pressing member, which is moved up/down by the elevation transport means, is in a set orientation, and moving and guiding the pressing member or the second pressing member along an inside of the second attachment such that the pressing member or the second pressing member is not relatively rotatable.

According to the configuration above, when the bonnet is to be taken out to the inside of the storage space of the work housing using the elevation transport means, the engaging portion and the engaged portion provided on the opposing parts of the pressing member and the inner circumferential surface of the second attachment engage with each other in the vertical direction only when the bonnet and the pressing member moved up by the elevation transport means are in the set orientation, and it is thus possible to reliably and smoothly move and guide the pressing member along the inside of the second attachment such that the pressing member is not relatively rotatable.

In particular, in the case where the short pipe is fed to the valve body's side using the elevation transport means, the engaging portion and the engaged portion provided on the opposing parts of the second pressing member and the inner circumferential surface of the second attachment engage with each other in the vertical direction only when the second pressing member of the attachment jig and the short pipe moved down by the elevation transport means are in the set orientation, and it is thus possible to move and guide the second pressing member to the inside of the second attachment such that the second pressing member is not relatively rotatable. Therefore, it is possible to accurately and smoothly attach the short pipe to the valve body, in a set coupling orientation.

Note that the ninth characteristic configuration above includes the case where the pressing member and the second pressing member are formed to have the same shape and the pressing member is configured to also serve as the second pressing member, and the case where the pressing member and the second pressing member are configured to have different shapes as shown in the embodiments described below.

A tenth characteristic configuration according to the present invention lies in that the first pressing jig is configured with: a plurality of bolts provided for the first attachment; bolt insertion holes formed in a plurality of positions on the pressing member that correspond to the bolts; and nuts that are screwed to the bolts that are inserted into the bolt insertion holes, the bolts are configured to also serve as attaching bolts that fix a second pressing member by pulling the second pressing member toward the first attachment's side, the second pressing member being provided for an attachment jig for attaching the short pipe to the elevation transport means, and tip portions of the bolts are configured as tapered insertion guide portions that are inserted into, and guide, bolt insertion holes that are formed in the second pressing member.

According to the configuration above, it is possible to fix the second pressing member, which is provided for the attachment jig for attaching the short pipe to the elevation transport means, by pulling the second pressing member toward the first attachment's side using the bolts of the first pressing jig, which presses and fixes the pressing member attached to the bonnet by pulling the pressing member toward the first attachment's side, and thus it is possible to fix the short pipe attached to the valve body.

Furthermore, the tip portions of the bolts of the first pressing jig are configured as the tapered insertion guide portions. Therefore, when feeding the short pipe to the valve body's side using the elevation transport means, it is possible to smoothly attach the short pipe to the valve body in a set coupling orientation, due to the engagement of the insertion guide portions of the bolts and the bolt insertion holes of the second pressing member.

An eleventh characteristic configuration according to the present invention is a gate valve bonnet removal method for removing a bonnet provided with a disc and a stem from a valve body of gate valve without stopping a flow of water, the gate valve being provided with: the valve body that is connected to a fluid piping system; the bonnet that is fitted and coupled to the valve body; the disc that is detachably attached to the gate valve from a disc attaching port of the valve body via the stem provided to penetrate the bonnet; and a lock means that has a lock member that can be externally inserted into and removed from a coupling outer fitting portion on the valve body's side and a coupling inner fitting portion on the bonnet's side, which constitute a fitting connection part of the valve body and the bonnet, and that, in an engaged state where the lock member is inserted, couples and fixes the valve body and the bonnet to each other in a watertight state, the gate valve bonnet removal method including:

a step of attaching a ring-shaped attachment base material to the valve body in a watertight state such that an operation to insert/remove the lock member is allowed;

a step of maintaining the coupling inner fitting portion of the bonnet and the coupling outer fitting portion of the valve body in a watertight state by pushing the bonnet to the valve body using a pressing means provided for the attachment base material;

a step of pulling out the lock member of the lock means and releasing the coupling and fixing of the coupling outer fitting portion of the valve body and the coupling inner fitting portion of the bonnet;

a step of attaching a work housing to the attachment base material in a watertight state, the work housing being provided with a work open/close valve and an elevation transport means that is to be coupled to the bonnet;

a step of releasing the pressing and fixing by the pressing means, taking out the bonnet to an inside of a storage space of the work housing by using the elevation transport means, and thereafter performing an operation to close the work open/close valve; and a step of removing the bonnet taken out to the inside of the storage space of the work housing.

According to the configuration above, the gate valve connected to the fluid piping system is provided with the lock means having the lock member that can be externally inserted into and removed from the coupling outer fitting portion of the valve body and the coupling inner fitting portion of the bonnet, and that, in an engaged state where the lock member is inserted, couples and fixes the valve body and the bonnet to each other in a watertight state. Therefore, even in the case of releasing the coupling and fixing of the valve body and the bonnet, it is only necessary to perform an operation to pull out the lock member, and it is possible to more efficiently and more easily perform the work to release the fixing and coupling of the bonnet, compared to the conventional gate valve to which a valve body and a bonnet are fastened using a large number of bolts and nuts.

Furthermore, in the case of removing the bonnet provided with the disc that has reached the end of the rated useful life thereof, the disc that has caused an operation failure, or the like, first, the ring-shaped attachment base material is attached to the valve body in a watertight state such that an operation to insert/remove the lock member is allowed, and the work housing provided with the work open/close valve and the elevation transport means that is to be coupled to the bonnet is attached to the attachment base material in a watertight state. It is thus possible to omit the housing required for surrounding the lower portion side of the gate valve and part of the two fluid pipes, and accordingly also reduce the volume of the work pit that is to be drilled, compared to the conventional method using the lower housing of the dividable structure that surrounds approximately the entirety of the gate valve so as to include part of the two fluid pipes.

Furthermore, even in a state where the ring-shaped attachment base material has been attached to the valve body, it is possible to perform an operation to insert or remove the lock member, and when an operation is to be performed to insert or remove the lock member, the bonnet is pressed against the valve body by the pressing means provided for the attachment base material, and the coupling inner fitting portion of the bonnet and the coupling outer fitting portion of the valve body are maintained in a watertight state. Therefore, it is possible to stop or prevent the reaction force for maintaining the watertight state from serving as the insertion/removal resistance that acts against the operation using the lock member, and it is possible to easily perform the operation to insert/remove the lock member with a small amount of force.

Also, in the case of releasing the pressing and fixing of the bonnet by the pressing means, the elevation transport means on the work housing's side coupled to the bonnet can take on the water pressure acting toward the bonnet's side and support the bonnet. It is thus possible to easily perform an operation to release the pressing means from pressing and fixing, with a small amount of force.

Therefore, it is possible to efficiently and easily perform the work to remove the bonnet provided with the disc and the stem without stopping the flow of water while reducing the cost of the work.

A twelfth characteristic configuration according to the present invention lies in that the pressing means is configured to press the bonnet against the valve body via a pressing member that is detachably attached to the bonnet.

According to the configuration above, it is possible to reliably and easily press and fix the bonnet to the valve body via the pressing member attached to the bonnet, without being obstructed by constitutional members existing on the upper surface of the bonnet, and it is also possible to simplify the pressing means.

A thirteenth characteristic configuration according to the present invention lies in that the attachment base material is fixed to a locking stepped portion that is formed on a part of the valve body that is located lower than an insertion/removal operation position for the lock member.

According to the configuration above, although the load of the work housing provided with the work open/close valve and the elevation transport means, and the load of the bonnet that is to be taken out using the elevation transport means, are applied to the attachment base material fixed to the locking stepped portion of the valve body, the locking stepped portion of the robust valve body can reliably take on these large loads and support the attachment base material.

Furthermore, the locking stepped portion of the valve body is formed on the part that is located lower than the insertion/removal operation position for the lock member, and the attachment base material attached to the locking stepped portion is originally configured to allow an operation to insert/remove the lock member. Therefore, it is possible to easily perform the operation to insert/remove the lock member.

A fourteenth characteristic configuration according to the present invention lies in that the attachment base material clamps and is fixed to a protruding portion that serves as the locking stepped portion that is formed to protrude on a part of the valve body that is located lower than the insertion/removal operation position for the lock member.

According to the configuration above, although the load of the work housing provided with the work open/close valve and the elevation transport means, and the load of the bonnet that is to be taken out using the elevation transport means, are applied to the attachment base material that clamps and is fixed to the protruding portion of the valve body, the protruding portion of the robust valve body can reliably take on these large loads and support the attachment base material.

Furthermore, the protruding portion of the valve body is formed on the part that is located lower than the insertion/removal operation position for the lock member, and the attachment base material that clamps and is fixed to the protruding portion is originally configured to allow an operation to insert/remove the lock member. Therefore, it is possible to easily perform the operation to insert/remove the lock member.

For these reasons, unlike the case where the attachment base material is fastened to the smooth outer surface of the valve body in a clamping state, it is unnecessary to separately provide a load supporting device to support the attachment base material and prevent the attachment base material from sliding down along the outer surface of the valve body. It is thus possible to reduce the cost of work while maintaining the easiness of the operation to insert/remove the lock member, and it is also possible to achieve the easiness and the efficiency of assembly work in the construction site.

A fifteenth characteristic configuration according to the present invention lies in that the attachment base material is configured with: an attachment base portion that is to be attached to a part of the valve body that is located lower than an insertion/removal operation position for the lock member, in a watertight state; and a ring-shaped attachment frame that is to be attached to the attachment base portion in a watertight state and that surrounds at least part of the bonnet, and the step of pushing using the pressing means includes: a step of, before attaching the ring-shaped attachment frame, pressing and fixing the bonnet to the valve body's side using a first pressing jig provided in an area of the attachment base portion that corresponds to an inner space of the ring-shaped attachment frame; and a step of, after attaching the ring-shaped attachment frame, pressing and fixing the bonnet to the valve body's side using a second pressing jig that is provided for the ring-shaped attachment frame and that can be operated from an outside.

According to the configuration above, the attachment base material is configured with the attachment base portion and the ring-shaped attachment frame, and the pressing means is configured with the first pressing jig and the second pressing jig. In a state where only the attachment base portion is attached to the valve body, the attachment base portion is located at the part that is located lower than the insertion/removal operation position for the lock member. Therefore, it is possible to press and fix the bonnet to the valve body's side in the state where an operation to insert/remove the lock member is not obstructed, using the first pressing jig provided for the attachment base portion.

Furthermore, the first pressing jig is located in the area of the attachment base portion that corresponds to the inner space of the ring-shaped attachment frame. Therefore, even in the case of attaching the ring-shaped attachment frame that surrounds at least part of the bonnet to the attachment base portion, it is possible to reliably and easily attach the ring-shaped attachment frame without being obstructed by the first pressing jig.

Moreover, after the ring-shaped attachment frame is attached, the bonnet is pressed and fixed to the valve body's side using the second pressing jig that is provided for the ring-shaped attachment frame and that can be operated from the outside. Therefore, it is possible to easily perform an operation to release the first pressing jig from pressing and fixing, from the upper opening of the ring-shaped attachment frame. Also, in a state where the work housing has been attached to the attachment base material, it is possible to easily perform an operation to release the second pressing jig from pressing and fixing, from the outside of the ring-shaped attachment frame.

A sixteenth characteristic configuration according to the present invention lies in that the method includes:

a step of coupling another bonnet to the elevation transport means provided for the work housing, the other bonnet being provided with at least a new disc;

a step of performing an operation to open the work open/close valve, lowering the other bonnet located within the storage space of the work housing to the valve body's side using the elevation transport means, and fitting and connecting the coupling inner fitting portion of the other bonnet to the coupling outer fitting portion of the valve body; and a step of coupling and fixing the coupling inner fitting portion of the other bonnet and the coupling outer fitting portion of the valve body, which have been fitted and connected to each other, to each other using the lock member of the lock means, which are performed after the step of removing the bonnet.

According to the configuration above, it is possible to efficiently restore the gate valve provided with the disc that has reached the end of the rated useful life thereof, the disc that has caused an operation failure, or the like while reducing the cost of work by fitting and connecting the coupling inner fitting portion of another bonnet to which at least a new disc has been installed to the coupling outer fitting portion of the valve body, and performing an operation to insert the lock member of the lock means and thereby coupling and fixing the coupling inner fitting portion of the other bonnet and the coupling outer fitting portion of the valve body to each other.

Note that after an operation is performed to lower the other bonnet coupled to the elevation transport means of the work housing and the coupling inner fitting portion thereof is fitted and connected to the coupling outer fitting portion of the valve body, the steps according to the above-described eleventh characteristic configuration may be performed in the reverse order, and an operation may be performed to insert the lock member of the lock means, along the coupling inner fitting portion of the other bonnet and the coupling outer fitting portion of the valve body that are fitted and connected to each other. However, if it is possible to press and fix the other bonnet to the valve body in a watertight state using the elevation transport means, and if a work window, a work arm, or the like that is for performing an operation to insert the lock member from the outside of the attachment base material has been installed to the attachment base material, it is possible to couple and fix the coupling inner fitting portion of the other bonnet and the coupling outer fitting portion of the valve body, which have been fitted and connected to each other, to each other using the lock member when the other bonnet is pressed and fixed to the valve body in a watertight state using the elevation transport means, without performing the steps according to the above-described eleventh characteristic configuration in the reverse order.

A seventeenth characteristic configuration according to the present invention lies in that the method includes:

a step of coupling a covering body to the elevation transport means provided for the work housing, the covering body closing the disc attaching port of the valve body in a watertight state;

a step of performing an operation to open the work open/close valve, lowering the covering body located within the storage space of the work housing to the valve body's side using the elevation transport means, and fitting and connecting a coupling inner fitting portion of the covering body to the coupling outer fitting portion of the valve body; and a step of coupling and fixing the coupling inner fitting portion of the covering body and the coupling outer fitting portion of the valve body, which have been fitted and connected to each other, to each other using the lock member of the lock means, which are performed after the step of removing the bonnet.

According to the configuration above, the coupling inner fitting portion of the covering body that closes the disc attaching port of the valve body in a watertight state is fitted and connected to the coupling outer fitting portion of the valve body, and the coupling inner fitting portion of the covering body and the coupling outer fitting portion of the valve body are coupled and fixed to each other by performing an operation to insert the lock member of the lock means. Thus, it is possible to efficiently and reliably close the disc attaching port of the valve body and to continuously use only the valve body having excellent durability as part of the pipe channel.

Note that after an operation is performed to lower the coupling inner fitting portion of the covering body coupled to the elevation transport means of the work housing, and the coupling inner fitting portion is fitted and connected to the coupling outer fitting portion of the valve body, the steps according to the above-described eleventh characteristic configuration may be performed in the reverse order, and an operation may be performed to insert the lock member of the lock means, along the coupling inner fitting portion of the covering body and the coupling outer fitting portion of the valve body that are fitted and connected to each other. However, if it is possible to press and fix the covering body to the valve body in a watertight state using the elevation transport means, and if a work window, a work arm, or the like that is for performing an operation to insert the lock member from the outside of the attachment base material has been installed to the attachment base material, it is possible to couple and fix the coupling inner fitting portion of the covering body and the coupling outer fitting portion of the valve body, which have been fitted and connected to each other, to each other using the lock member when the covering body is pressed and fixed to the valve body in a watertight state using the elevation transport means, without performing the steps according to the above-described eleventh characteristic configuration in the reverse order.

An eighteenth characteristic configuration according to the present invention lies in that the method includes:

a step of coupling a combined part to the elevation transport means provided for the work housing, the combined part including a repair valve and a valve attaching member that is provided with a coupling inner fitting portion that can be fitted and connected to the coupling outer fitting portion of the valve body;

a step of performing an operation to open the work open/close valve, lowering the combined part located within the storage space of the work housing to the valve body's side using the elevation transport means, and fitting and connecting the coupling inner fitting portion of the valve attaching member to the coupling outer fitting portion of the valve body; and a step of coupling and fixing the coupling inner fitting portion of the valve attaching member and the coupling outer fitting portion of the valve body, which have been fitted and connected to each other, to each other using the lock member of the lock means, which are performed after the step of removing the bonnet.

According to the configuration above, the coupling inner fitting portion of the valve attaching member, out of the combined part including the repair valve and the valve attaching member provided with the coupling inner fitting portion, is fitted and connected to the coupling outer fitting portion of the valve body, and the coupling inner fitting portion of the valve attaching member and the coupling outer fitting portion of the valve body are coupled and fixed to each other by performing an operation to insert the lock member of the lock means. Thus, it is possible to efficiently restore the valve body of the gate valve as-is as a repair valve having different functions, while reducing the cost of work.

Note that after an operation is performed to lower the combined part including the repair valve and the valve attaching member, which is coupled to the elevation transport means of the work housing, and the coupling inner fitting portion of the valve attaching member is fitted and connected to the coupling outer fitting portion of the valve body, the steps according to the above-described eleventh characteristic configuration may be performed in the reverse order, and an operation may be performed to insert the lock member of the lock means, along the coupling inner fitting portion of the valve attaching member and the coupling outer fitting portion of the valve body that are fitted and connected to each other. However, if it is possible to press and fix the valve attaching member to the valve body in a watertight state using the elevation transport means, and if a work window, a work arm, or the like that is for performing an operation to insert the lock member from the outside of the attachment base material has been installed to the attachment base material, it is possible to couple and fix the coupling inner fitting portion of the valve attaching member and the coupling outer fitting portion of the valve body, which have been fitted and connected to each other, to each other using the lock member when the valve attaching member is pressed and fixed to the valve body in a watertight state using the elevation transport means, without performing the steps according to the above-described eleventh characteristic configuration in the reverse order.

A nineteenth characteristic configuration according to the present invention is a gate valve including: a valve body that is connected to a fluid piping system; a bonnet that is fitted and coupled to the valve body; and a disc that is detachably attached to the gate valve from a disc attaching port of the valve body via a stem that is provided to penetrate the bonnet, wherein a fitting coupling portion of the valve body and the bonnet is provided with a lock means that has a lock member that can be externally inserted into and removed from a coupling outer fitting portion on the valve body's side and a coupling inner fitting portion on the bonnet's side, which constitute the fitting coupling portion, and that, in an engaged state where the lock member is inserted, couples and fixes the valve body and the bonnet to each other in a watertight state, and a locking stepped portion to which a ring-shaped attachment base material can be attached is formed integrally with a part of the valve body, the part being displaced downward from an insertion/removal operation position for the lock member.

According to the configuration above, the gate valve that is to be connected to the fluid piping system is provided with the lock means having the lock member that can be externally inserted into and removed from the coupling outer fitting portion on the valve body's side and the coupling inner fitting portion on the bonnet's side, and that, in an engaged state where the lock member is inserted, couples and fixes the valve body and the bonnet to each other in a watertight state. Therefore, even in the case of releasing the coupling and fixing of the valve body and the bonnet, it is only necessary to perform an operation to pull out the lock member, and it is possible to more efficiently and more easily perform the work to release the fixing and coupling of the bonnet, compared to the conventional gate valve to which a valve body and a bonnet are fastened using a large number of bolts and nuts.

Furthermore, the locking stepped portion, to which the ring-shaped attachment base material can be attached, is formed integrally with the part of the valve body that is displaced downward from the insertion/removal operation position for the lock member. Therefore, for example, when removing the bonnet provided with the disc and the stem from the valve body without stopping the flow of water, even if the load of the work housing provided with the work open/close valve and the elevation transport means, and the load of the bonnet that is to be taken out using the elevation transport means, are applied to the attachment base material fixed to the locking stepped portion of the valve body, the locking stepped portion of the robust valve body can reliably take on these large loads and support the attachment base material.

Moreover, the locking stepped portion of the valve body is formed on the part that is located lower than the insertion/removal operation position for the lock member. Therefore, despite the attachment base material being fixed to the locking stepped portion, it is possible to easily perform an operation to insert/remove the lock member.

A twentieth characteristic configuration according to the present invention lies in that the locking stepped portion is a protruding portion that is formed integrally with a part of an outer surface of the valve body so as to protrude therefrom, the part being displaced downward from the insertion/removal operation position for the lock member.

According to the configuration above, the protruding portion, to which the ring-shaped attachment base material can be attached, is formed integrally with the part of the valve body that is displaced downward from the insertion/removal operation position for the lock member. Therefore, for example, when removing the bonnet provided with the disc and the stem from the valve body without stopping the flow of water, even if the load of the work housing provided with the work open/close valve and the elevation transport means, and the load of the bonnet that is to be taken out using the elevation transport means, are applied to the attachment base material that clamps and is fixed to the protruding portion of the valve body, the protruding portion of the robust valve body can reliably take on these large loads and support the attachment base material.

Furthermore, the protruding portion of the valve body is formed to protrude from the part that is located lower than the insertion/removal operation position for the lock member. Therefore, despite the attachment base material clamping and being fixed to the protruding portion, it is possible to easily perform an operation to insert/remove the lock member.

For these reasons, unlike the case where the attachment base material is fastened to the smooth outer surface of the valve body in a clamping state, it is unnecessary to separately provide a load supporting device for supporting the attachment base material and preventing the attachment base material from sliding down along the outer surface of the valve body. It is thus possible to reduce the cost of work while maintaining the easiness of the operation to insert/remove the lock member, and it is also possible to achieve the easiness and the efficiency of assembly work in the construction site.

BRIEF DESCRIPTION OF DRAWINGS

FIG. 10 is an exploded perspective view at the time a second attachment is to be attached.

FIG. 39 is a partially cut-out front view at the time the attachment base portion of the attachment base material has been attached.

FIG. 40 is a partially cut-out front view at the time the pressing member has been attached.

DESCRIPTION OF EMBODIMENTS

First Embodiment

Figure 1:
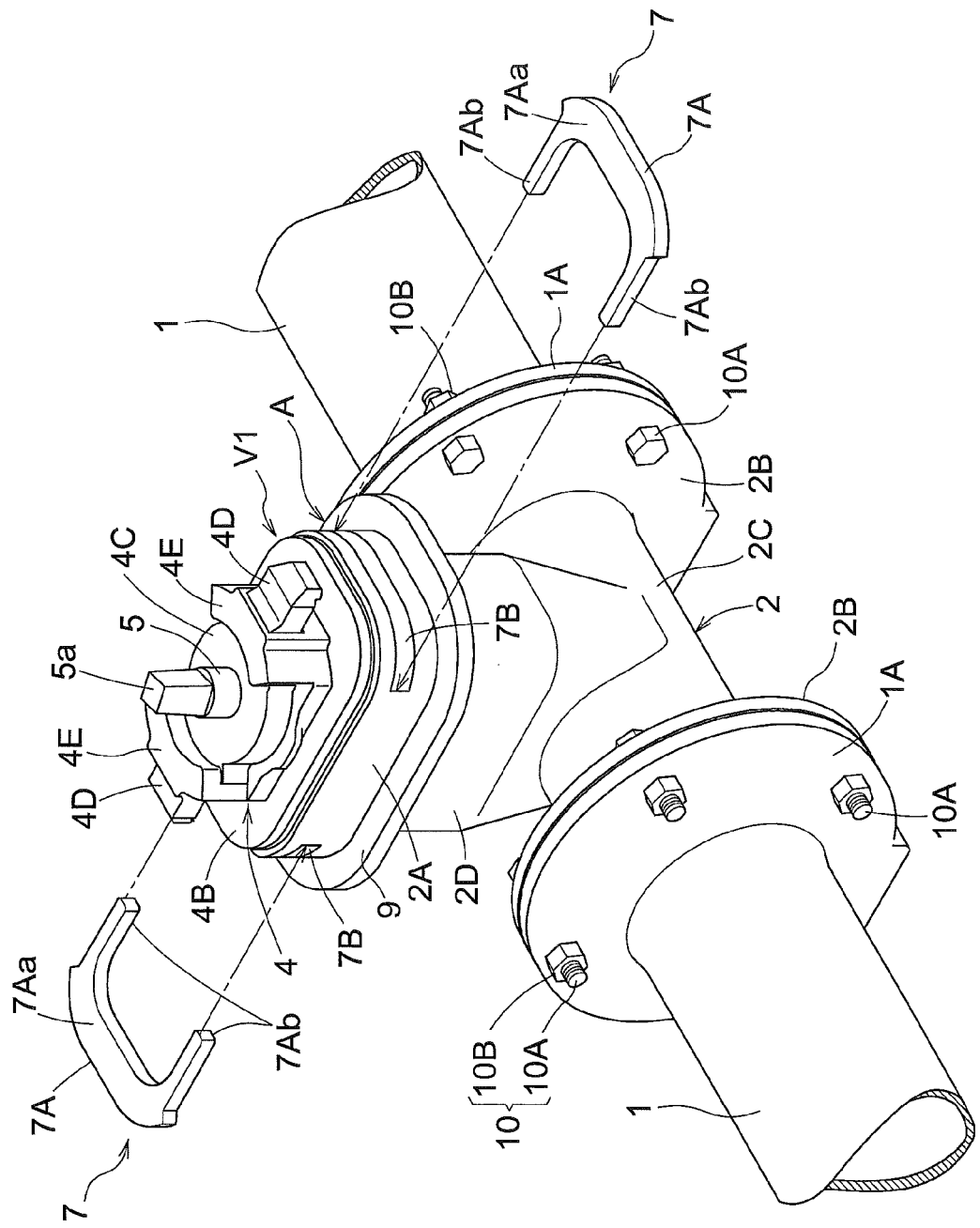
FIG. 1 is a perspective view of a gate valve that is connected to a water piping system showing a first embodiment of the present invention.

FIG. 1 to FIG. 5 show a gate valve V1 that is flange-jointed to a midpoint of a water pipe 1 of a water piping system, which is an example of a fluid pipe that constitutes a fluid piping system.

The gate valve V1 includes: a cast-iron valve body 2 that is to be connected to upstream and downstream water pipes 1 and that is configured to have an approximately inverted T shape in side view; a cast-iron bonnet 4 that is to be fitted and connected from above to a disc attaching port 3 formed to be open in an upper end portion of the valve body 2; a disc 6 to which rubber lining has been applied and that is detachably attached to the gate valve V1 from the disc attaching port 3 of the valve body 2 via a stem 5 provided to penetrate the bonnet 4; and a lock means 7 that is an example of a coupling means for coupling and fixing the valve body 2 and the bonnet 4 to each other so as to be detachable, that includes a pair of lock members 7A that can be externally and laterally inserted into and removed from a coupling outer fitting portion (coupling portion) 2A on the valve body 2 side and a coupling inner fitting portion (coupling target portion) 4A on the bonnet 4 side, which constitute a fitting coupling portion A of the valve body 2 and the bonnet 4, and that, in an engaged state where the lock members 7A are inserted, couples and fixes the valve body 2 and the bonnet 4 to each other such that a watertight state is achieved.

The valve body 2 is configured with: a horizontally-oriented valve body portion 2C that has a circular horizontal cross section and is provided with a pair of coupling flanges 2B that are to be coupled and fixed to a coupling flange 1A of the two water pipes 1 such that a watertight state is achieved using bolts 10A and nuts 10B, which are examples of a first fastening means 10; and a vertically-oriented valve body portion 2D that has an approximately rectangular horizontal cross-sectional shape (the shape of a rectangle with rounded corners) and is formed integrally with the horizontally-oriented valve body portion 2C so as to be orthogonal to a central portion thereof in the direction of the axis of the flow channel.

A sliding guide portion 2e that slides and guides the disc 6 screwed to a screw shaft portion of the stem 5, between a flow channel open position (valve open position) and a flow channel blocking position (valve close position) such that the disc 6 is not rotatable; and a seat that comes into contact with the rubber lining portion of the disc 6 that has been moved to the flow channel blocking position due to the rotational operation of a rotational operation portion 5a that has a square shaft shape and is formed on an upper end portion of the stem 5, are formed on the inner surface of the valve body 2.

Also, the ring-shaped coupling outer fitting portion 2A with which the disc attaching port 3 is formed and that has an approximately rectangular horizontal cross-sectional shape (the shape of a rectangle with rounded corners) is formed with an upper end side peripheral wall portion of the vertically-oriented valve body portion 2D.

The coupling outer fitting portion 2A is configured to have a length that is at least equivalent to a depth for fitting to the coupling inner fitting portion 4A of the bonnet 4 in the disc attachment direction, a diameter that is greater than that of the inner circumferential surface of the vertically-oriented valve body portion 2D, and a plate thickness that is also greater than that of the vertically-oriented valve body portion 2D, and a level difference portion 2b with which a sealing portion is to be configured is formed on a depth-side equivalent part that is on the side of the boundary, with an inner circumferential surface 2d of the vertically-oriented valve body portion 2D, of an inner circumferential surface 2a of the coupling outer fitting portion 2A.

A ring-shaped protruding portion (an example of a locking stepped portion) 9 to which a first attachment B1 of a ring-shaped attachment (a bonnet removal attachment) B, which will be described below, can be attached in a clamping state is formed integrally with a lower end part of the outer circumferential surface of the coupling outer fitting portion 2A, which is displaced downward from an insertion/removal operation position for the lock members 7A, so as to be oriented parallel or approximately parallel to an upper end surface 2g of the coupling outer fitting portion 2A, and the protruding portion 9 is configured to have a plate thickness that is the same or approximately the same as the plate thickness of the coupling outer fitting portion 2A.

The bonnet 4 is provided with: a bonnet main valve body 4B that has a plate shape that is approximately similar to, and that can come into contact with, the upper end surface 2g of the coupling outer fitting portion 2A of the valve body 2; and the coupling inner fitting portion 4A having a cylindrical shape that protrudes from the lower surface of the bonnet main valve body 4B and has fitting dimensions that are slightly smaller than the inner surface dimensions of the coupling outer fitting portion 2A of the valve body 2; and a shaft bearing portion 4C that supports the stem 5 such that the stem 5 penetrates through the shaft bearing portion 4C and the stem 5 can be operated to rotate in a watertight state. Also, a pair of arc-shaped attachment brackets 4E provided with a suspension hook 4D for transporting the bonnet 4 provided with the disc 6 and the stem 5 upward and downward are formed integrally with a portion of the outer surface of the bonnet main valve body 4B around the shaft bearing portion 4C.

Tapered surfaces 4a and 2f that have the same or approximately the same inclination and that are further inward in the diameter direction at a position that is further on the internal flow channel side of the horizontally-oriented valve body portion 2C of the valve body 2 are formed on a tip-side part of the outer circumferential surface of the coupling inner fitting portion 4A of the bonnet 4 and on the level difference portion 2b of the coupling outer fitting portion 2A of the valve body 2 on the depth side of the inner circumferential surface 2a that corresponds to the tip-side part in the disc attachment direction. A gasket 8, which is an example of a ring-shaped sealing material that is to be compressed between the tapered surfaces 4a and 2f to the extent in which the tapered surfaces 4a and 2f become watertight when the coupling inner fitting portion 4A of the bonnet 4 is operated to be fitted to a predetermined attachment position relative to the coupling outer fitting portion 2A of the valve body 2, is attached to a seal attachment groove 4b that is formed in the outer circumferential surface of the coupling inner fitting portion 4A of the bonnet 4.

The lock means 7 are configured with: plate-shaped lock members 7A that are each formed to have an approximately squared U shape in plan view; outer engagement holes (outer engaged portions) 7B that are respectively formed to penetrate the wall portions of the coupling outer fitting portion 2A of the valve body 2 that oppose each other in the long-side direction; and inner engagement recessed portions 7C (inner engaged portions) that are respectively formed in the outer surfaces of the wall portions of the coupling inner fitting portion 4A of the bonnet 4 that oppose each other in the long-side direction.

Each outer engagement hole 7B of the coupling outer fitting portion 2A of the valve body 2 is configured to have hole dimensions that allow a lock member 7A to be inserted and removed, from the lateral outside in the long-side direction, and each inner engagement recessed portion 7C in the coupling inner fitting portion 4A of the bonnet 4 is configured to have hole dimensions that allow the tip side of a lock member 7A, which has been operated to be inserted into the corresponding outer engagement hole 7B of the coupling outer fitting portion 2A of the valve body 2, to engage therewith.

The lock members 7A are each configured with: a center lock plate portion 7Aa that extends along the short side direction of the coupling outer fitting portion 2A and the coupling inner fitting portion 4A; and side lock plate portions 7Ab that extend integrally from the two end portions of the center lock plate portion 7Aa along the long-side direction of the coupling outer fitting portion 2A and the coupling inner fitting portion 4A toward the central position side in the long-side direction.

The outer surface of the center lock plate portion 7Aa of each lock member 7A is flush or approximately flush with the outer surface of the coupling outer fitting portion 2A of the valve body 2 when the lock member 7A is in the locked state in which the lock member 7A is engaged with the outer engagement hole 7B of the coupling outer fitting portion 2A of the valve body 2 and the inner engagement recessed portion 7C of the coupling inner fitting portion 4A of the bonnet 4.

The outer surface of the lock member 7A that comes out of the outer engagement hole 7B of the coupling outer fitting portion 2A of the valve body 2 is formed to have an approximately flat U shape or squared U shape provided with a portion that extends along the short side direction and a portion that extends along the long-side direction of the coupling outer fitting portion 2A, and it is therefore easy to grip the outer surface of the lock member 7A that comes out of the outer engagement hole 7B of the coupling outer fitting portion 2A, and it is possible to efficiently and smoothly perform an operation to pull out the lock member 7A.

The outer engagement holes 7B are each configured with: a center through hole portion 7Ba through which the center lock plate portion 7Aa of a lock member 7A penetrates; and side engagement groove portions 7Bb with which the two side lock plate portions 7Ab of the lock member 7A engage, which are formed to be in communication with each other.

The inner engagement recessed portions 7C are each configured with: a center engagement groove portion 7Ca with which the center lock plate portion 7Aa of a lock member 7A engages; and side engagement groove portions 7Cb with which the two side lock plate portions 7Ab of the lock member 7A engage, which are formed to have a squared U shape and to be in communication with each other.

Figure 2:
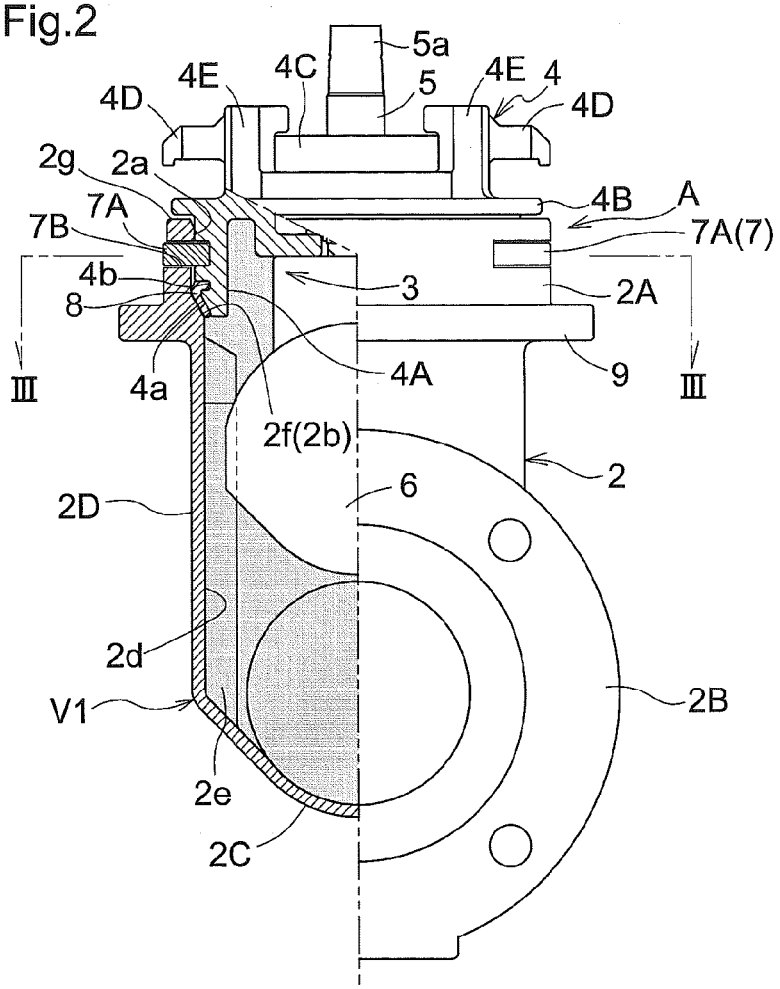
FIG. 2 is a partially cut-out front view of the gate valve.
Figure 3:
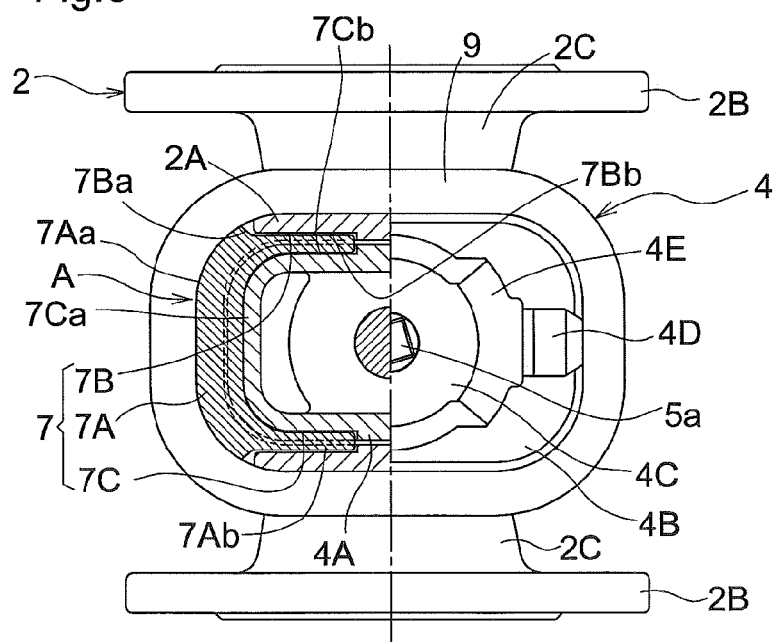
FIG. 3 is a partially cut-out plan view of the gate valve along a line III-III in FIG. 2.
Figure 4:
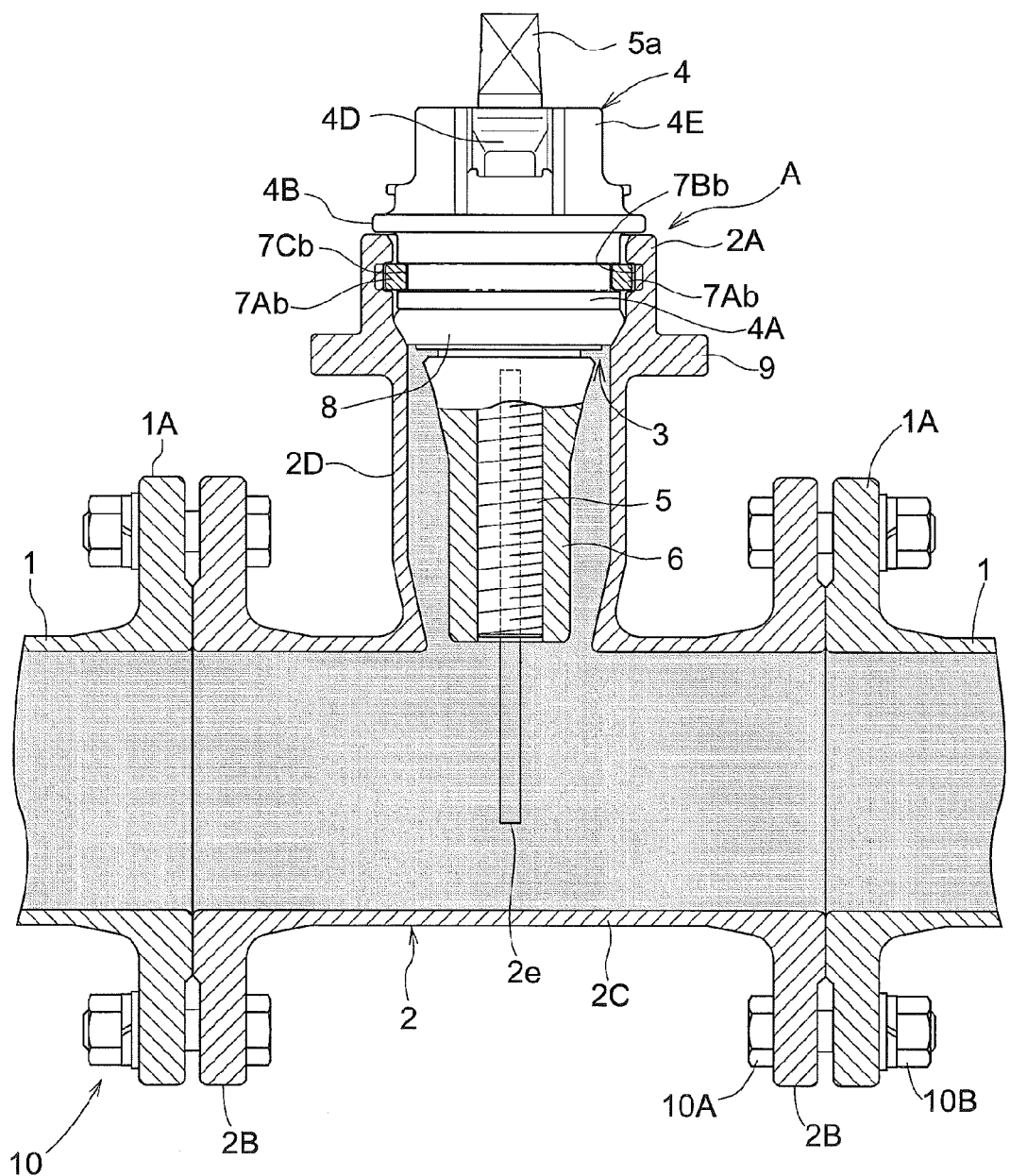
FIG. 4 is a vertical cross-sectional view of the gate valve.
Figure 5:
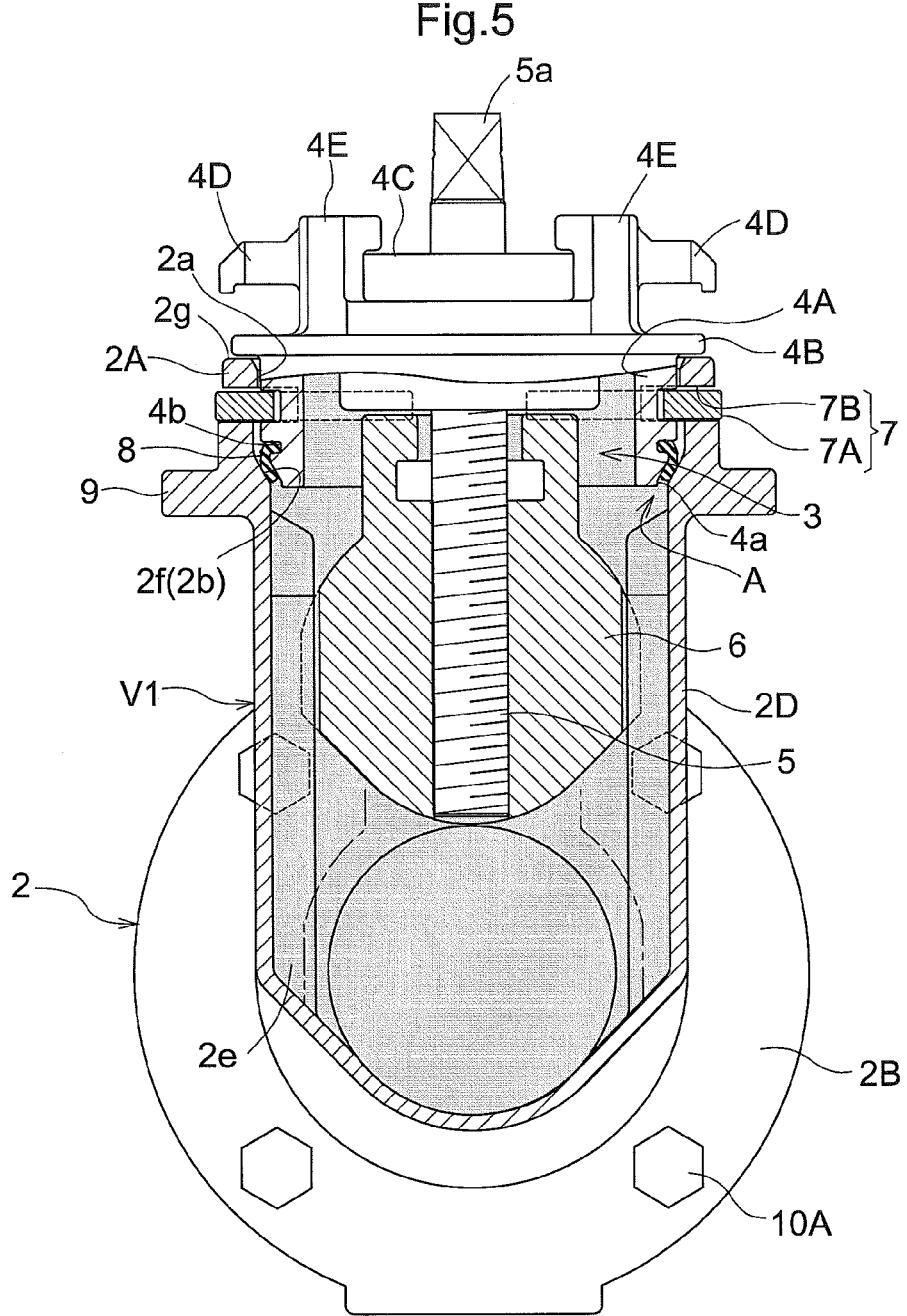
FIG. 5 is a horizontal cross-sectional view of the gate valve.

As shown in FIG. 2 to FIG. 4, when the lock member 7A is in the locked state in which the lock member 7A is engaged with the outer engagement hole 7B of the coupling outer fitting portion 2A of the valve body 2 and the inner engagement recessed portion 7C of the coupling inner fitting portion 4A of the bonnet 4, the gasket 8 is compressed to the extent in which a watertight state (a sealed state) is achieved between the tapered surface 4a of the coupling inner fitting portion 4A of the bonnet 4 and the tapered surface 2f of the coupling outer fitting portion 2A of the valve body 2, and therefore the resilient recovery force of the gasket 8 acts as the removal resistance (the insertion and removal resistance) of the lock member 7A, and the lock member 7A is maintained in the locked state.

When pulling out a lock member 7A in the locked state, it is necessary to press the bonnet 4 toward the valve body 2 side in the direction in which the gasket 8 is compressed, and eliminate or reduce the removal resistance of the lock member 7A generated by the resilient recovery force of the gasket 8.

Therefore, a gap that allows the bonnet 4 to be pressed and moved toward the compressed side of the gasket 8, which is the side toward which the removal resistance of the lock member 7A generated by the resilient recovery force of the gasket 8 is eliminated or reduced, is formed between the upper end surface 2g of the coupling outer fitting portion 2A and the lower surface of the bonnet main valve body 4B of the bonnet 4, even in the locked state.

Next, a description is given of a bonnet removal method for removing the bonnet 4 provided with the disc 6 and the stem 5 from the valve body 2 of the gate valve V1 connected to the upstream and downstream water pipes 1 of the water piping system without stopping the flow of water (without stopping the flow of fluid) when the disc 6, which has a shorter lifespan than the valve body 2, reaches the end of the rated useful life thereof or when an operation failure of the disc 6 occurs, for example.

Figure 6:
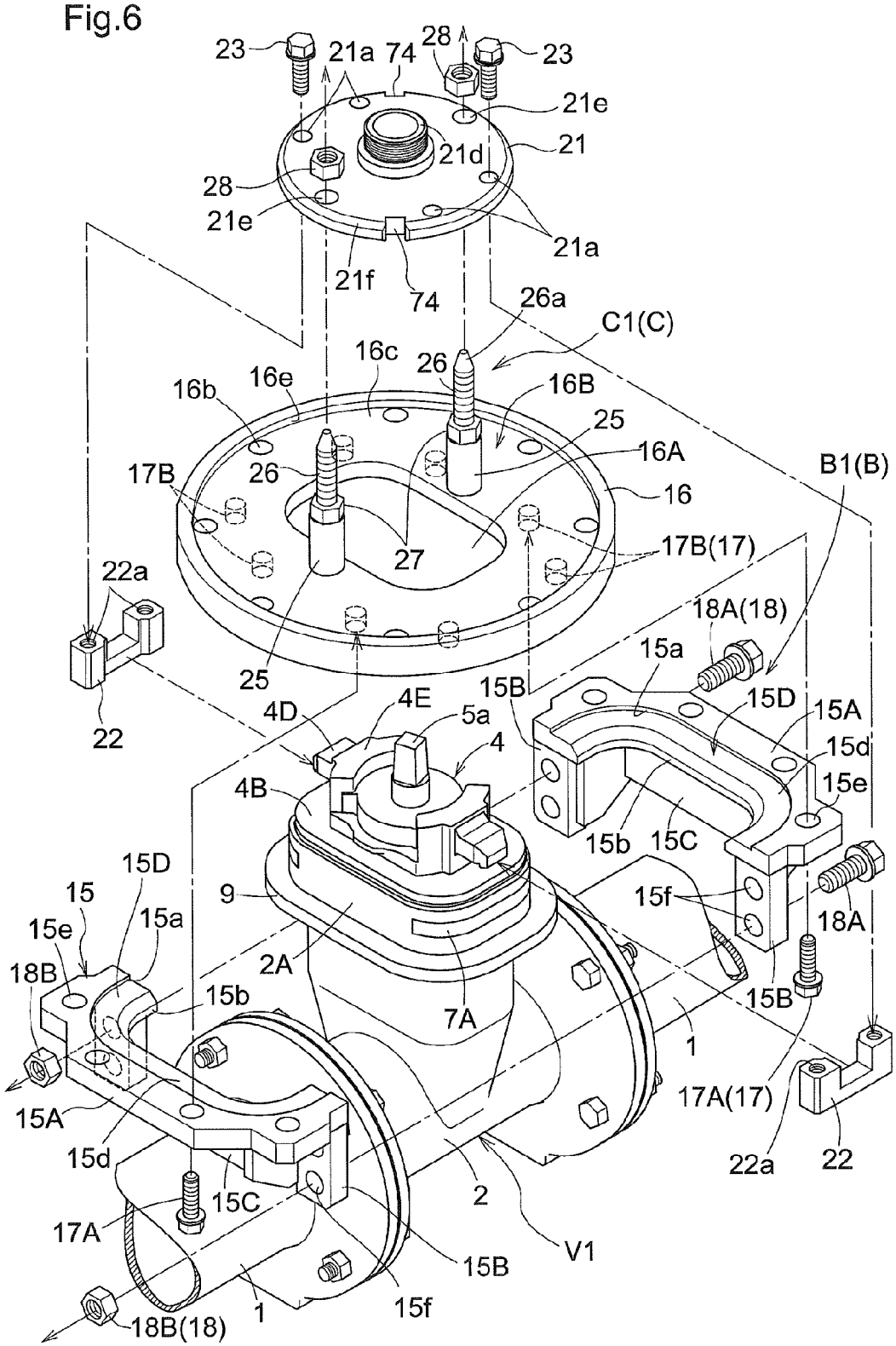
FIG. 6 is an exploded perspective view at the time a first attachment is to be attached.

[1] FIG. 6 shows, from among attachment attaching steps by which an attachment B that surrounds the outer circumferential surface side of the bonnet 4 is detachably fitted onto and fixed to the valve body 2, the step of fixing the first attachment B1 in a clamping state, which constitutes the lower side of the attachment B, to the protruding portion 9 that is formed integrally with the coupling outer fitting portion 2A of the valve body 2, such that an operation to insert/remove the lock members 7A is allowed.

The attachment B is provided with: the first attachment B1 that is ring-shaped and is detachably fixed to the protruding portion 9 on the outer surface of the valve body 2, in the clamping state; and a second attachment B2 that is ring-shaped and that is detachably coupled and fixed to the first attachment B1, in the state of surrounding the outer circumferential surface side of the bonnet 4. The second attachment B2 is provided with a pressing means C for pressing and fixing the coupling inner fitting portion 4A, which is the coupling target portion of the bonnet 4, to the coupling outer fitting portion 2A, which is the coupling portion of the valve body 2, such that a watertight state is achieved, via a pressing member 21 that is detachably attached to the bonnet 4.

The pressing means C is configured with: a first pressing jig C1 that is installed on the first attachment B1 side in the state of pulling the pressing member 21 toward the first attachment B1 side and pressing and fixing the pressing member 21 to the first attachment B1; and a second pressing jig C2 that is installed on the second attachment B2 side in the state of pressing the pressing member 21 toward the first attachment B1 side and fixing the pressing member 21 to the first attachment B1.

The first attachment B1 is configured with: a lower base member 15 that has a dividable structure and that is to be pressed against a lower portion of the protruding portion 9 on the outer surface of the valve body 2; a disc-shaped upper base member 16 that is to be pressed from above the protruding portion 9; and a second fastening means 17 that fixes the base members 15 and 16 to the protruding portion 9 that is clamped therebetween by fastening the base members 15 and 16 while pulling them toward each other.

Furthermore, the lower base member 15 is configured with: two lower divisional plate portions 15A that are divided from each other at a central position of the coupling outer fitting portion 2A of the valve body 2 in the short side direction and that have an approximately squared U shape or C shape in plan view; coupling plate portions 15B that are each provided on either one of the two end portions of each lower divisional plate portion 15A so as to protrude downward; and reinforcing plate portions 15C that are each continuously provided along two coupling plate portions 15B and a lower divisional plate portion 15A.

As shown in FIG. 6, a fitting recessed portion 15D that is to be fitted to a half area that has an approximately flat U shape and extends along one long side portion and halves of the two short side portions of the protruding portion 9 is formed on the upper surface of each lower divisional plate portion 15A of the lower base member 15. The fitting recessed portion 15D is configured such that, in a state where a bottom surface 15d of the fitting recessed portion 15D and a side surface 15a that is continuous therewith and that has an approximately flat U shape are in contact with the lower surface and the circumferential surface of the protruding portion 9, the two lower divisional plate portions 15A and the protruding portion 9 are prevented from moving relative to each other in the horizontal direction.

Also, an approximately flat U-shaped inner circumferential surface 15b of each lower divisional plate portion 15A of the lower base member 15 is configured to extend along, and come into contact with or come into the vicinity of, the outer circumferential surface of the vertically-oriented valve body portion 2D of the valve body 2.

An attachment hole 16A that has an approximately rectangular shape (the shape of a rectangle with rounded corners) is formed to penetrate a central portion of the upper base member 16 so as to be liftable onto the coupling outer fitting portion 2A of the valve body 2 from above. Also, at parts of the lower surface of the upper base member 16 that respectively correspond to a plurality of first bolt insertion holes 15e formed in the lower divisional plate portions 15A of the lower base member 15, screw holes 17B for bolts 17A of the second fastening means 17 that are respectively inserted into the first bolt insertion holes 15e from below are formed as shown in FIG. 8.

A second fitting recessed portion 16B to which a ring-shaped leg portion 31A, which is formed to protrude on the lower surface of a coupling flange 31 of the second attachment B2, is to be fitted, and that prevents the upper base member 16 of the first attachment B1 and the coupling flange 31 of the second attachment B2 from moving relative to each other in the horizontal direction, is formed on the upper surface of the upper base member 16.

Figure 8:
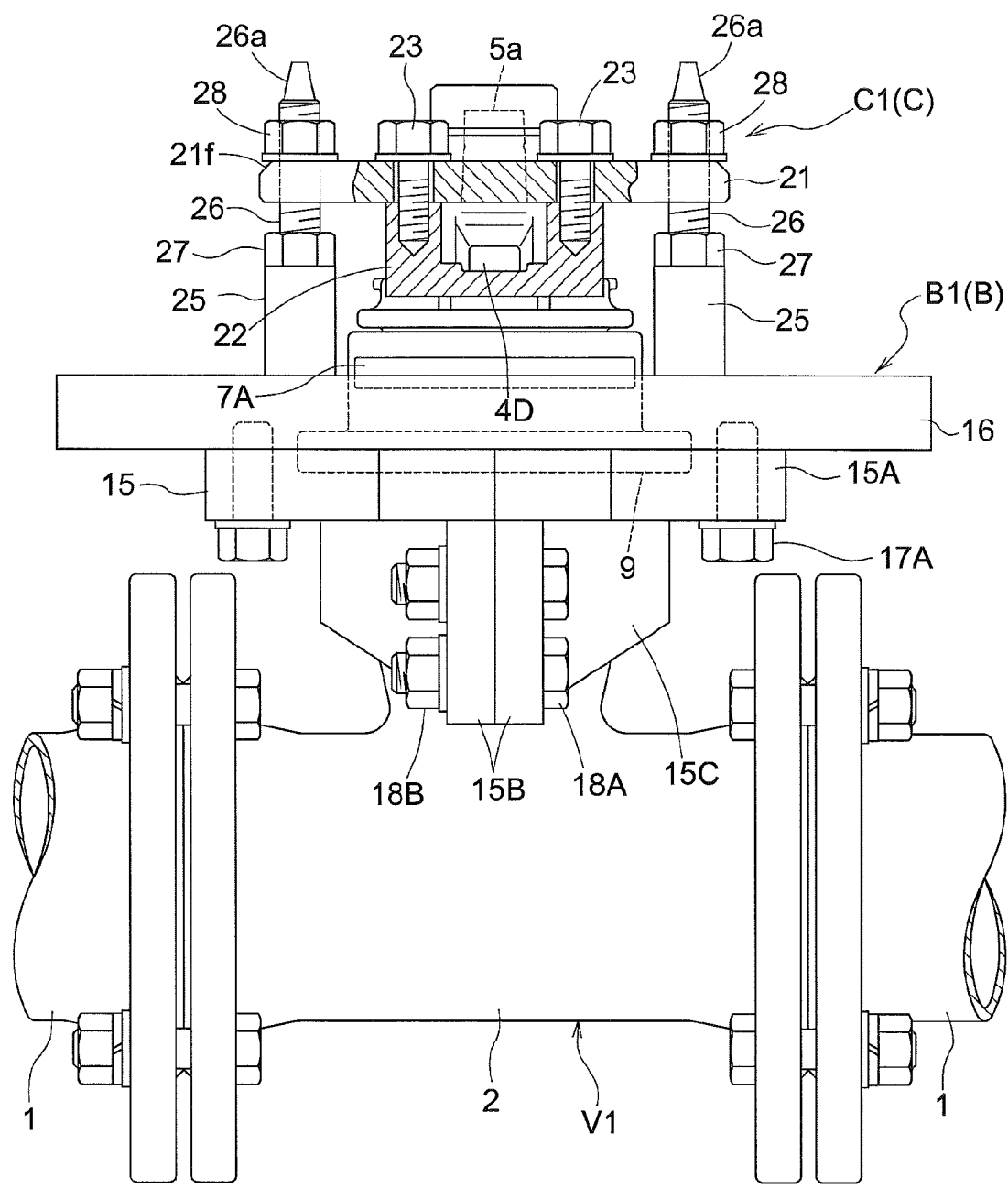
FIG. 8 is a partially cut-out side view at the time a bonnet has been pressed and fixed using a first pressing jig.

Furthermore, as shown in FIG. 8, an O-ring 19, which is an example of a seal material that brings the lower surface of the upper base member 16 and the upper surface of the protruding portion 9 to be in a watertight state according to a fastening operation using the bolts 17A of the second fastening means 17, is attached to a seal attachment groove 16a that is formed at a part that is on the bottom surface of the upper base member 16 and that corresponds to the upper surface of the protruding portion 9 of the valve body 2.

In the step of attaching the first attachment B1, as shown in FIG. 6, an operation is performed to attach the two lower divisional plate portions 15A of the lower base member 15 to the ring-shaped protruding portion 9 formed integrally with the coupling outer fitting portion 2A of the valve body 2 from the short side direction of the protruding portion 9 (the pipe axis direction of the water pipes 1), and the bottom surface 15d and the approximately flat U-shaped side surface 15a of the fitting recessed portion 15D of each lower divisional plate portion 15A are brought into contact with the lower surface and the circumferential surface of the protruding portion 9.

The coupling plate portions 15B of the two lower divisional plate portions 15A that oppose each other in this state are fastened to each other using bolts 18A and nuts 18B of a third fastening means 18 that are inserted into second bolt insertion holes 15f formed in the coupling plate portions 15B, and thereafter the attachment hole 16A of the upper base member 16 is fitted onto the coupling outer fitting portion 2A of the valve body 2, the bolts 17A inserted into the first bolt insertion holes 15e of the lower base member 15 from below are screwed into the screw holes 17B of the upper base member 16, and then the upper base member 16 and the lower base member 15 are fastened to the protruding portion 9, in the clamping state.

Note that in a state where the upper base member 16 and the lower base member 15 are fastened to the protruding portion 9 of the valve body 2 in the clamping state, a bottom surface 16c of the second fitting recessed portion 16B of the upper base member 16 is located slightly below the two outer engagement holes 7B formed in the coupling outer fitting portion 2A of the valve body 2, and an operation space that allows an operation to pull out the lock members 7A to be performed above the bottom surface 16c of the second fitting recessed portion 16B is formed between the outer surface of the coupling outer fitting portion 2A of the valve body 2 and an inner circumferential wall surface 16d of the second fitting recessed portion 16B of the upper base member 16.

Also, as shown in FIG. 6 and FIG. 10, a protruding engaging portion 73 and a recessed engaged portion 74 are formed at opposing positions, namely two positions on the inner circumferential surface of the cylindrical case valve body 30 of the second attachment B2 that are aligned in the radial direction that passes through the center point, and two positions in the outer periphery of the pressing member 21 that are aligned in the radial direction that passes through the center point. The protruding engaging portions 73 and the recessed engaged portions 74 engage with each other in the vertical direction only when the bonnet 4 and the pressing member 21, which are moved up by the elevation transport means D, are in a set orientation, and move and guide the pressing member 21 along a cylindrical case valve body 30 of the second attachment B2 such that the pressing member 21 is not relatively rotatable.

Therefore, when the bonnet 4 is taken out to the inside of a storage space S of a work housing H using the elevation transport means D, only when the bonnet 4 and the pressing member 21 to be moved up by the elevation transport means D are in the set orientation, the engaging portions 73 and the engaged portions 74 that are provided at opposing positions on the pressing member 21 and the inner circumferential surface of the second attachment B2 engage with each other in the vertical direction, so that the pressing member 21 can be reliably and smoothly moved and guided along the inside of the second attachment B2 so as not be relatively rotatable.

Figure 7:
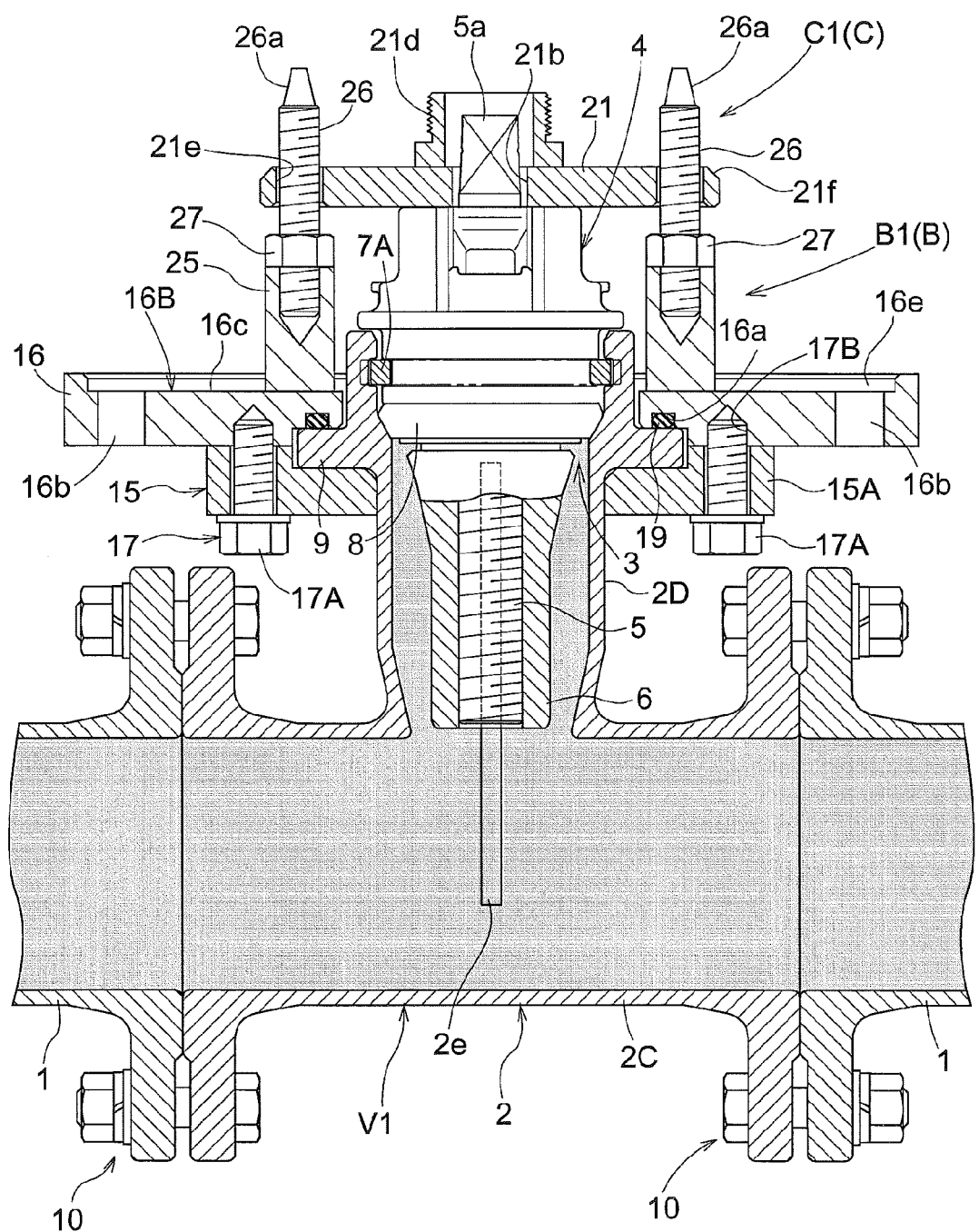
FIG. 7 is a vertical cross-sectional view at the time the first attachment has been attached.
Figure 9:
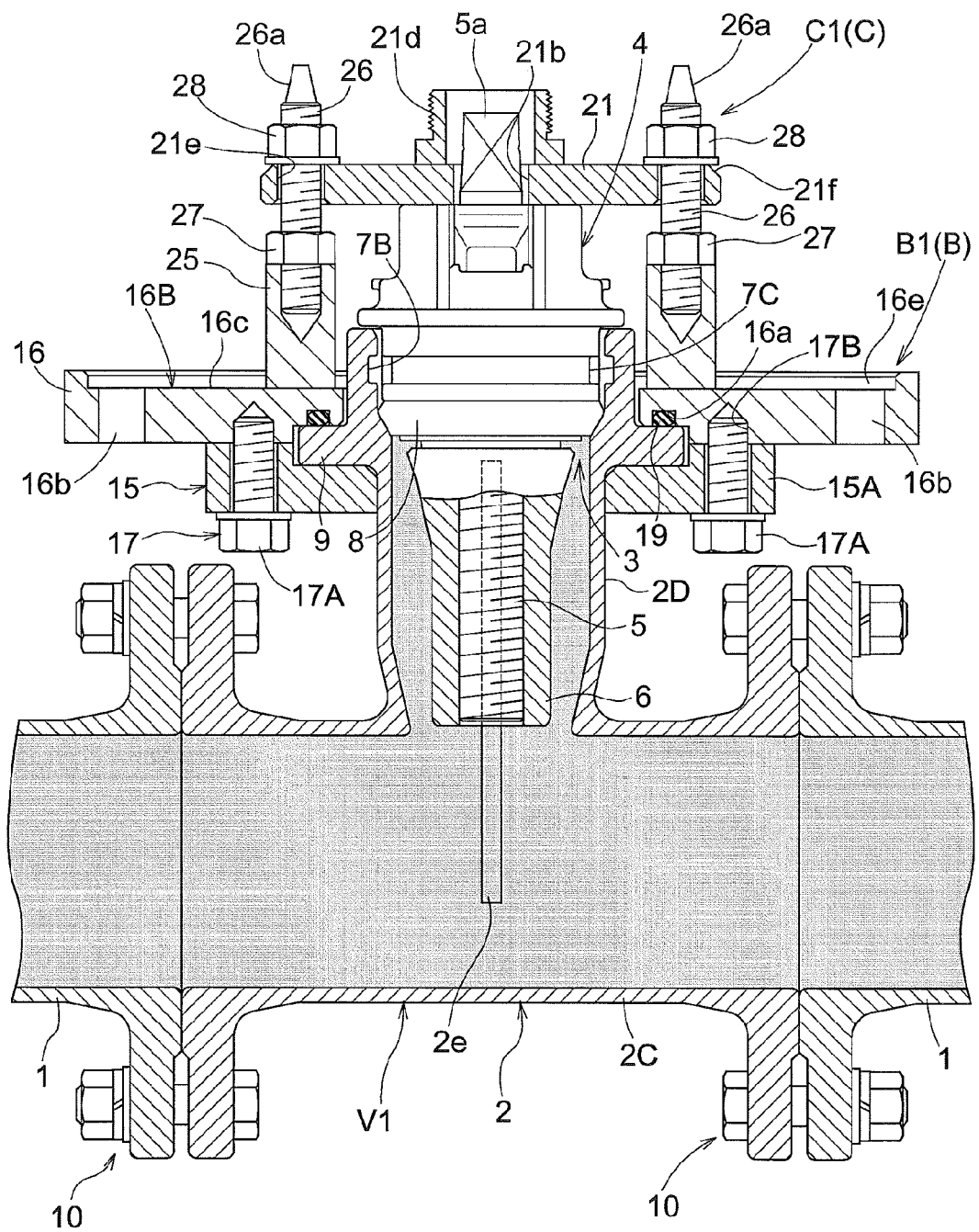
FIG. 9 is a vertical cross-sectional view at the time an operation has been performed to pull out a lock member.

[2] FIG. 7 to FIG. 9 show: a first pressing step, which is the step of pulling the bonnet 4 and pressing it against the valve body 2 via the pressing member 21 detachably attached to the bonnet 4, using the first pressing jig C1 provided for the first attachment B1 of the attachment B, thereby maintaining the gasket 8 provided between the coupling inner fitting portion 4A of the bonnet 4 and the coupling outer fitting portion 2A of the valve body 2 in a watertight state; and a lock release step, which is the step of pulling out the lock members 7A of the lock means 7 in a state where the removal resistance due to the resilient recovery force of the gasket 8 has been eliminated or reduced, thereby releasing the coupling and fixing of the coupling outer fitting portion 2A of the valve body 2 and the coupling inner fitting portion 4A of the bonnet 4.

A bonnet pressing step performed with the pressing means C includes: a first pressing step, which is the step of, before attaching the second attachment B2, pressing and fixing the bonnet 4 in the state of being pulled toward the valve body 2 side using the first pressing jig C1 provided within an area of the first attachment B1 that corresponds to the inner space of the second attachment B2; and a second pressing step, which is the step of, after attaching the second attachment B2, pressing and fixing the bonnet 4 in the state of being pressed toward the valve body 2 side using the second pressing jig C2 that is provided for the second attachment B2 and that can be operated from an outside.

The pressing member 21 used in the bonnet pressing step is configured to have a disc shape that can be stably attached in a horizontal orientation that is parallel to the upper surfaces of the pair of attachment brackets 4E of the bonnet 4 that protrude upward from the attachment hole 16A of the upper base member 16. Third bolt insertion holes 21a for fastening and fixing two end portions of each contact member 22 that has an approximately squared U shape and that is pressed against a suspension hook 4D of the bonnet 4 from below, using bolts 23, are respectively formed at four positions of the pressing member 21 in the circumferential direction.

Screw holes 22a corresponding to the bolts 23 are formed in the two end portions of each contact member 22.

A through hole 21b from which the rotational operation portion 5a of the stem 5 protrudes is formed in the central portion of the pressing member 21, and a coupling target portion 21d that is to be detachably coupled to a coupling portion 51 on the side of the elevation transport means D that transports, for example, the bonnet 4 provided with the disc 6 and the stem 5 upward and downward is formed on the peripheral portion of the through hole 21b on the upper surface of the pressing member 21.

The coupling portion 51 on the elevation transport means D side is configured as a coupling cylinder portion having a female thread on the inner circumferential surface, and the coupling target portion 21d of the pressing member 21 is configured as a coupled cylinder portion having a male thread on the outer circumferential surface.

As shown in FIG. 6 to FIG. 8, the first pressing jig C1 of the pressing means C is configured such that a pair of first threaded cylinders 25 with a female thread are fixed at both sides of a central portion in the long side direction of the attachment hole 16A on the upper surface of the upper base member 16, bolts 26 that are inserted into fourth bolt insertion holes 21e respectively formed at two positions on the pressing member 21 in the circumferential direction are screwed and fixed to the first threaded cylinders 25 using lock nuts 27, and a push-on nut 28 that presses and fixes the bonnet 4 to the valve body 2 side according to a fastening operation in a state where the push-on nut 28 is in contact with the upper surface of the pressing member 21, is screwed to an upper portion of each bolt 26.

The bolts 26 of the first pressing jig C1 are configured to also serve as attaching bolts that fix a second pressing member 70 by pulling the second pressing member 70 toward the first attachment B1 side, the second pressing member 70 being provided for an attachment jig E for attaching a short pipe 61 described below to the elevation transport means D, and tip portions 26*a* of the bolts 26 are configured as tapered insertion guide portions that are inserted into, and guide, bolt insertion holes 70*c* that are formed in the second pressing member 70

The maximum range of the pressing movement of the bonnet 4 caused by the push-on nuts 28 of the first pressing jig C1 is, as shown in FIG. 2, set to have a gap size that allows the gasket 8, which is formed between the upper end surface 2*g* of the coupling outer fitting portion 2A and the lower surface of the bonnet main valve body 4B of the bonnet 4, to be compressed in the locked state where the lock members 7A are engaged with the outer engagement holes 7B in the coupling outer fitting portion 2A of the valve body 2 and the inner engagement recessed portions 7C in the coupling inner fitting portion 4A of the bonnet 4.

In a state where the gasket 8 is compressed between the tapered surface 4*a* of the coupling inner fitting portion 4A of the bonnet 4 and the tapered surface 2*f* of the coupling outer fitting portion 2A of the valve body 2 due to the fastening operation using the push-on nuts 28 of the first pressing jig C1, the insertion and removal resistance that acts against the lock members 7A due to the resilient recovery force of the gasket 8 can be eliminated or reduced.

In addition, as shown in FIG. 9, the lower edges of the outer engagement holes 7B in the coupling outer fitting portion 2A of the valve body 2 are located above the bottom surface 16*c* of the second fitting recessed portion 16B of the upper base member 16, and the outer surfaces of the lock members 7A that come out of the outer engagement holes 7B of the coupling outer fitting portion 2A of the valve body 2 have an approximately flat U or squared U easy-to-grip shape that is provided with a portion extending along the direction of the short sides and portions extending along the direction of the long sides of the coupling outer fitting portion 2A. Therefore, it is possible to reliably and smoothly pull out the lock members 7A with a small amount of operation force.

Figure 11A:
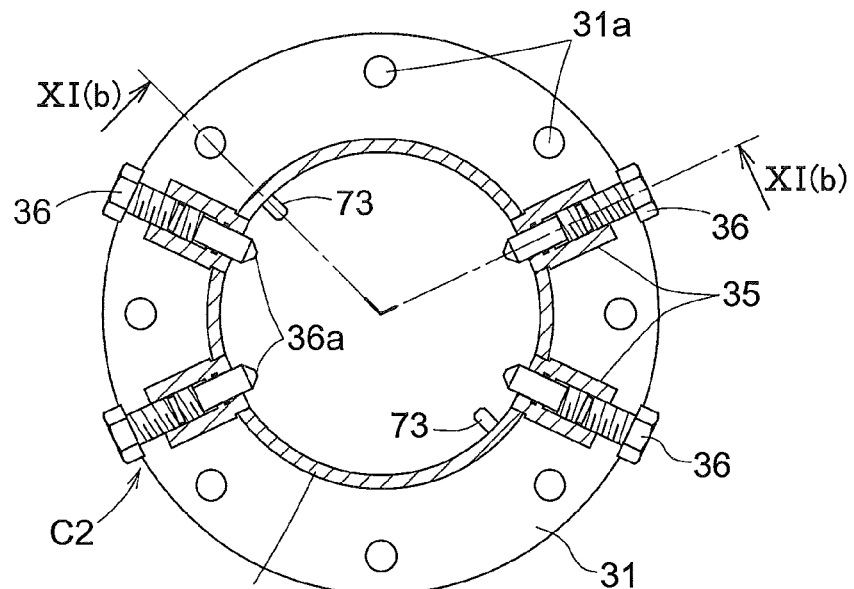
FIG. 11A is a horizontal cross-sectional view of the second attachment.
Figure 11B:
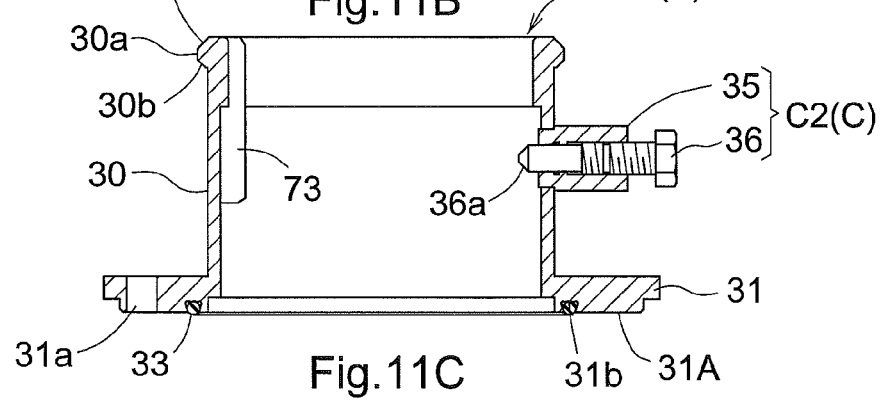
FIG. 11B is a cross-sectional view along a line XI(b)-XI(b) in FIG. 11A.
Figure 11C:
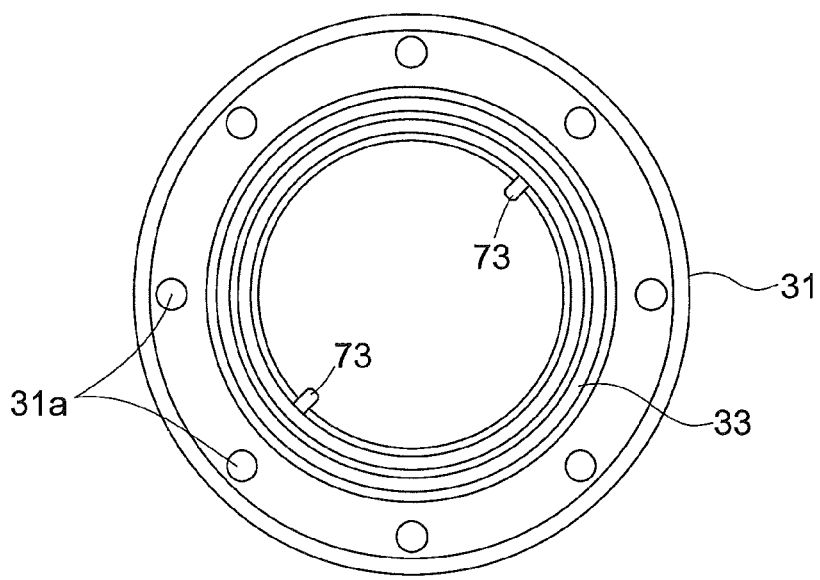
FIG. 11C is a bottom view of the second attachment.
Figure 12:
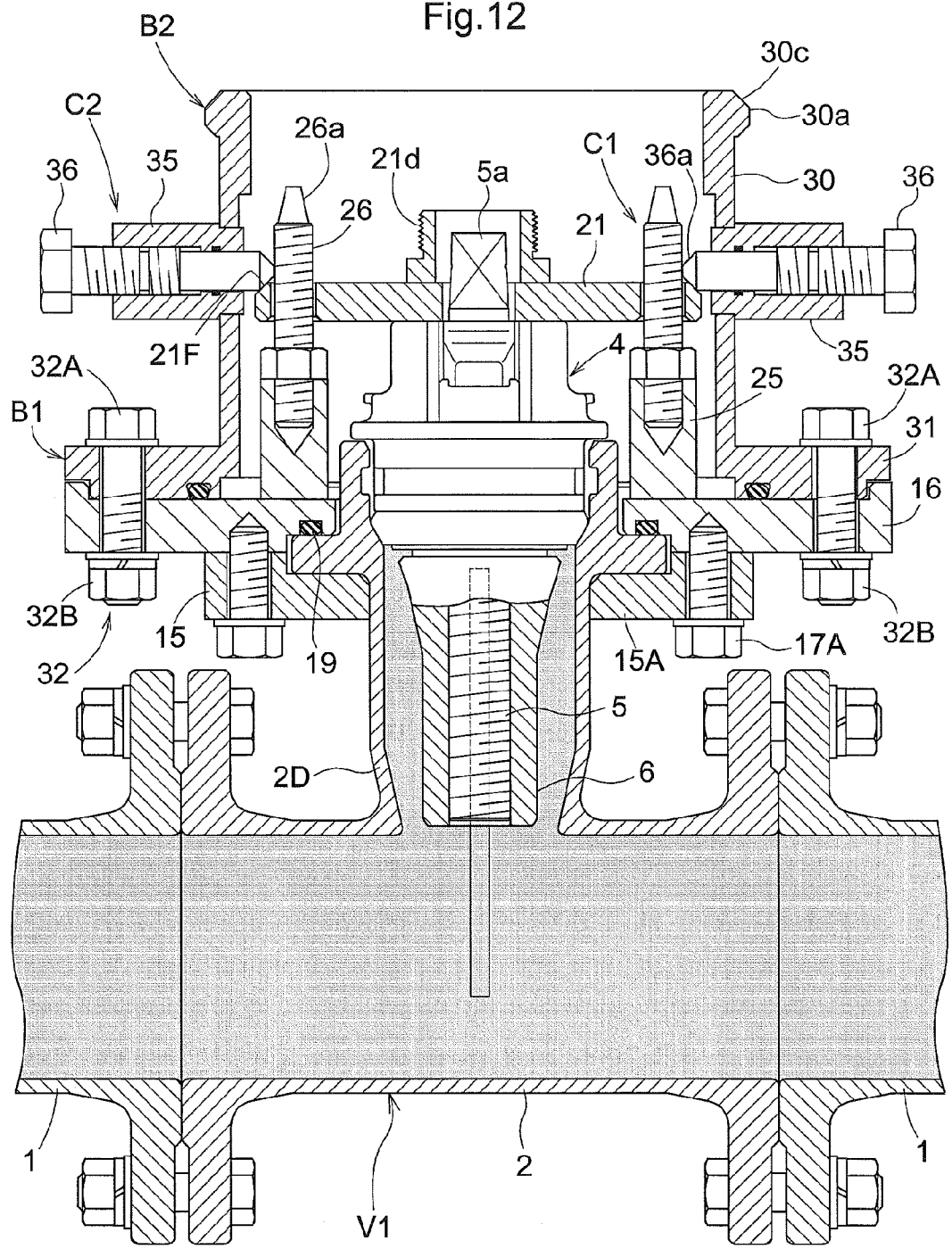
FIG. 12 is a vertical cross-sectional view at the time the second attachment has been attached.

[3] FIG. 10 to FIG. 12 show: the step of attaching the cylindrical second attachment B2 that has a height that is sufficient to surround the entire circumference of the bonnet 4, i.e., a height that is greater than the height from the upper surface of the upper base member 16 to the upper edge of the rotational operation portion 5*a* of the stem 5, to the upper base member 16 of the first attachment B1 of the attachment B such that a watertight state is achieved; a second pressing step, which is the step of, after attaching the second attachment B2, pressing and fixing the bonnet 4 in the state of being pressed toward the valve body 2 side, using the second pressing jig C2 of the pressing means C that is provided for the second attachment B2 and that can be operated from the outside; and the step of, after completing the pressing and fixing using the second pressing jig C2, releasing the pressing and fixing by the push-on nuts 28 of the first pressing jig C1.

Although transition is made from the first pressing jig C1 to the second pressing jig C2, the pressing and fixing of the bonnet 4 is continuously performed by the pressing means C.

Sixth bolt insertion holes 31*a* are formed in the coupling flange 31 formed on the lower end portion of the cylindrical case valve body 30 included in the second attachment B2, respectively at positions that correspond to fifth bolt insertion holes 16*b* formed in the upper base member 16, and an O-ring 33, which is an example of a seal material that brings the upper surface of the upper base member 16 and the lower surface of the coupling flange 31 to be in a watertight state according to a fastening operation using bolts 32A and nuts 32B of a fourth fastening means 32 that are inserted into the fifth bolt insertion holes 16*b* and the sixth bolt insertion holes 31*a*, is attached to a seal attachment groove 31*b* that is formed in the ring-shaped leg portion 31A on the lower surface of the coupling flange 31.

The second pressing jig C2 of the pressing means C is configured by: fixing threaded cylinders 35, which are in communication with the inner space of the cylindrical case valve body 30, at a plurality of positions (four positions in the present embodiment) on the cylindrical case valve body 30 in the circumferential direction such that their screw axes are located on the horizontal axis that passes through the upper surface of the pressing member 21 or the vicinity thereof; and screwing a push-on bolt 36, which is provided with a tapered pressing surface 36*a* that horizontally comes into contact with a tapered surface 21*f* formed on the outer peripheral portion of the upper surface of the pressing member 21, to each threaded cylinder 35.

In a state where the bonnet 4 is pressed and fixed to the valve body 2 side by the fastening operation using the plurality of push-on bolts 36 of the second pressing jig C2, the watertight state in which the gasket 8 inserted between the tapered surface 4*a* of the coupling inner fitting portion 4A of the bonnet 4 and the tapered surface 2*f* of the coupling outer fitting portion 2A of the valve body 2 is compressed is maintained even if the pressing force of the push-on nuts 28 of the first pressing jig C1 is released.

Therefore, as shown in FIG. 12, after the pressing and fixing operation using the second pressing jig C2 is complete, an operation is performed to release the pressing and fixing by the push-on nuts 28 of the first pressing jig C1, from the upper opening of the cylindrical case valve body 30.

Figure 13:
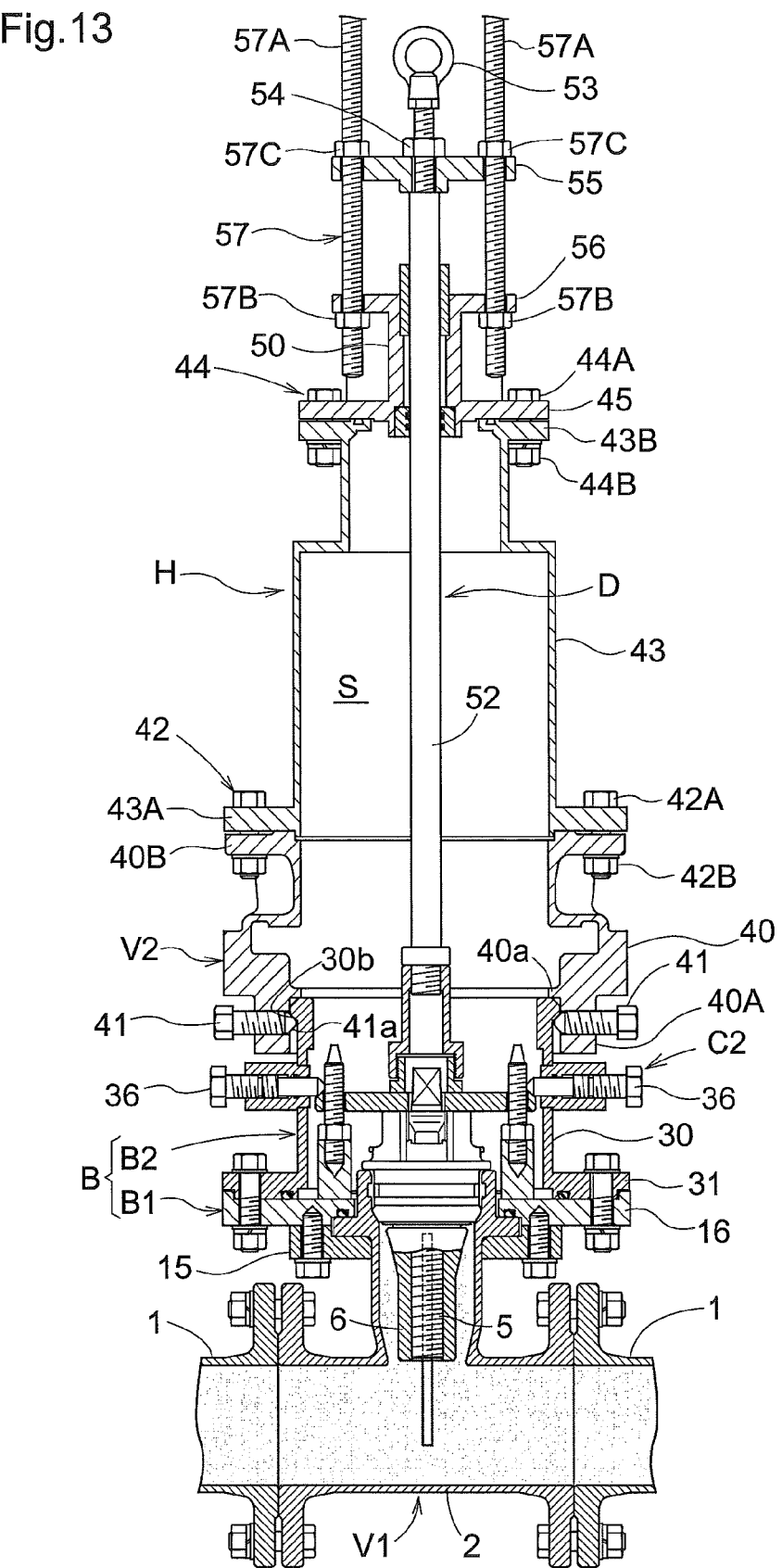
FIG. 13 is a vertical cross-sectional view at the time a work housing has been coupled.

[4] FIG. 13 shows a housing attachment step, which is the step of sealing a work target part of the gate valve V1 in a watertight state by attaching the work housing H, which is provided with a work open/close valve V2 and the elevation transport means D that is to be coupled to the bonnet 4, to the second attachment B2 of the attachment B such that a watertight state is achieved.

A fitting position regulating ring-shaped protrusion 40*a* that comes into contact with the upper end surface of the cylindrical case valve body 30 from above is formed integrally with the inner surface of a fitting attachment cylinder portion 40A of a valve case 40 of the work open/close valve V2, the fitting attachment cylinder portion 40A being fitted onto and attached to the cylindrical case valve body 30 of the second attachment B2 from above, and as shown in FIG. 13, a pulling bolt 41, which is provided with a tapered pressing surface 41*a* that horizontally comes into contact with a lower tapered surface 30*b* of a ring-shaped protrusion 30*a* formed to protrude on the upper end portion of the outer circumferential surface of the cylindrical case valve body 30, is screwed into a plurality of positions on the fitting attachment cylinder portion 40A of the valve case 40 in the circumferential direction.

Also, an O-ring (not shown), which is an example of a seal material, is attached between opposing surfaces, namely an inner corner portion that is formed with the inner surface of the fitting attachment cylinder portion 40A and the fitting position regulating ring-shaped protrusion 40*a* of the valve case 40, and an upper tapered surface 30c of the ring-shaped protrusion 30a of the cylindrical case valve body 30, and a configuration is adopted in which the fitting position regulating ring-shaped protrusion 40a of the valve case 40 is pulled and fixed to the upper end surface of the cylindrical case valve body 30 of the second attachment B2 while the O-ring is compressed to be watertight by a fastening operation using the pulling bolt 41.

The work housing H is configured with: a work housing main valve body 43 provided with a lower coupling flange 43A that is to be coupled and fixed to an upper coupling flange 40B of the valve case 40 using bolts 42A and nuts 42B of a fifth fastening means 42 such that a watertight state is achieved; and a canopy 45 that is to be coupled and fixed to an upper flange 43B of the work housing main valve body 43 using bolts 44A and nuts 44B of a sixth fastening means 44 such that a watertight state is achieved.

The storage space S in which the bonnet 4 provided with the disc 6 and the stem 5 can be housed is formed within the work housing main valve body 43.

The elevation transport means D is configured such that an elevation shaft 52 penetrates therethrough and is supported by a cylindrical shaft bearing portion 50 provided in a central portion of the canopy 45 of the work housing H so as to be slidable in the vertical direction, the coupling portion 51 that is detachably screwed and coupled to the coupling target portion 21d of the pressing member 21 is provided on the lower end portion of the elevation shaft 52, and a suspension ring 53 for moving up the bonnet 4 provided with the disc 6 and the stem 5 to the inside of the storage space S of the work housing main valve body 43 using a crane or the like, or suspending and transporting the work housing main valve body 43 in which the bonnet 4 is housed to a predetermined position using a crane or the like, is provided on the upper end portion of the elevation shaft 52.

Also, screw-type forcible feeding mechanisms 57 that lower the short pipe 61 that is provided with an inner plug 60 described below and that is located at a predetermined storage position within the storage space S of the work housing main valve body 43 against water pressure in order to attach the short pipe 61 to the valve body 2 are provided between: two end portions of an elevation operation lever 55 that is fastened to the upper portion of the elevation shaft 52 using a nut 54; and two end portions of an attaching plate portion 56 that is formed on the upper end portion of the shaft bearing portion 50 so as to oppose the two end portions of the elevation operation lever 55 in the vertical direction.

The screw-type forcible feeding mechanisms 57 are configured with: elongated bolts 57A that are inserted between: two end portions of the attaching plate portion 56 of the shaft bearing portion 50; and the two end portions of the elevation operation lever 55; first nuts 57B that are respectively screwed to the elongated bolts 57A so as to be in contact with the lower surfaces of the two end portions of the attaching plate portion 56; and second nuts 57C that are respectively screwed to the elongated bolts 57A so as to be in contact with the upper surfaces of the two end portions of the elevation operation lever 55.

In this housing attachment step, the bonnet 4 has been pressed and fixed to the valve body 2 side by performing a fastening operation using the plurality of push-on bolts 36 of the second pressing jig C2.

Note that, as shown in FIG. 13, it is possible to press and fix the bonnet 4 to the valve body 2 side such that a watertight state is achieved by performing a fastening operation using the second nuts 57C of the screw-type forcible feeding mechanisms 57.

Figure 14:
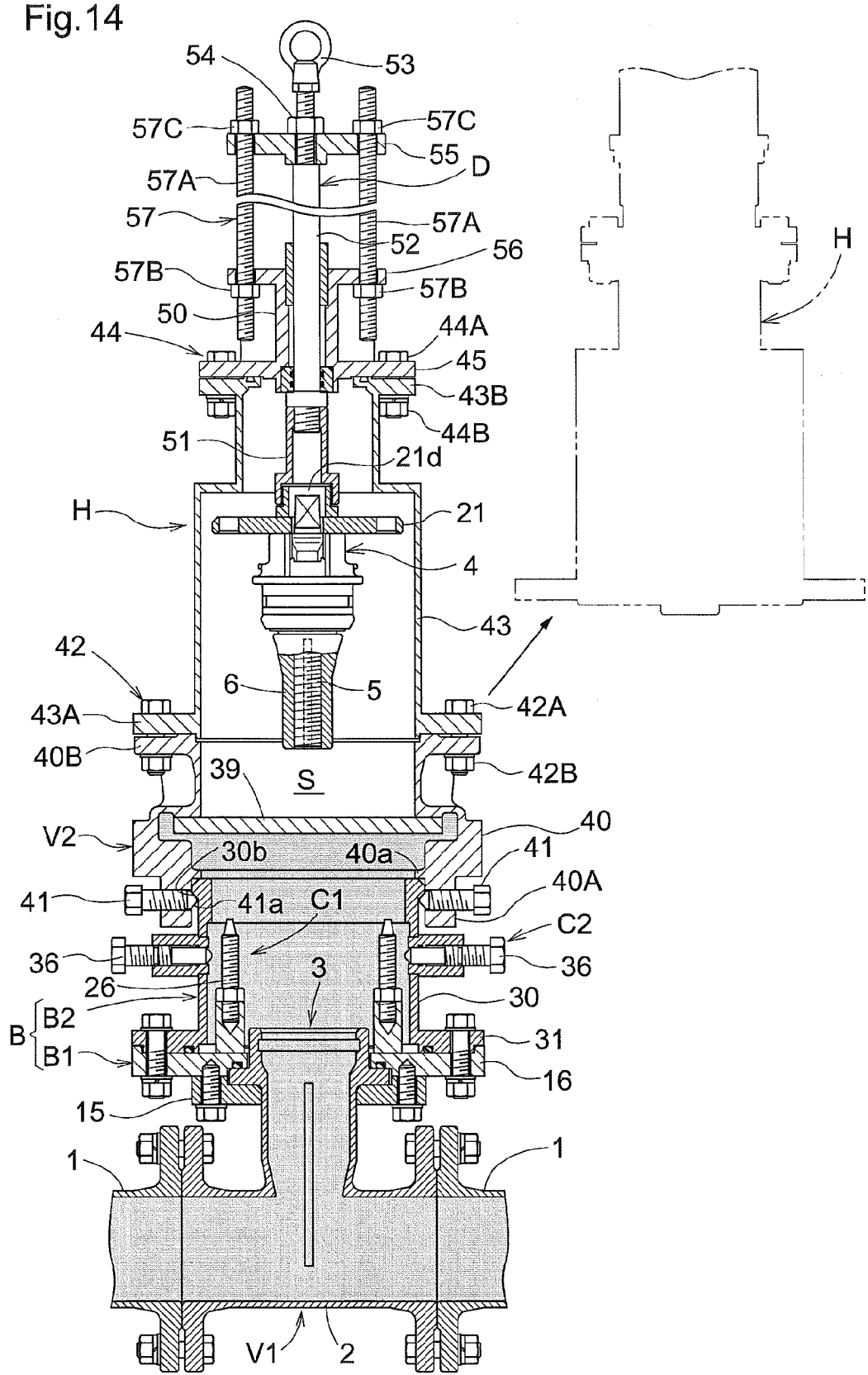
FIG. 14 is a vertical cross-sectional view at the time a bonnet has been collected to the inside of a storage space of the work housing.

[5] FIG. 14 shows: the step of releasing the pressing and fixing of the bonnet 4 by the second pressing jig C2 of the pressing means C, taking out the bonnet 4 to the inside of the storage space S of the work housing H using the elevation transport means D, and thereafter performing an operation to close a disc 39 of the work open/close valve V2; and the step of removing the bonnet 4 taken out to the inside of the storage space S of the work housing H.

Specifically, an operation is performed to loosen the plurality of push-on bolts 36 of the second pressing jig C2, and the tapered pressing surface 36a of each push-on bolt 36 is removed outward in the radial direction from the tapered surface 21f formed on the outer peripheral portion of the upper surface of the pressing member 21.

Note that when the pressing and fixing of the bonnet 4 by the second pressing jig C2 of the pressing means C is to be released, the bonnet 4 is pressed and fixed to the valve body 2 side in a watertight state according to a fastening operation using the second nuts 57C of the screw-type forcible feeding mechanisms 57.

Then, the bonnet 4 that is fitted to the valve body 2 is moved up to the predetermined storage position within the storage space S of the work housing main valve body 43 using a crane or the like coupled to the elevation shaft 52 of the elevation transport means D, and thereafter an operation is performed to close the disc 39 of the work open/close valve V2.

In the step of removing the bonnet 4 taken out to the inside of the storage space S of the work housing H, the bolts 42A and the nuts 42B of the fifth fastening means 42 that couple and fix the upper coupling flange 40B of the valve case 40 and the lower coupling flange 43A of the work housing main valve body 43 to each other are removed, and the bonnet 4 that has been removed and the work housing main valve body 43 provided with the elevation transport means D are suspended and transported to a predetermined removal position using a crane or the like.

Figure 15:
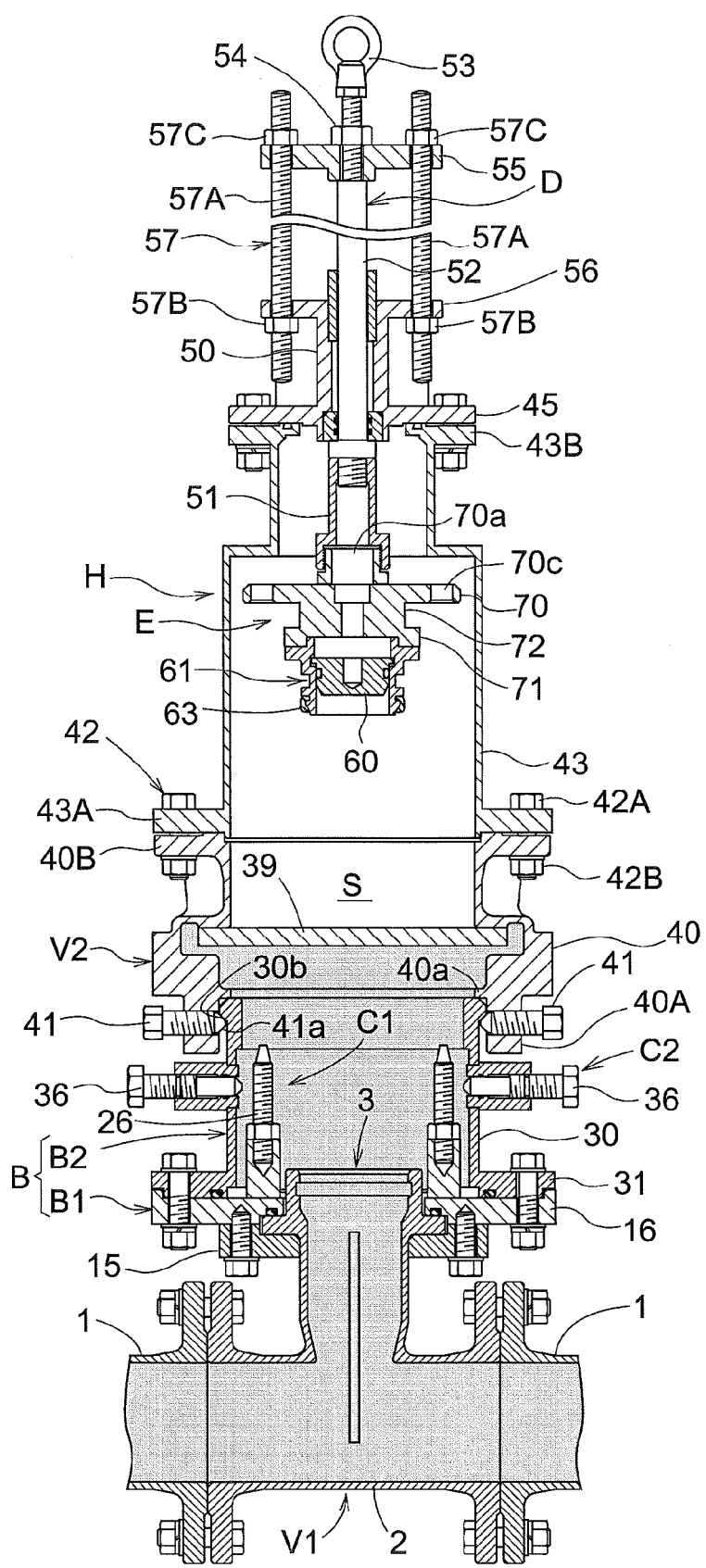
FIG. 15 is a vertical cross-sectional view at the time a short pipe has been attached to an elevation transport means within the work housing.

[6] FIG. 15 shows the step of, in a workplace that is different from the position at which the valve body 2 is present, attaching the short pipe 61, for which the inner plug 60 is detachably attached to a flow channel 61a that can communicate with the disc attaching port 3 of the valve body 2, to the elevation transport means D of the work housing main valve body 43 of the work housing H, suspending and transporting the work housing main valve body 43, to which the short pipe 61 has been attached, to a predetermined position in the valve case 40 by using a crane or the like, fastening the lower coupling flange 43A of the work housing main valve body 43 and the upper coupling flange 40B of the valve case 40 to each other using the bolts 42A and the nuts 42B of the fifth fastening means 42, and coupling and fixing the work housing main valve body 43 to the valve case 40 in a watertight state.

The attachment jig E for pressing and fixing a coupling inner fitting portion 61A, which is a coupling target portion of the short pipe 61 that is fitted from the disc attaching port 3 of the valve body 2, to the coupling outer fitting portion 2A, which is a coupling portion of the valve body 2, in a watertight state by using the first pressing jig C1 and the second pressing jig C2 of the pressing means C is provided between the coupling portion 51 of the elevation shaft 52 of the elevation transport means D and the short pipe 61.

Figure 16:
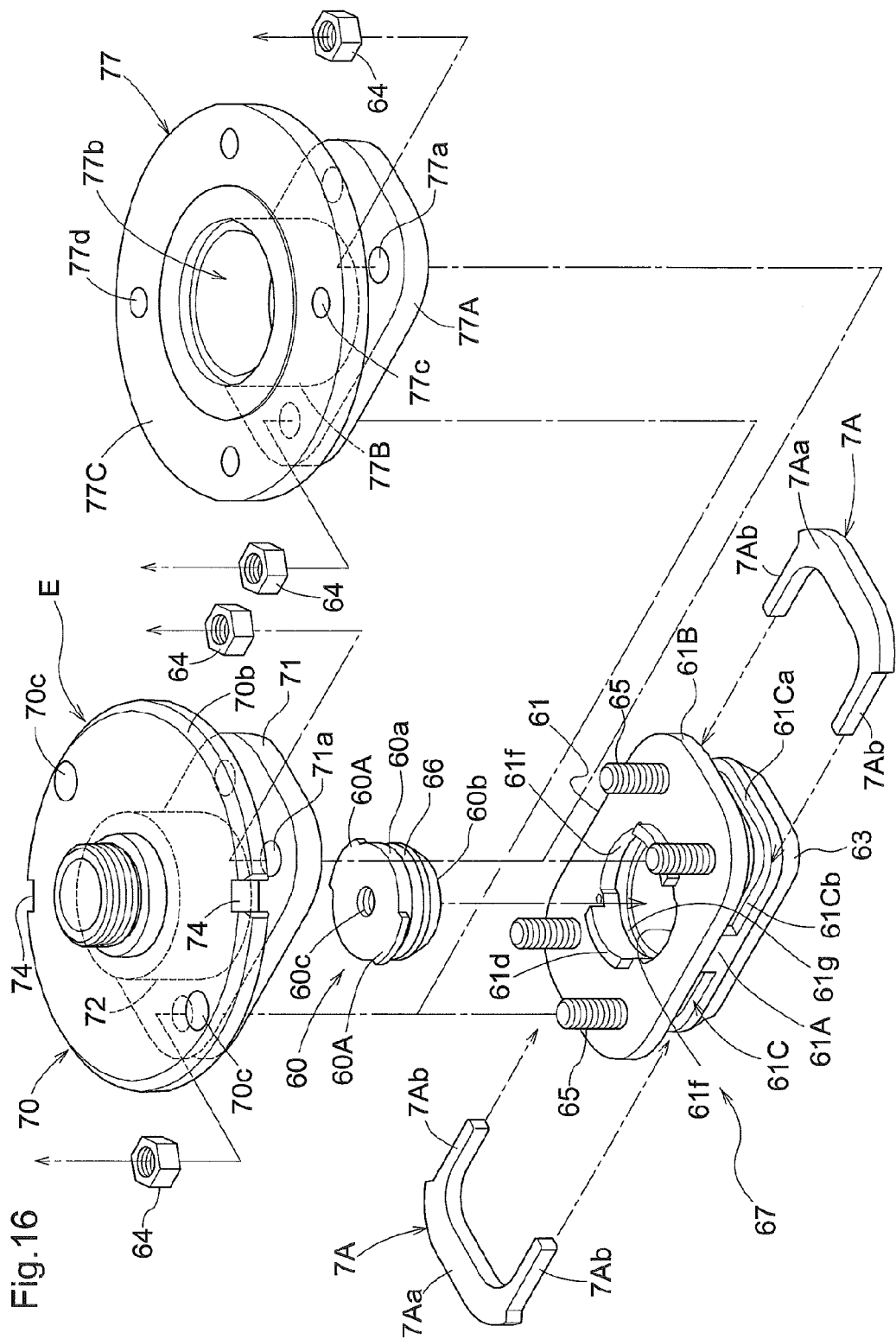
FIG. 16 is an exploded perspective view of a short pipe, an inner plug, an attachment jig, and a second short pipe.
Figure 17A:
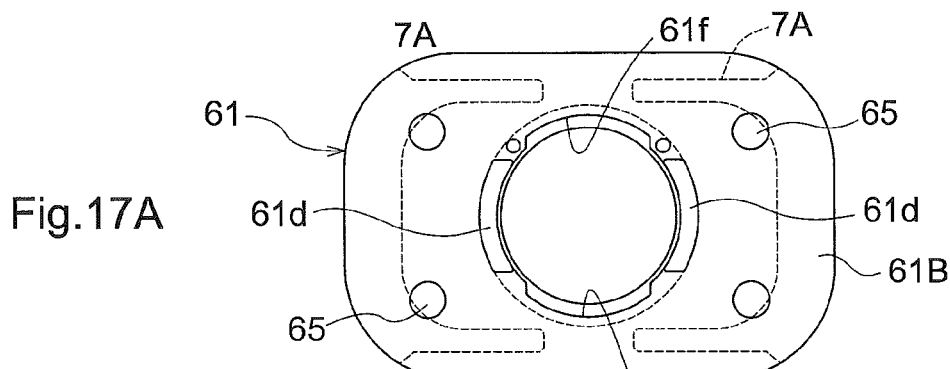
FIG. 17A is a plan view of the short pipe.
Figure 17B:
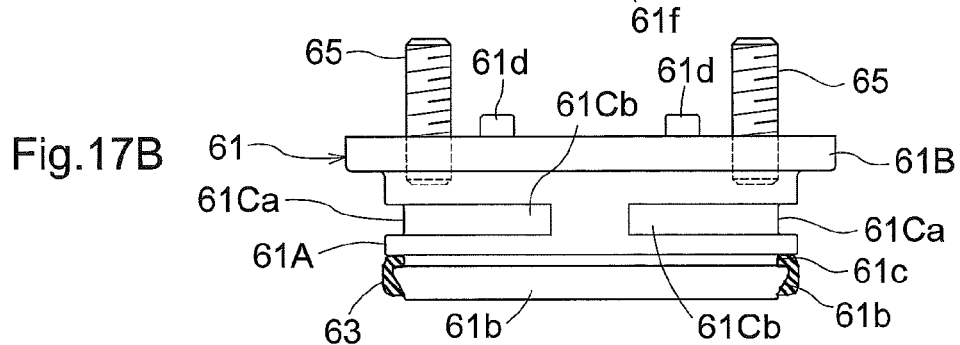
FIG. 17B is a partially cut-out side view of the short pipe.
Figure 17C:
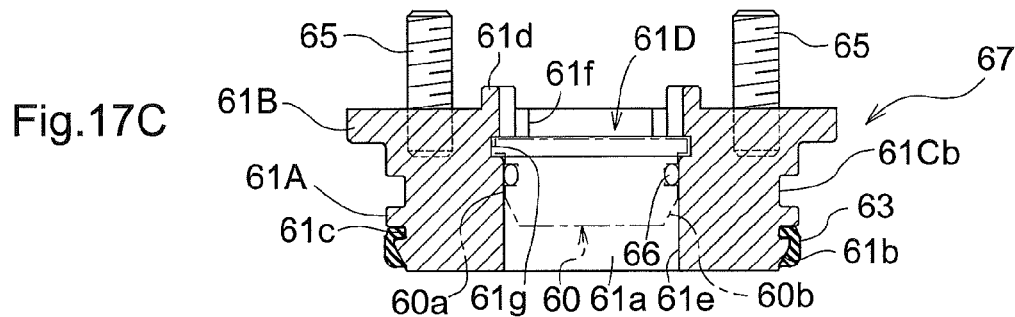
FIG. 17C is a vertical cross-sectional view of the short pipe.

As shown in FIG. 16 and FIG. 17, the short pipe 61 is configured by forming a coupling flange portion 61B that has a shape that is approximately similar to, and that can come into contact with, the upper end surface 2g of the coupling outer fitting portion 2A of the valve body 2, integrally with the upper end portion of the coupling inner fitting portion 61A that has approximately the same function as the coupling inner fitting portion 4A of the bonnet 4.

Inner engagement recessed portions (inner engaged portions) 61C that engage with the lock members 7A inserted from the outer engagement holes 7B of the coupling outer fitting portion 2A of the valve body 2 are respectively formed in the outer surfaces of the wall portions of the coupling inner fitting portion 61A of the short pipe 61, the outer surfaces opposing each other in the long-side direction.

The inner engagement recessed portions 61C are each configured with: a center engagement groove portion 61Ca with which the center lock plate portion 7Aa of a lock member 7A engages; and side engagement groove portions 61Cb with which the two side lock plate portions 7Ab of the lock member 7A engage, which are formed to have a squared U shape and to be in communication with each other.

A tapered surface 61b that opposes the tapered surface 2f formed on the depth-side level difference portion 2b of the inner circumferential surface 2a of the coupling outer fitting portion 2A of the valve body 2 and that has the same or approximately the same inclination, and a seal attachment groove 61c that is continuous with the upper end for the tapered surface 61b are formed on the lower end side of the coupling inner fitting portion 61A of the short pipe 61. A gasket 63, which is an example of a ring-shaped sealing material that is to be compressed between the tapered surfaces 2f and 61b to the extent in which the tapered surfaces 2f and 61b become watertight when the coupling inner fitting portion 61A of the short pipe 61 is operated to be fitted to a predetermined attachment position relative to the coupling outer fitting portion 2A of the valve body 2, is attached to the seal attachment groove 61c.

When the lock member 7A is in the locked state in which the lock member 7A is engaged with the outer engagement hole 7B of the coupling outer fitting portion 2A of the valve body 2 and the inner engagement recessed portion 61C of the coupling inner fitting portion 61A of the short pipe 61, the gasket 63 is compressed to the extent in which a watertight state is achieved between the tapered surface 61b of the coupling inner fitting portion 61A of the short pipe 61 and the tapered surface 2f of the coupling outer fitting portion 2A of the valve body 2, and therefore the resilient recovery force of the gasket 63 acts as the removal resistance (the insertion and removal resistance) of the lock members 7A, and the lock members 7A are maintained in the locked state.

When pulling out a lock member 7A in the locked state, it is necessary to push the short pipe 61 toward the valve body 2 side in the direction in which the gasket 63 is compressed, and eliminate or reduce the removal resistance of the lock member 7A generated by the resilient recovery force of the gasket 63.

Therefore, a gap that allows the short pipe 61 to be pressed and moved toward the compressed side of the gasket 63, which is the side toward which the removal resistance of the lock member 7A generated by the resilient recovery force of the gasket 63 is eliminated or reduced, is formed between the upper end surface 2g of the coupling outer fitting portion 2A of the valve body 2 and the lower surface of the coupling flange portion 61B of the short pipe 61, even in the locked state.

Figure 21:
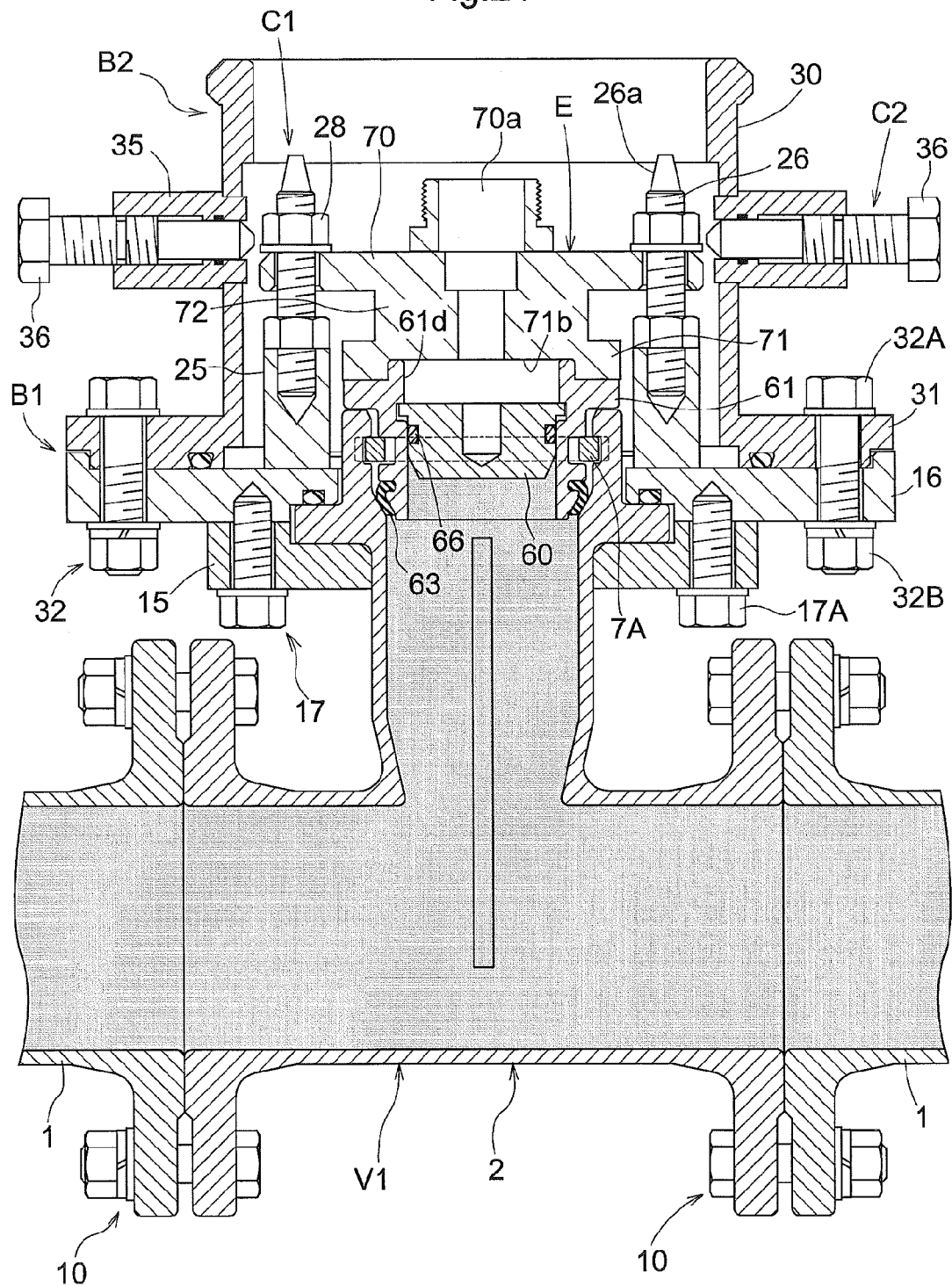
FIG. 21 is a vertical cross-sectional view at the time the short pipe has been pressed and fixed using the first pressing jig.
Figure 26:
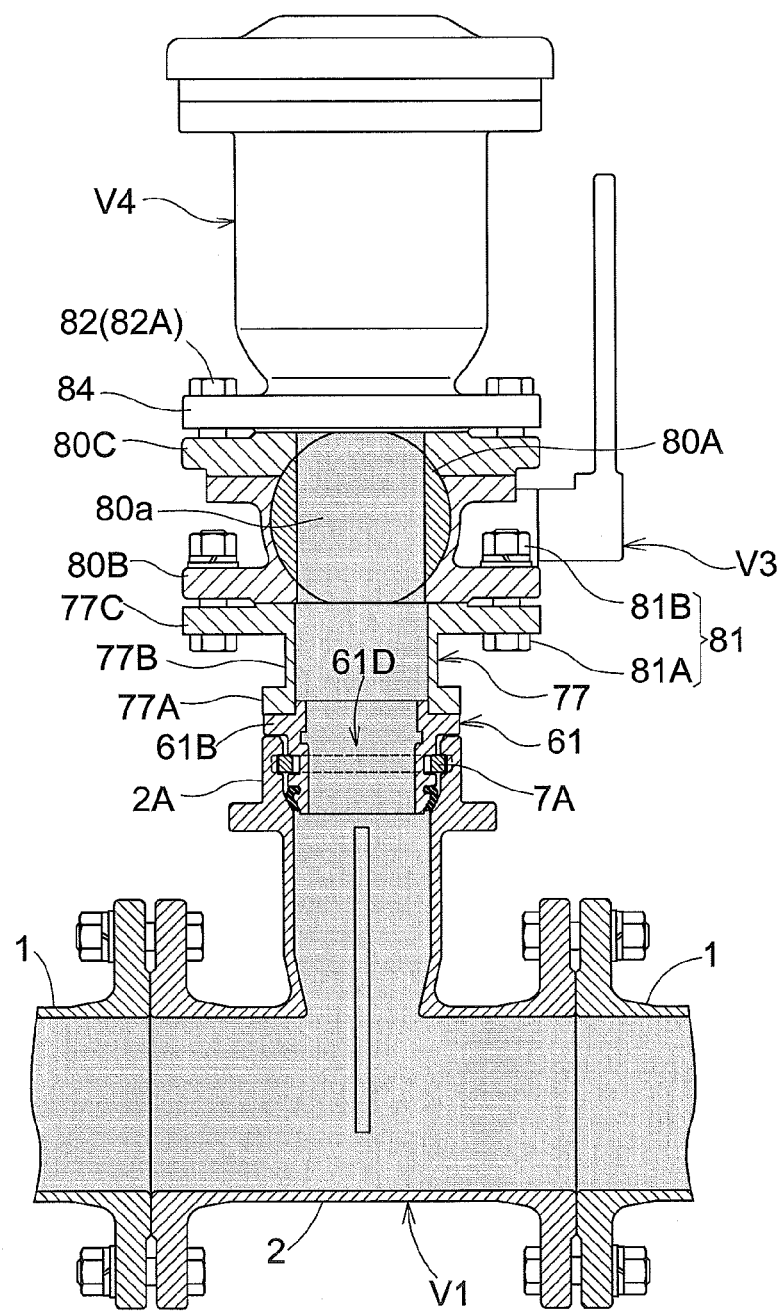
FIG. 26 is a partially cut-out side view at the time an air valve has been installed to the repair valve.

A plurality of bolts 65 (four bolts in the present embodiment) for coupling and fixing either a coupling flange portion 71 of the attachment jig E or a lower flange portion 77A of a second short pipe 77, which will be described below, according to a fastening operation using nuts 64, are screwed to the coupling flange portion 61B of the short pipe 61. Also, as shown in FIG. 16, FIG. 21, and FIG. 26, a pair of arc-shaped seating portions (positioning fitting portions) 61d that fit to fitting recessed portions (positioning fitting target portion) 71b formed in the lower surface of the coupling flange portion 71 of the attachment jig E or a lower end opening portion (configured to also serve as a positioning fitting target portion) of a flow channel 77b of the second short pipe 77 described below, and that thereby prevent the short pipe 61 and the coupling flange portion 71 of the attachment jig E or the lower flange portion 77A of the second short pipe 77 from moving relative to each other in the horizontal direction, are formed integrally with the periphery around the opening of the flow channel 61a in the upper surface of the coupling flange portion 61B of the short pipe 61.

On an inner circumferential surface 61e of a plug attaching port 61D configured with an upper end portion of the flow channel 61a of the short pipe 61: groove-shaped attachment/detachment channels 61f with/from which locking portions 60A, which are respectively formed to protrude at two positions in the circumferential direction on an outer circumferential surface 60a of the inner plug 60 that seals (stops the flow of water through) the plug attaching port 61D, can engage or can be detached, from the pipe axis direction; and circular groove-shaped locking channels 61g that come into contact with the locking portions 60A and prevents them from being removed in the pipe axis direction due to the rotational operation of the inner plug 60 in a state where the locking portions 60A are located in the locking positions of the attachment/detachment channels 61f, are formed to communicate with each other.

A bayonet mechanism for detaching/attaching the inner plug 60 from/to the short pipe 61 according to a rotational operation is configured with the locking portions 60A formed at two positions on the inner plug 60 in the circumferential direction and the attachment/detachment channels 61f and the locking channels 61g formed in the inner circumferential surface 61e of the plug attaching port 61D of the short pipe 61.

Figure 18A:
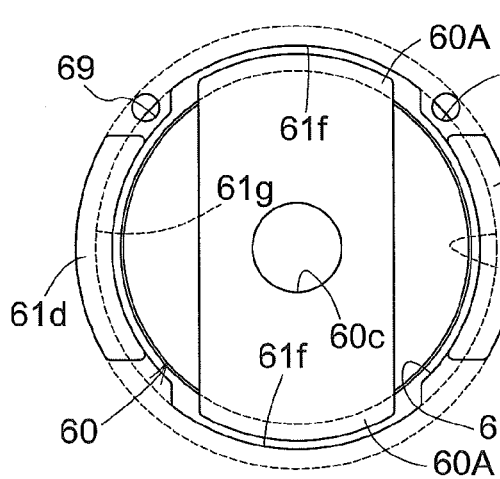
FIGS. 18A and 18B are plan views showing a detachment/attachment operation position and an engagement operation position of the inner plug.
Figure 18B:
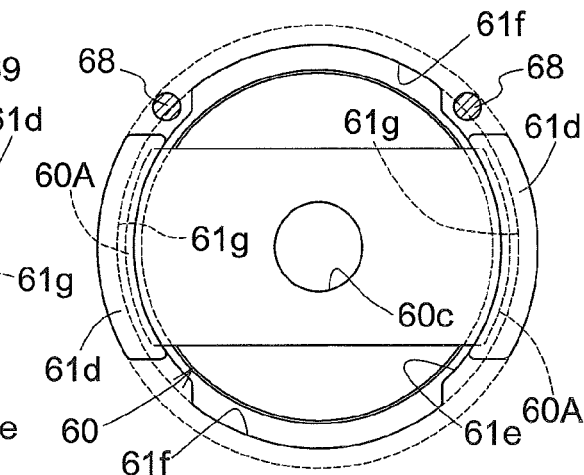

Also, as shown in FIGS. 18A and 18B, attachment holes 69 to which rotation restricting members 68 such as pins or hexagon socket head bolts are to be attached, the rotation restricting members 68 coming into contact with the locking portions 60A of the inner plug 60 at the engagement operation positions of the locking channels 61g and preventing them from rotating toward the corresponding attachment/detachment channel 61f side, are formed on the peripheral portion around the opening of the plug attaching port 61D of the short pipe 61, at positions corresponding to the boundaries between the locking channels 61g and the attachment/detachment channels 61f.

A tapered guide surface 60b for attachment guidance, whose diameter decreases in the downward direction, is formed on the tip portion of the outer circumferential surface 60a of the inner plug 60, and a seal attachment groove to which an O-ring (an example of a seal material) 66 is to be attached, that O-ring 66 sealing the inner circumferential surface 61e of the plug attaching port 61D and the outer circumferential surface 60a of the inner plug 60 such that a watertight state is achieved, is formed on a parallel outer circumferential surface part located between the tapered guide surface 60*b* and the locking portions 60A, and also, a screw hole 60*c* to which a male thread portion 75*a* formed at the tip of an operation rod 75 for collecting the inner plug 60, which will be described later, is to be screwed and coupled, is formed in a central portion of the inner plug 60.

The attachment jig E is configured by forming a cylindrical member 72 that is provided with the coupling flange portion 71 having the same outline as the coupling flange portion 61B of the short pipe 61, integrally with the lower surface of the second pressing member 70 having the same function as the pressing member 21.

A coupling target portion 70*a* that is to be detachably coupled to the coupling portion 51 on the elevation transport means D side is formed on a central portion of the second pressing member 70, and a tapered surface 70*b* for pressing and fixing the coupling inner fitting portion 61A of the short pipe 61 to the coupling outer fitting portion 2A of the valve body 2 in a watertight state by horizontally coming into contact with the tapered pressing surfaces 36*a* of the push-on bolts 36 of the second pressing jig C2 is formed on an outer peripheral portion of the upper surface of the second pressing member 70.

Also, as shown in FIG. 16, bolt insertion holes 70*c* for the bolts 26 of the first pressing jig C1 are formed in the second pressing member 70, and bolt insertion holes 71*a* for the bolts 65 of the short pipe 61 are formed in the coupling flange portion 71.

Furthermore, as shown in FIG. 10, FIGS. 11A to 11C, and FIG. 16, the protruding engaging portion 73 and the recessed engaged portion 74 are respectively formed at opposing positions, namely two positions on the inner circumferential surface of the cylindrical case valve body 30 of the second attachment B2 that are aligned in the radial direction that passes through the center point of the inner circumferential surface, and two positions in the outer periphery of the second pressing member 70 of the attachment jig E that are aligned in the radial direction that passes through the center point of the outer periphery. The protruding engaging portions 73 and the recessed engaged portions 74 engage with each other in the vertical direction only when the attachment jig E and the short pipe 61, which are moved down by the elevation transport means D, are in a set orientation, and move and guide the second pressing member 70 to the inside of the cylindrical case valve body 30 of the second attachment B2 such that the second pressing member 70 is not relatively rotatable.

When feeding the short pipe 61 toward the valve body 2 side using the elevation transport means D, the engaging portion 73 and the engaged portion 74 provided at opposing parts on the second pressing member 70 and the inner circumferential surface of the cylindrical case valve body 30 of the second attachment B2 engage with each other in the vertical direction only when the attachment jig E to be moved down by the elevation transport means D and the short pipe 61 are in a set orientation, and the second pressing member 70 can be guided to the inside of the cylindrical case valve body 30 of the second attachment B2 so as to be not relatively rotatable. Therefore, the short pipe 61 can be accurately and smoothly attached to the valve body 2 in a set coupling orientation.

Figure 19:
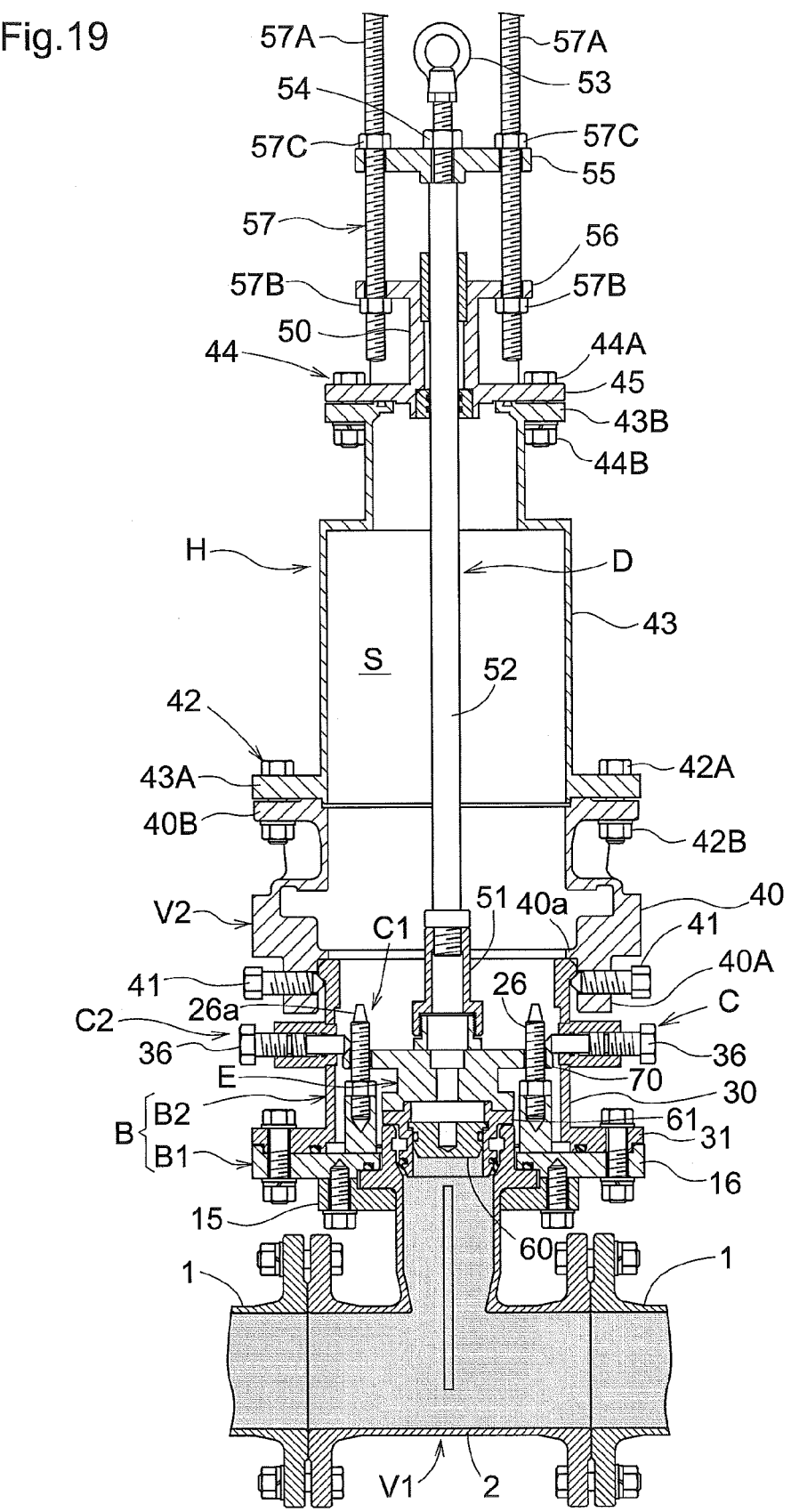
FIG. 19 is a vertical cross-sectional view at the time an operation has been made to lower the elevation transport means and the short pipe has been attached to a valve body.

[7] FIG. 19 shows the step of performing an operation to open the disc 39 of the work open/close valve V2, attaching the short pipe 61 to the valve body 2 using the elevation transport means D, and pressing and fixing the short pipe 61 to the valve body 2 in a sealed state using the second pressing jig C2 provided for the second attachment B2 of the attachment B.

Specifically, FIG. 19 shows the step of, after performing an operation to open the disc 39 of the work open/close valve V2, performing an operation to fasten the second nuts 57C of the screw-type forcible feeding mechanisms 57 of the elevation transport means D, lowering the short pipe 61 inside the storage space S of the work housing H toward the valve body 2 side together with the elevation shaft 52, and fitting and connecting the coupling inner fitting portion 61A of the short pipe 61 to the coupling outer fitting portion 2A of the valve body 2.

In this regard, the tip portions 26*a* of the bolts 26 of the first pressing jig C1 are formed as tapered insertion guide portions, and therefore, when the short pipe 61 is fed to the valve body 2 side using the elevation transport means D, the coupling inner fitting portion 61A of the short pipe 61 can be smoothly fitted to the coupling outer fitting portion 2A of the valve body 2 in a set coupling orientation, due to the engagement of the insertion guide portions of the bolts 26 and the bolt insertion holes 70*c* of the second pressing member 70.

Next, upon an operation being made outside the cylindrical case valve body 30 to screw the push-on bolts 36 of the second pressing jig C2 inward in the radial direction, the tapered pressing surfaces 36*a* of the push-on bolts 36 horizontally come into contact with the tapered surface 70*b* formed on the outer peripheral portion of the second pressing member 70, and press and fix the coupling inner fitting portion 61A of the short pipe 61 to the coupling outer fitting portion 2A of the valve body 2 in a watertight state.

Figure 20:
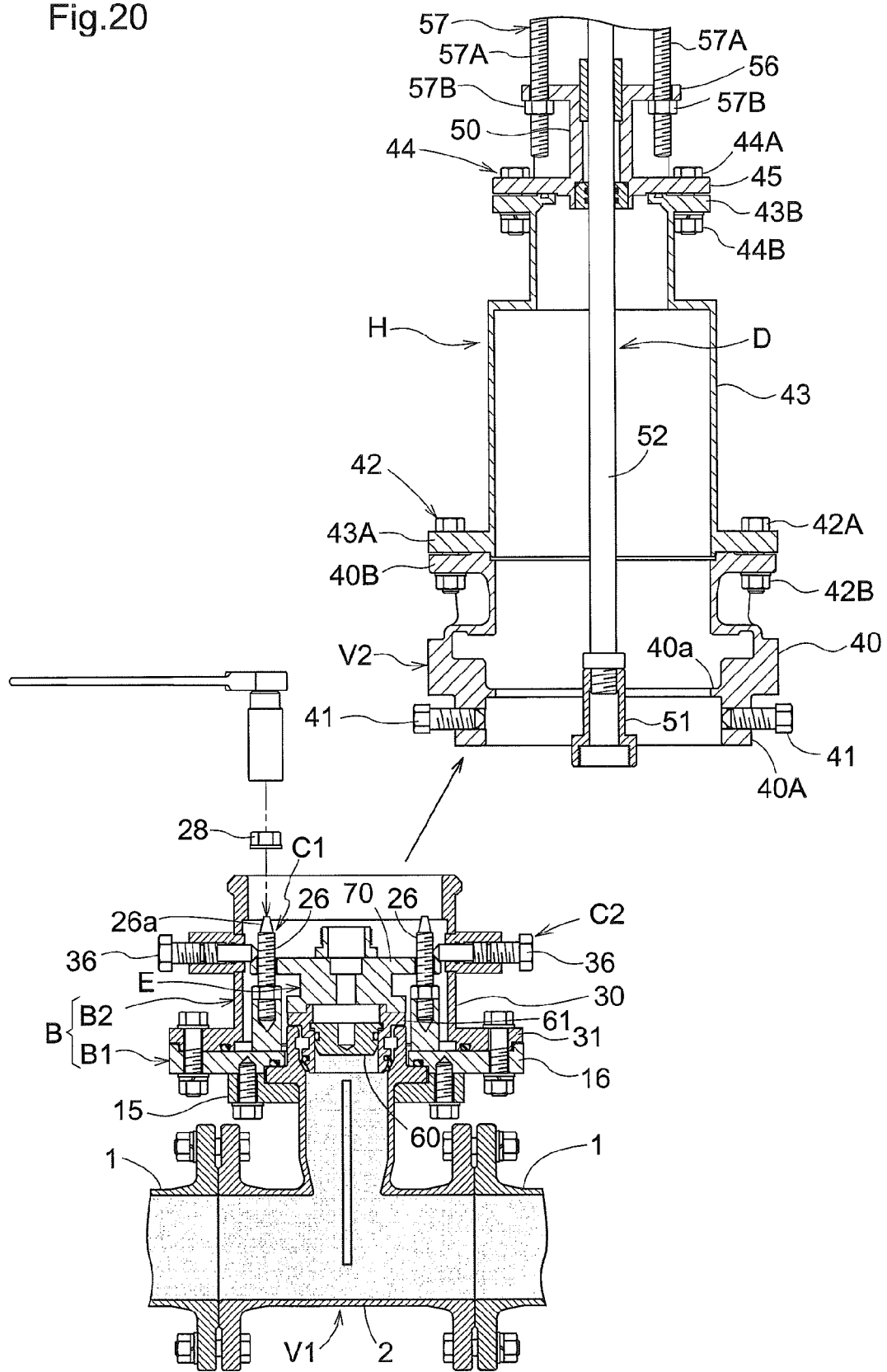
FIG. 20 is a vertical cross-sectional view at the time the work housing is to be removed.

[8] FIG. 20 and FIG. 21 show the step of removing the work housing H provided with the work open/close valve V2 and the elevation transport means D from the attachment B, pressing and fixing the short pipe 61 to the valve body 2 in a sealed state by using the first pressing jig C1 provided for the first attachment B1 of the attachment B, and releasing the pressing and fixing of the short pipe 61 by the push-on bolts 36 of the second pressing jig C2.

Specifically, the pulling bolts 41 provided for the fitting attachment cylinder portion 40A of the valve case 40 of the work open/close valve V2 are operated to be unscrewed to an unfixing position that is separated from the lower tapered surface 30*b* of the ring-shaped protrusion 30*a* of the cylindrical case valve body 30 of the second attachment B2 outward in the radial direction, and the work housing H is suspended and transported from the cylindrical case valve body 30 of the second attachment B2 to a predetermined removal position using a crane or the like.

Next, the push-on nuts 28 are screwed to the bolts 26 of the first pressing jig C1 via the upper opening of the cylindrical case valve body 30 of the second attachment B2, the push-on nuts 28 are operated to be fastened using a tool such as a socket wrench, and the coupling inner fitting portion 61A of the short pipe 61 is pressed and fixed to the coupling outer fitting portion 2A of the valve body 2 in a watertight state.

In this state, the push-on bolts 36 of the second pressing jig C2 are unscrewed to an unfixing position that is separated from the tapered surface 70*b* formed on the outer peripheral portion of the second pressing member 70 outward in the radial direction, and the fixing by the second pressing jig C2 is released.

Figure 22:
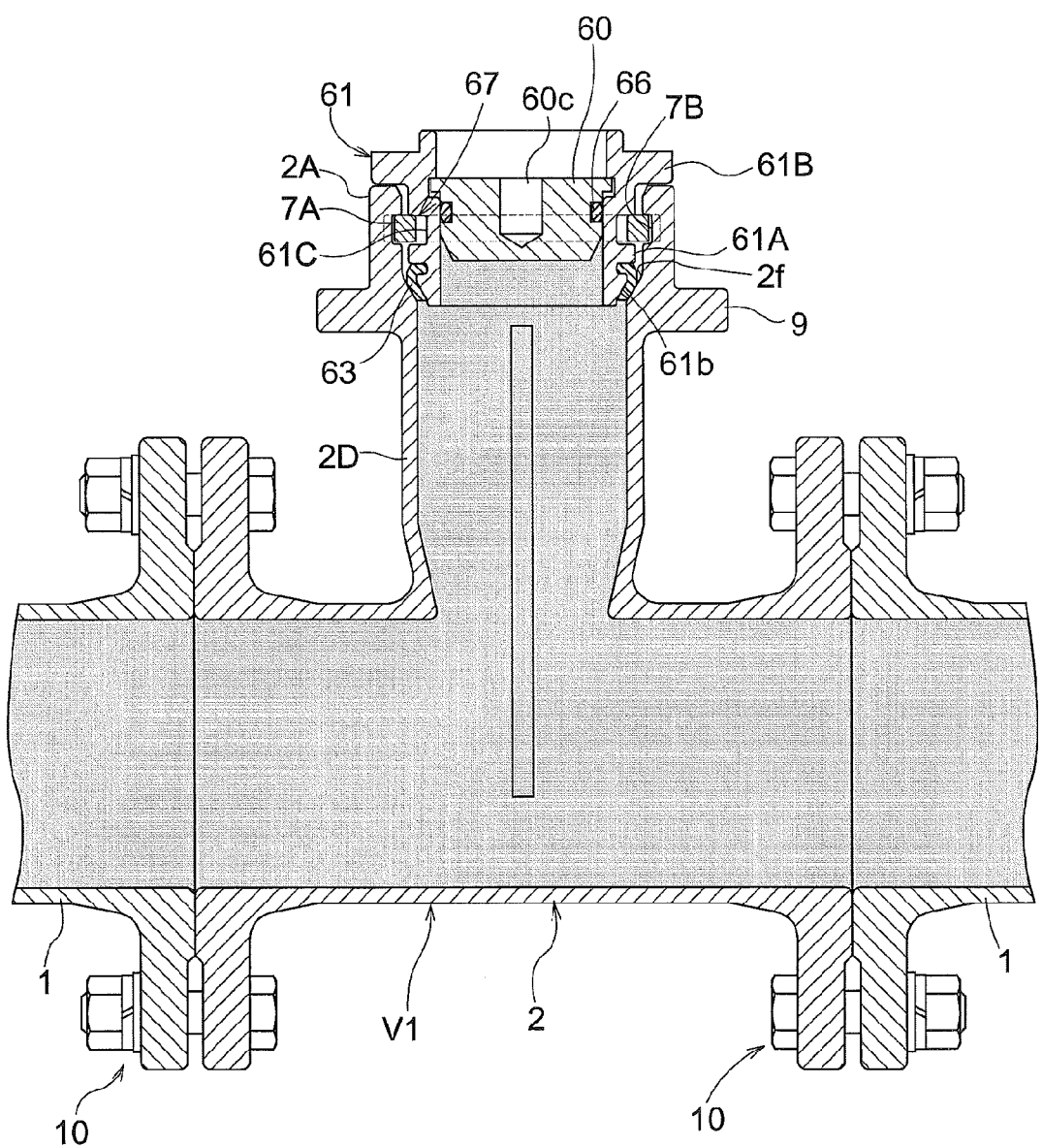
FIG. 22 is a vertical cross-sectional view at the time an attachment has been removed.

[9] FIG. 21 and FIG. 22 show the step of coupling and fixing the short pipe 61 and the valve body 2, which have been pressed and fixed to each other by the first pressing jig C1 of the pressing means C via the attachment jig E, to each other by using a second coupling means 67 such that a sealed state is achieved, and thereafter removing the attachment B provided with the pressing means C from the valve body 2.

The second coupling means 67 utilizes the plate-shaped lock members 7A that are each formed to have an approximately squared U shape in plan view and the outer engagement holes (outer engaged portions) 7B that are respectively formed to penetrate the wall portions of the coupling outer fitting portion 2A of the valve body 2 that oppose each other in the long-side direction, out of the constituent elements of the lock means 7, and is configured by forming the inner engagement recessed portions (inner engaged portions) 61C that engage with the lock members 7A inserted from the outer engagement holes 7B of the coupling outer fitting portion 2A of the valve body 2, respectively in the outer surfaces of the wall portions of the coupling inner fitting portion 61A of the short pipe 61 that oppose each other in the long-side direction.

Then, as shown in FIG. 21 and FIG. 22, when the lock members 7A are in the locked state in which the lock members 7A are engaged with the outer engagement holes 7B of the coupling outer fitting portion 2A of the valve body 2 and the inner engagement recessed portion 61C of the coupling inner fitting portion 61A of the short pipe 61, the gasket 63 is compressed to the extent in which a watertight state (sealed state) is achieved between the tapered surface 61b of the coupling inner fitting portion 61A of the short pipe 61 and the tapered surface 2f of the coupling outer fitting portion 2A of the valve body 2, and therefore the resilient recovery force of the gasket 63 acts as the removal resistance (the insertion and removal resistance) of the lock member 7A, and the lock member 7A is maintained in the locked state.

In the step of removing the attachment B from the valve body 2, the bolts 17A of the second fastening means 17 that couple and fix the lower base member 15 and the upper base member 16 of the first attachment B1 to each other are unfixed, and the upper base member 16, the cylindrical case valve body 30 of the second attachment B2, the attachment jig E, and so on located above the protruding portion 9 of the valve body 2 are removed.

The lower base member 15 located below the protruding portion 9 of the valve body 2 is removed by unfixing the bolts 18A and the nuts 18B of the third fastening means 18 that couple and fix the two lower divisional plate portions 15A to each other.

[10] The work using the method for bonnet removal is complete in this state.

If it becomes necessary to install a repair valve V3 and an air valve V4 to the short pipe 61 at the end of removal of the attachment B or after the removal, installation work is performed according to the following procedures.

Figure 23:
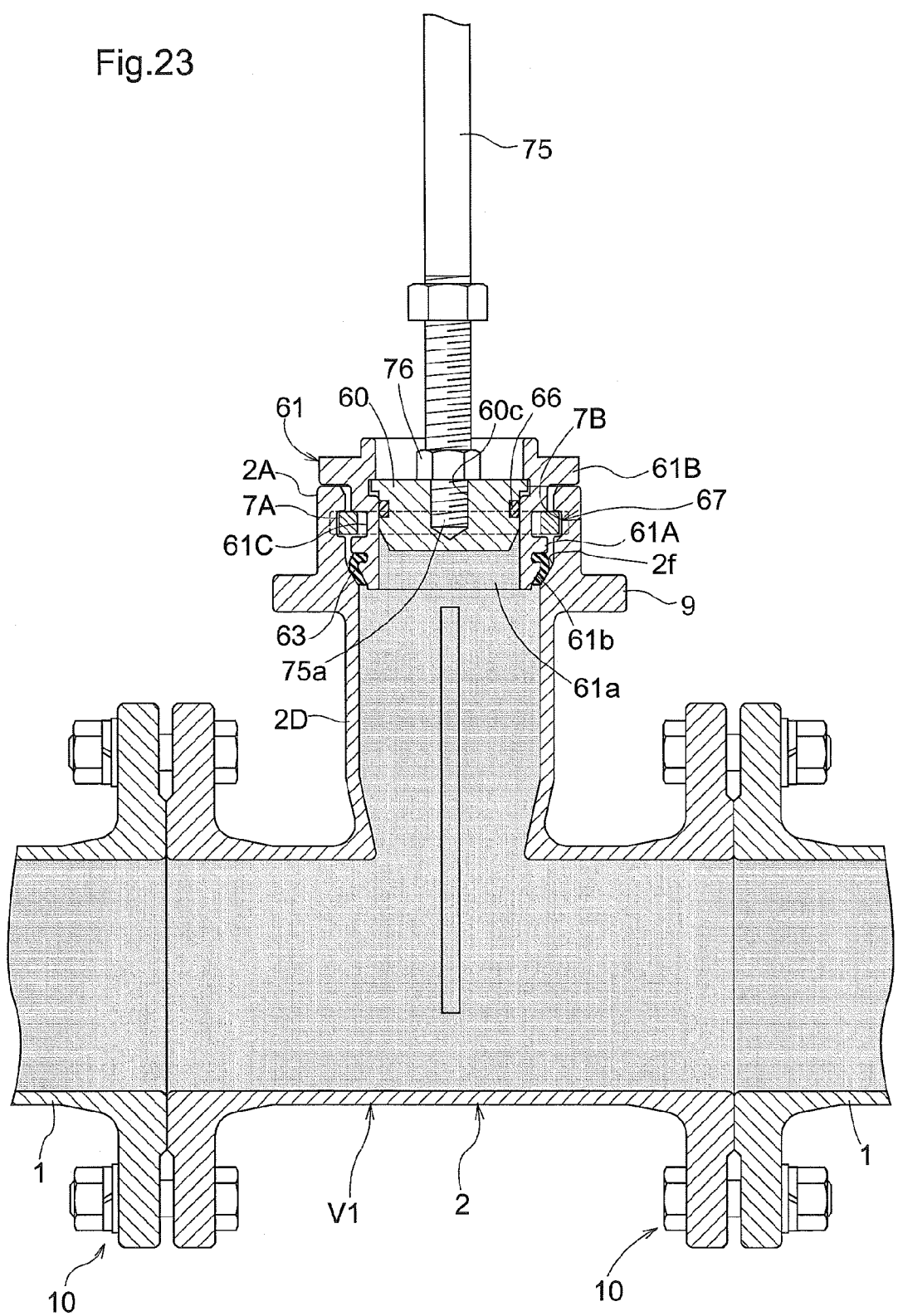
FIG. 23 is a vertical cross-sectional view at the time an operation shaft has been attached to the inner plug.

[11] FIG. 23 shows the step of attaching the operation rod 75 to the inner plug 60 that blocks the flow channel 61a of the short pipe 61 in a watertight state.

In this step, the male thread portion 75a formed at the tip of the operation rod 75 is screwed into the screw hole 60c of the inner plug 60, and a lock nut 76 that has been screwed to the male thread portion 75a in advance is fastened in a locking state so as to achieve a configuration in an integrated state in which the rotational operation force and the pulling operation force of the operation rod 75 in the axial direction are reliably transmitted to the inner plug 60.

Figure 24:
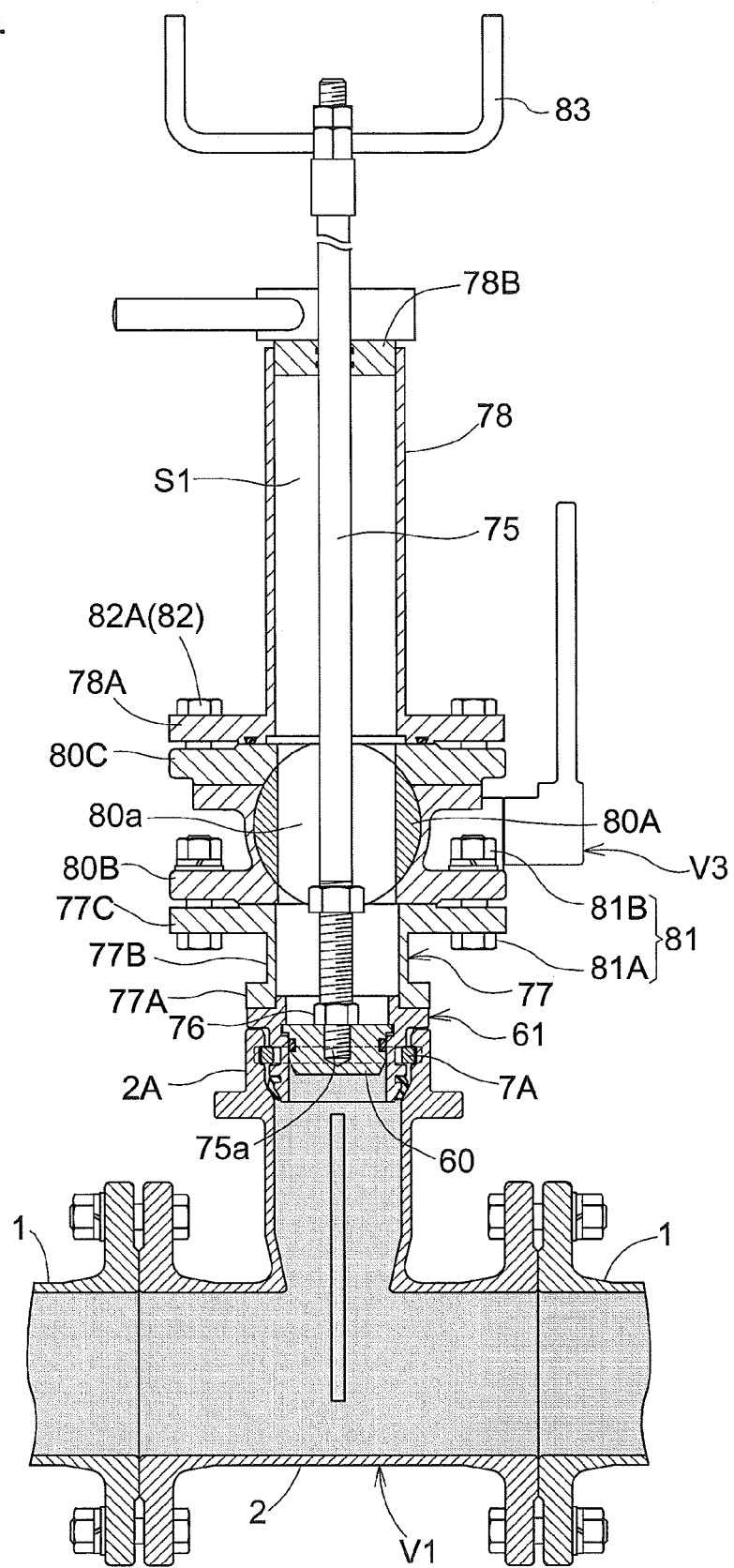
FIG. 24 is a vertical cross-sectional view at the time the second short pipe, a repair valve, and a work case have been attached.

[12] FIG. 24 shows the step of coupling and fixing the repair valve V3, which is provided with a spherical disc 80A through which a flow channel 80a is formed to penetrate so as to allow the inner plug 60 to pass through, to the second short pipe 77, to which the short pipe 61 is coupled and fixed in a watertight state, so as to achieve a watertight state, and the step of coupling and fixing a work case 78, in which the inner plug 60 can be housed, to the repair valve V3, in a watertight state.

As shown in FIG. 16 and FIG. 24, the second short pipe 77 is integrally configured with: the lower flange portion 77A in which bolt insertion holes 77a for the bolts 65 of the short pipe 61 are formed; a short pipe portion 77B provided with a flow channel 77b that allows the inner plug 60 to pass through; and an upper flange portion 77C in which bolt insertion holes 77d for coupling and fixing to a lower flange portion 80B of the repair valve V3 using bolts 81A and nuts 81B of a seventh fastening means 81 are formed.

A lower flange portion 78A of the work case 78 is coupled and fixed to an upper flange portion 80C of the repair valve V3 by bolts 82A of an eighth fastening means 82, and the operation rod 75 penetrates through a top panel 78B of the work case 78 in a watertight state such that a rotational operation and a sliding operation in the axis direction can be performed.

An operation handle 83 is detachably attached to an upper end portion of the operation rod 75 that protrudes from the top panel 78B of the work case 78.

Also, in this state, the locking portions 60A respectively formed to protrude from two positions on the inner plug 60 in the circumferential direction are located within, and engage with, the locking channels 61g formed in the inner circumferential surface 61e of the plug attaching port 61O of the short pipe 61 in a retained state, and in this state, the inner circumferential surface 61e of the plug attaching port 61D of the short pipe 61 and the outer circumferential surface 60a of the inner plug 60 are sealed with the O-ring 66 in a watertight state.

Figure 25:
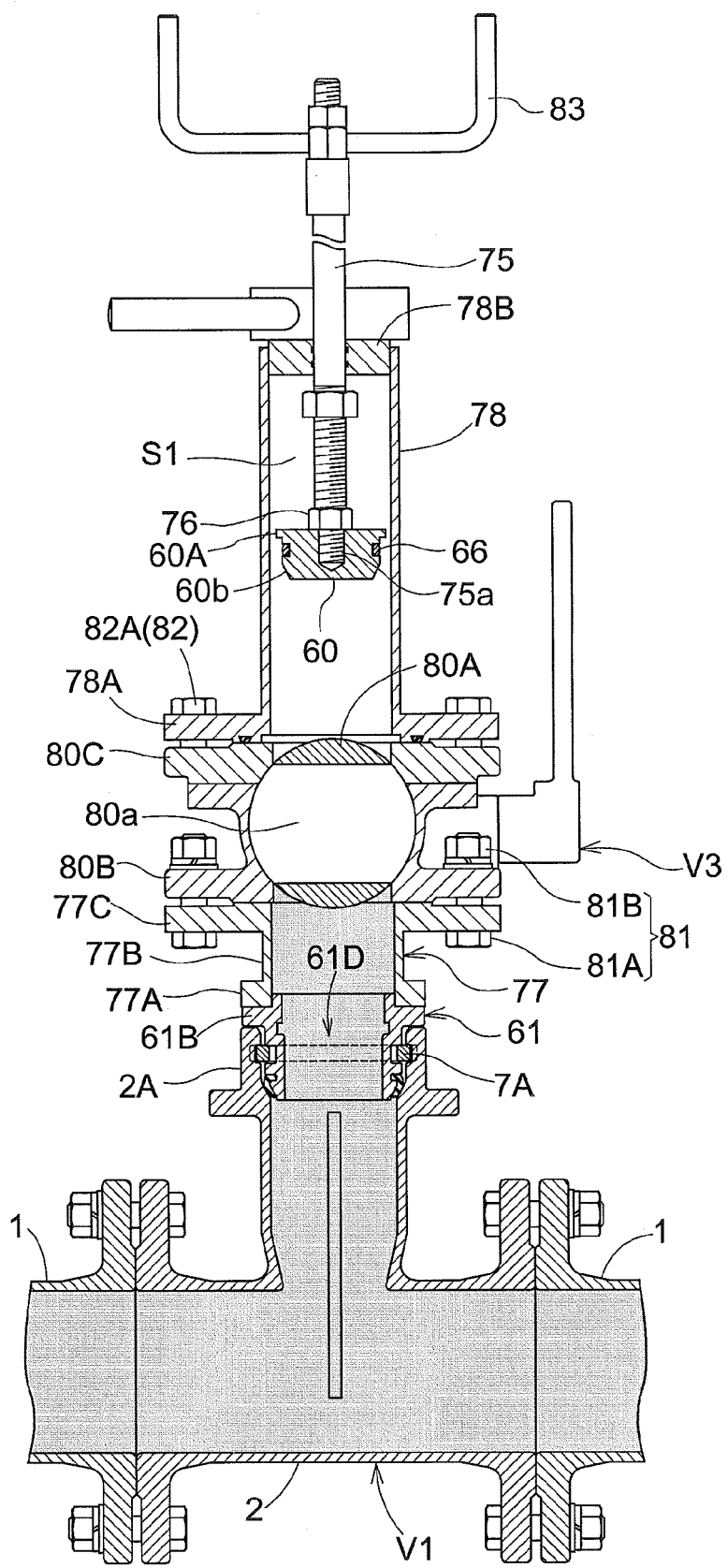
FIG. 25 is a vertical cross-sectional view at the time the inner plug has been collected to the inside of the work case.

[13] FIG. 25 shows the step of removing the inner plug 60 from the short pipe 61 using the operation rod 75 coupled to the inner plug 60 of the short pipe 61, and collecting the inner plug 60 thus removed, to the inside of a storage space S1 in the work case 78 via the repair valve V3 that has been operated to be open.

Specifically, upon an operation being made to rotate the operation rod 75, the two locking portions 60A of the inner plug 60 located in the locking channels 61g in the inner circumferential surface 61e of the plug attaching port 61D of the short pipe 61 are moved to the attachment/detachment channels 61f in the inner circumferential surface 61e of the plug attaching port 61D, and upon an operation being made to pull the operation rod 75 along the axial direction in this state, the two locking portions 60A of the inner plug 60 are moved along the attachment/detachment channels 61f and removed from the short pipe 61 to the inside of the flow channel 77b of the second short pipe 77, and the inner plug 60 is collected to the inside of the storage space S1 of the work case 78 via the flow channel 80a of the repair valve V3.

[14] FIG. 26 shows the step of performing an operation to close the repair valve V3 and removing the work case 78 in which the inner plug 60 has been collected, and thereafter installing the air valve V4 to the repair valve V3.

Specifically, an operation is performed to unfix the bolts 82A of the eighth fastening means 82 that couple and fix the upper flange portion 80C of the repair valve V3 and the lower flange portion 78A of the work case 78 to each other, the work case 78 in which the inner plug 60 has been collected is removed, and thereafter a coupling flange portion 84 of the air valve V4 is coupled and fixed to the upper flange portion 80C of the repair valve V3 in a watertight state using the bolts 82A of the eighth fastening means 82.

Note that although the pressing member 21 and the second pressing member 70 in the embodiment above are configured to have different shapes, the pressing member 21 and the second pressing member 70 may be formed to have the same shape so that the pressing member 21 also serves as the second pressing member 70.

Second Embodiment

Figures 27, 28:
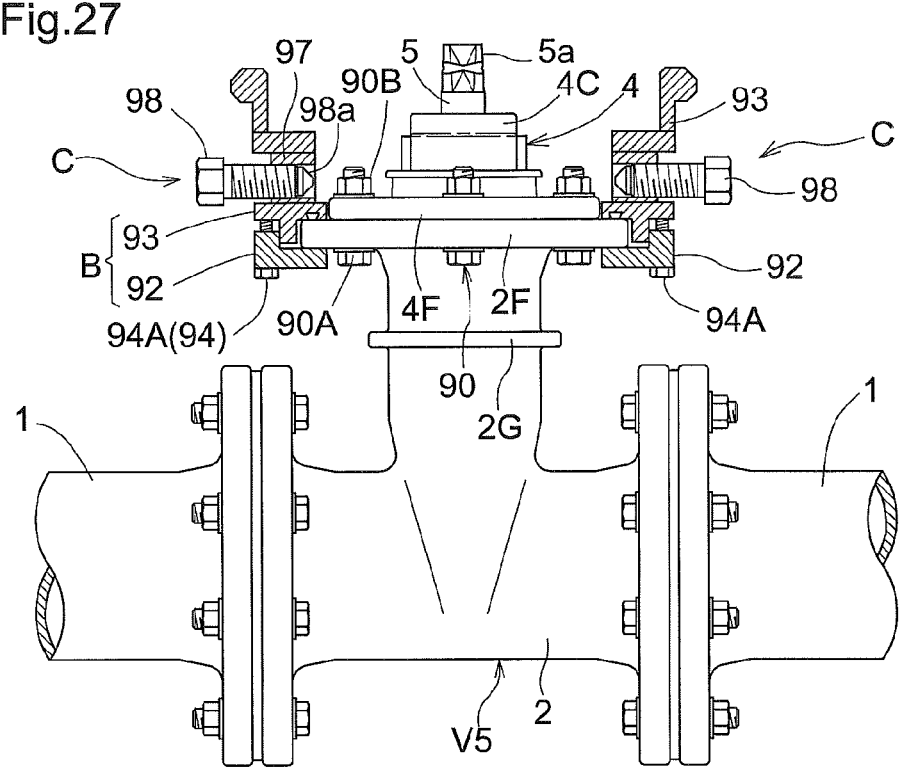
FIG. 27 is a partially cut-out side view at the time an attachment showing a second embodiment of the present invention is to be attached.
FIG. 28 is a partially cut-out side view at the time the bonnet is pressed and fixed using a pressing means.

FIG. 27 and FIG. 28 show a method for removing the bonnet of a gate valve V5 in which the coupling means for detachably coupling and fixing the bonnet 4 to the valve body 2 is configured with bolts 90A and nuts 90B of a ninth fastening means 90.

In the gate valve V5, bolt insertion holes are formed in a first coupling portion (an example of a locking stepped portion) 2F that is formed to protrude on an peripheral portion of the opening of the disc attaching port 3 (not shown) of the valve body 2, bolt insertion holes are also formed in a second coupling portion 4F that is located on the bonnet 4 side and that can be joined to the first coupling portion 2F of the valve body 2 in the vertical direction, and the first coupling portion 2F of the valve body 2 and the second coupling portion 4F of the bonnet 4 are coupled and fixed to each other in a watertight state by a fastening operation using the bolts 90A and the nuts 90B.

In the method for removing the bonnet of the gate valve V5 as well, in the same manner as in the first embodiment, although not shown in the drawings, the work housing H, which is provided with the work open/close valve V2 and the elevation transport means D that is to be coupled to the bonnet 4, is attached to the attachment (an example of a bonnet removal attachment) B that is detachably fixed to the valve body 2 so as to surround the outer peripheral side of the bonnet 4, the work target part of the gate valve V5 is thus sealed, the bonnet 4 is removed from the valve body 2 without stopping the flow of water, and thereafter the short pipe 61 provided with the inner plug 60 is attached to the disc attaching port of the valve body 2 in a watertight state.

The short pipe 61 attached to the disc attaching port of the valve body 2 is coupled and fixed to the first coupling portion 2F of the valve body 2 in a watertight state, using the bolts 90A and the nuts 90B of the ninth fastening means 90 configured to also serve as the second coupling means.

The attachment B used in the method for removing the bonnet of the gate valve V5 is coupled and fixed to a ring shaped protruding part out of the first coupling portion 2F of the valve body 2, which protrudes further outward in the radial direction than the second coupling portion 4F of the bonnet 4, such that the attachment B surrounds part of the bonnet 4 including at least the second coupling portion 4F, specifically a range from the upper surface of the first coupling portion 2F to a position corresponding to an intermediate portion of the rotational operation portion 5a of the stem 5 in the vertical direction.

This attachment B is configured with: a lower attachment frame material 92 that has a dividable structure and that is to be pressed against the ring-shaped protruding portion of the first coupling portion 2F from below; a cylindrical case-shaped upper attachment frame material 93 that is to be pressed against the ring-shaped protruding portion of the first coupling portion 2F from above; and a tenth fastening means 94 that fixes these attachment frame materials 92 and 93 to the first coupling portion 2F clamped therebetween by fastening the attachment frame materials 92 and 93 while pulling them toward each other.

The tenth fastening means 94 is configured with: screw holes (not shown) that are respectively formed at a plurality of positions in the lower surface of the upper attachment frame material 93 in the circumferential direction; and bolts 94A that are screwed into the screw holes of the upper attachment frame material 93 from below via bolt insertion holes (not shown) that are formed in the lower attachment frame material 92.

The second coupling portion 4F of the bonnet 4 is pressed and fixed to the first coupling portion 2F of the valve body 2 in a watertight state using the pressing means C provided for the upper attachment frame material 93 of the attachment B, via a third pressing member 95 that is detachably attached to the bonnet 4, and at the time of pressing and fixing with the pressing means C, the bolts 90A and the nuts 90B of the ninth fastening means 90 that couple and fix the first coupling portion 2F and the second coupling portion 4F to each other are removed.

Also, each bolt insertion hole of the first coupling portion 2F is prevented from allowing water to pass therethrough in the state of being pressed from the lower surface side by a pressing water stop means F that is attached at a position between the first coupling portion 2F of the valve body 2 and a ring-shaped protruding portion 2G that is formed on the outer surface of the vertically-oriented valve body portion 2D of the valve body 2.

The third pressing member 95 is configured with: a pressing cover portion 95A that is fitted onto the shaft bearing portion 4C of the bonnet 4 so as to be in contact with the shaft bearing portion 4C from above; a ring-shaped flange portion 95B that is provided continuously with the lower end of the pressing cover portion 95A so as to be in contact with the upper surface of the second coupling portion 4F of the bonnet 4; and a coupling target portion 95C that has the shape of a threaded cylinder having an inner diameter allowing the rotational operation portion 5a of the stem 5 to protrude therefrom, and that is detachably screwed and coupled to the female thread of the coupling portion 51 (not shown) on the side of the elevation transport means D that transports, for example, the bonnet 4 provided with the disc 6 (not shown) and the stem 5 upward and downward.

Stopper screws 96, which are examples of a fixing means that fastens the pressing cover portion 95A of the third pressing member 95 and the shaft bearing portion 4C of the bonnet 4 to each other while acting against the load of the bonnet 4 that is provided with the disc 6 and the stem 5 and is suspended by the elevation transport means D, are provided at a plurality of positions in the peripheral wall portion of the pressing cover portion 95A of the third pressing member 95 in the circumferential direction.

The pressing means C is configured by: fixing threaded cylinders 97, which are in communication with the inner space of the upper attachment frame material 93, to a plurality of positions in the circumferential direction (four positions in the present embodiment) on an intermediate portion of the upper attachment frame material 93 in the vertical position such that their screw axes are located on the horizontal axis that passes through the upper surface of the flange portion 95B of the third pressing member 95 or the vicinity thereof; and screwing push-on bolts 98, which are each provided with a tapered pressing surface 98a that horizontally comes into contact with a tapered surface formed on the outer peripheral portion on the upper surface side of the flange portion 95B of the third pressing member 95, to each threaded cylinder 97.

Upon an operation being performed to screw the plurality of push-on bolts 98 of the pressing means C, the pressing means C strongly presses the third pressing member 95 toward the second coupling portion 4F of the bonnet 4 at the contact points of the tapered pressing surfaces 98a of the push-on bolts 98 and the tapered surface of the flange portion 95B of the third pressing member 95, and furthermore, the second coupling portion 4F of the bonnet 4 strongly presses the first coupling portion 2F of the valve body 2. Therefore, in a state where the third pressing member 95 is strongly pressed and fixed by the pressing means C, the gasket (not shown) inserted between the second coupling portion 4F of the bonnet 4 and the first coupling portion 2F of the valve body 2 can be reliably maintained in a compressed, watertight state even when the pressing force of the bolts 90A and the nuts 90B of the ninth fastening means 90 is released.

The pressing water stop means F that is to be attached after the ninth fastening means 90 is removed, is provided with: a clamp ring 100 that has a dividable structure and clamps and is fixed to a protruding portion 2E of the valve body 2; a water stop pressing ring 101 that has the same dividable structure as the clamp ring 100; and water stop operation bolts 102 that are screwed into parts of the water stop pressing ring 101 corresponding to the bolt insertion holes of the first coupling portion 2F of the valve body 2, and that can be respectively fitted into the bolt insertion holes. The pressing water stop means F is configured such that the upper surface of the water stop pressing ring 101 is pressed to and brought into contact with the lower surface of the first coupling portion 2F of the valve body 2 according to an operation to rotate and move each water stop operation bolt 102 toward the pressing side in a state where a head portion 102a of each water stop operation bolt 102 is placed on the upper surface of the clamp ring 100.

Third Embodiment

As shown in FIG. 26, in a water piping system in which the repair valve V3 and the air valve V4 are installed to the valve body 2 via the short pipe 61 and the second short pipe 77, if it becomes necessary to remove the air valve V4 and the repair valve V3 without stopping the flow of water and to close the plug attaching port 61D of the short pipe 61 fitted to the disc attaching port 3 of the valve body 2 with the inner plug 60 such that a watertight state is achieved, a valve removal method including the following steps [15] to [19] is performed.

[15] The step of performing an operation to close the repair valve V3 and removing the air valve V4.

In this removal step, the bolts 82A of the eighth fastening means 82 that couple and fix the upper flange portion 80C of the repair valve V3 and the coupling flange portion 84 of the air valve V4 to each other are removed.

[16] The step of providing the operation rod 75, which can be operated to rotate and to slide in the axial direction, so as to penetrate the repair valve V3, and attaching the work case 78, in which the inner plug 60 is attached to the tip of the operation rod 75 located within the storage space S1, to the repair valve V3, as shown in FIG. 25.

In this step, the male thread portion 75a formed at the tip of the operation rod 75 is screwed into the screw hole 60c of the inner plug 60, and the upper flange portion 80C of the repair valve V3 and the lower flange portion 78A of the work case 78 are coupled and fixed to each other in a watertight state using the bolts 82A of the eighth fastening means 82.

[17] The step of performing an operation to open the repair valve V3, and attaching the inner plug 60 located within the storage space S1 of the work case 78 to the plug attaching port 61D of the short pipe 61 by operating the operation rod 75, as shown in FIG. 24.

In this step, an operation is performed to push the operation rod 75 along the axial direction, the two locking portions 60A of the inner plug 60 are fitted into the attachment/detachment channels 61f in the inner circumferential surface 61e of the plug attaching port 61D of the short pipe 61, an operation is performed to rotate the operation rod 75 such that the two locking portions 60A of the inner plug 60 transit from the attachment/detachment channels 61f to the locking channels 61g at the positions in the attachment/detachment channels 61f corresponding to the locking channels 61g, and the inner plug 60 is fitted to the plug attaching port 61D of the short pipe 61 in a watertight state.

[18] The step of removing the second short pipe 77, the repair valve V3, and the work case 78 from the short pipe 61, as shown in FIG. 23.

In this step, the operation handle 83 attached to the upper end portion of the operation rod 75 is removed, and the second short pipe 77, the repair valve V3 and the work case 78 are removed all at once, or removed one by one in the order beginning with the work case 78.

[19] The step of performing an operation to loosen the lock nut 76 of the operation rod 75, releasing the screw coupling of the male thread portion 75a at the tip of the operation rod 75 and the screw hole 60c of the inner plug 60, and removing the operation rod 75 from the inner plug 60, as shown in FIG. 23 and FIG. 22.

Note that, as appropriate, a covering body that covers the outer side of the inner plug 60 at the plug attaching port 61D is attached and fixed to the short pipe 61 in a watertight state, using a bolt.

In the embodiments above, a description is given of the valve removal method for the case where the repair valve V3 is coupled and fixed to the short pipe 61 via the second short pipe 77. However, this valve removal method is also applicable to the case where the repair valve V3 is coupled and fixed directly to the short pipe 61, and the case where only the repair valve V3 is coupled and fixed via the short pipe 61 or the second short pipe 77 that is coupled and fixed to the short pipe 61.

Also, after the second short pipe 77, the repair valve V3, and the air valve V4 coupled and fixed to the short pipe 61 are removed, a new gate valve V1 may be built by performing the method for removing the bonnet of the gate valve according to the first embodiment in the reverse order, to attach the bonnet 4 provided with the disc 6 and the stem 5 to the valve body 2, without stopping the flow of water.

Furthermore, in a fluid device other than the valve body 2 of the gate valve V1, for example a fluid device such as a split T-shaped joint to which the short pipe 61 is coupled and fixed in a watertight state, in the case where the repair valve V3 is coupled and fixed via the short pipe 61 or the second short pipe 77 coupled and fixed thereto, the above-described bonnet removal method can be applied.

Fourth Embodiment

Figure 29:
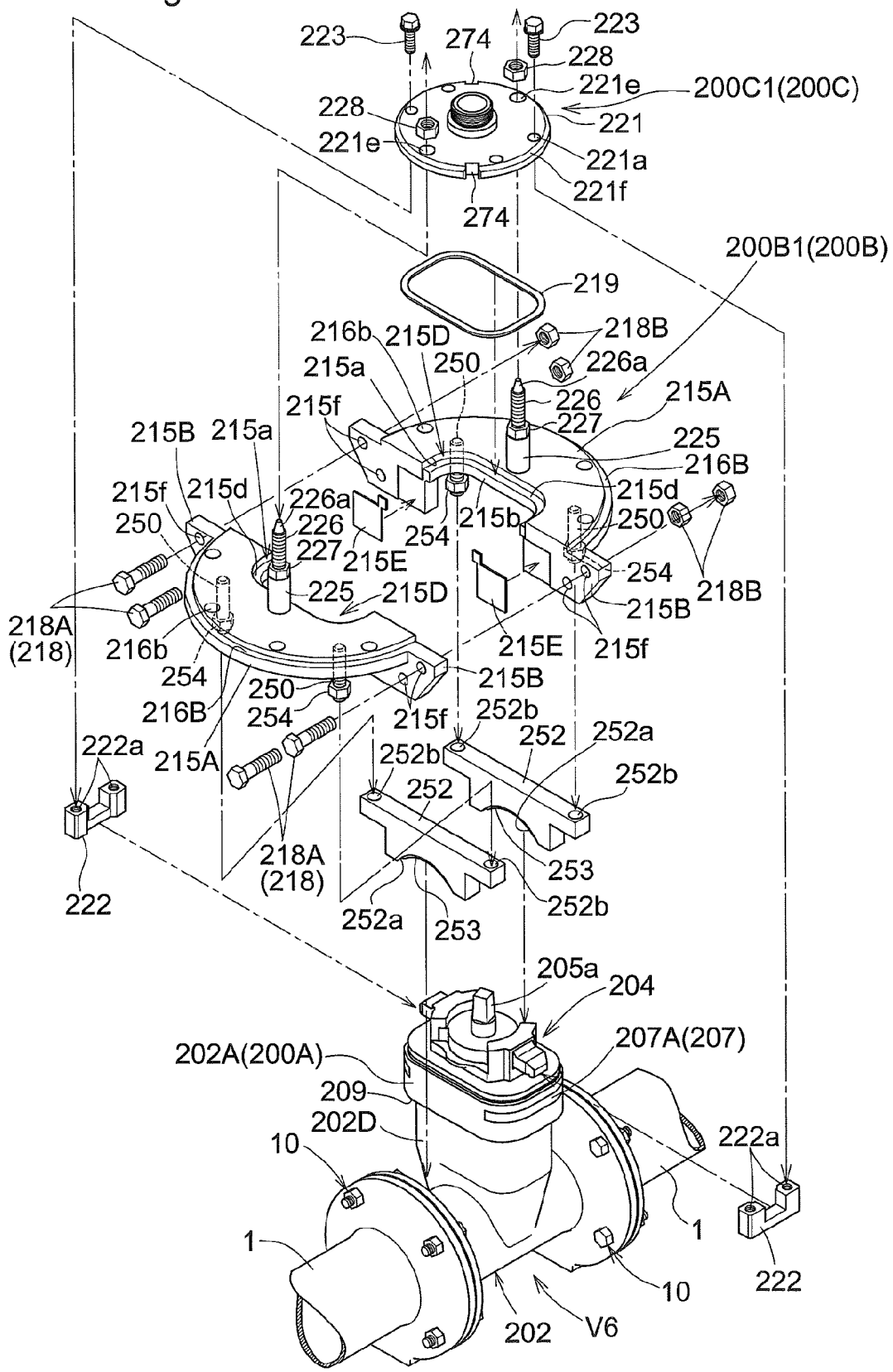
FIG. 29 is an exploded perspective view at the time a first attachment showing a fourth embodiment of the present invention is to be attached.
Figure 30:
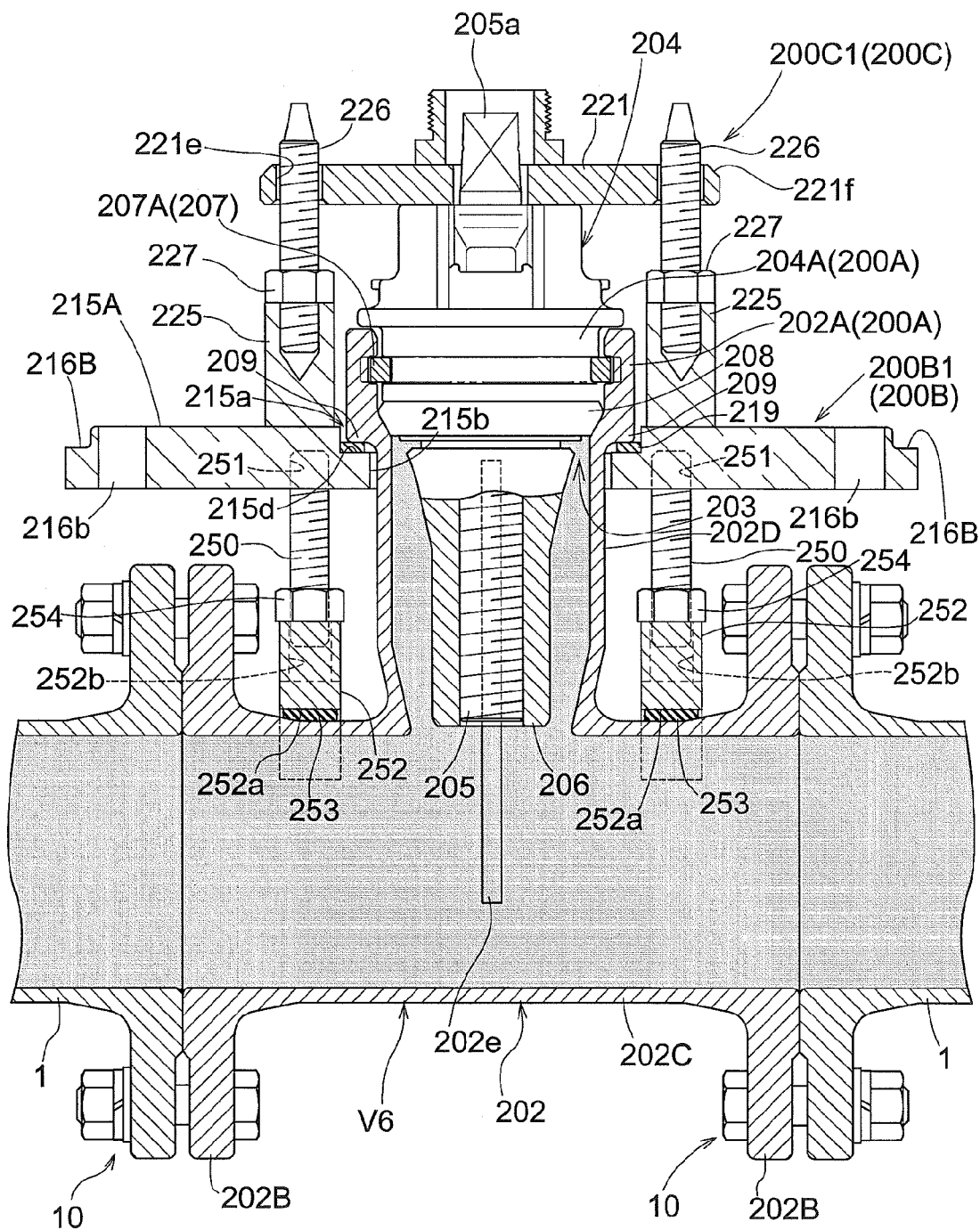
FIG. 30 is a vertical cross-sectional view at the time the first attachment has been attached.
Figure 31:
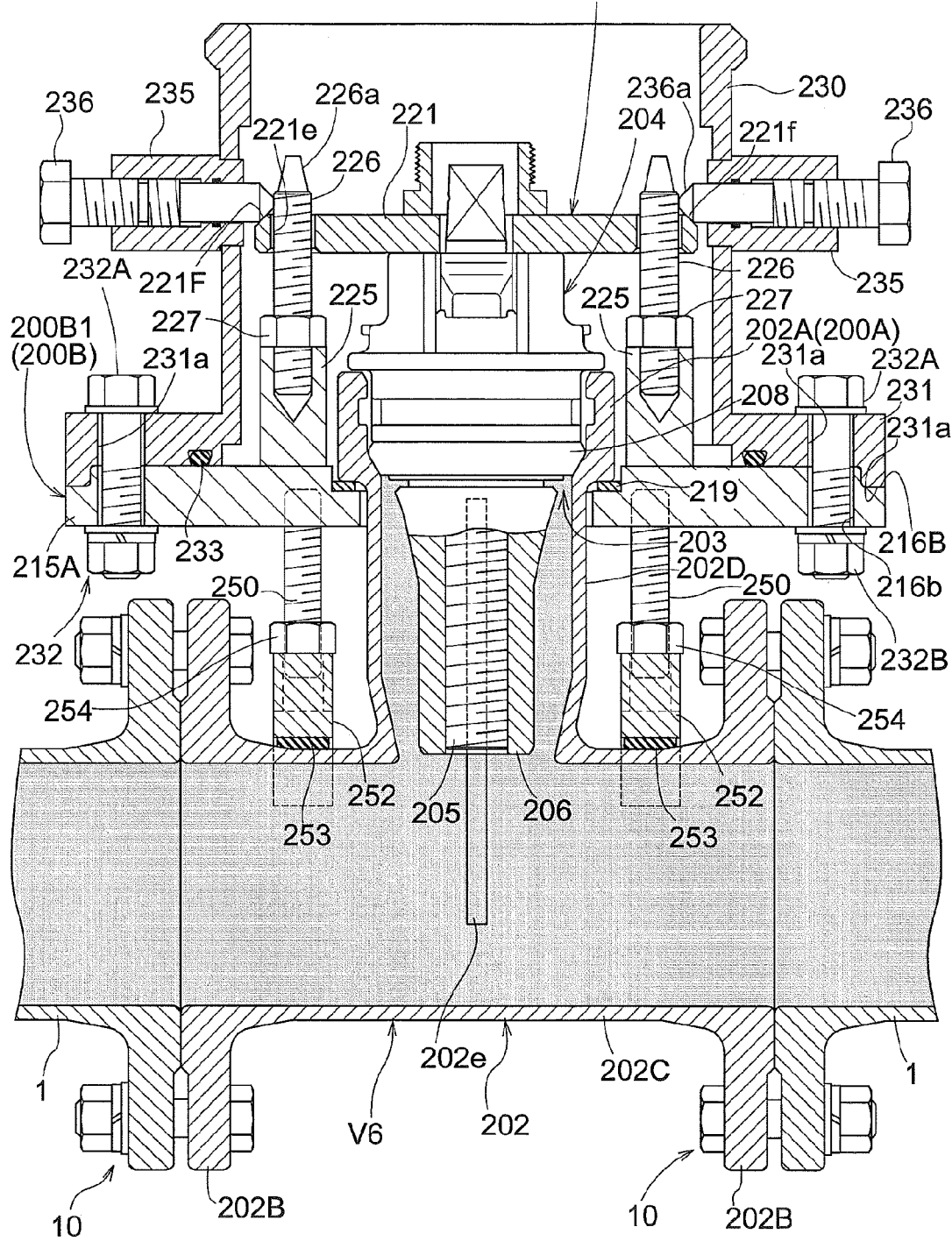
FIG. 31 is a vertical cross-sectional view at the time the second attachment has been attached.

FIG. 29 to FIG. 31 show a bonnet removal method for removing a bonnet 204 of a gate valve V6 having a configuration that is slightly different from that of the gate valve V1 according to the first embodiment by using an attachment 200B having a configuration that is slightly different from that of the attachment B according to the first embodiment.

The gate valve V6 is provided with a valve body 202, a disc attaching port 203, the bonnet 204, a stem 205, and a disc 206 which have basically the same configurations as those of the gate valve V1 in the first embodiment. The gate valve V6 has a lock means 207 that is an example of a coupling means for coupling and fixing the valve body 202 and the bonnet 204 to each other so as to be detachable, that includes a pair of lock members 207A that can be externally and laterally inserted into and removed from a coupling outer fitting portion (coupling portion) 202A on the valve body 202 side and a coupling inner fitting portion (coupling target portion) 204A on the bonnet 204 side, which constitute a fitting coupling portion 200A of the valve body 202 and the bonnet 204, and that, in an engaged state where the lock members 207A are inserted, couples and fixes the valve body 202 and the bonnet 204 to each other such that a watertight state is achieved.

Also, a ring-shaped locking stepped portion (an example of a locking stepped portion) 209 that has an approximately L shape in a vertical cross-sectional view is formed on the outer surface (outer circumferential surface) of the valve body 202 of the gate valve V6. Specifically, the ring-shaped locking stepped portion 209 is formed as a ring-shaped locking stepped portion 209 that has an approximately L shape such that the outer surface of the coupling outer fitting portion 202A of the valve body 202 is formed to protrude further outward than a vertically-oriented valve body portion 202D along the entire circumference, and an outer portion on the lower end side of the coupling outer fitting portion 202A extends approximately horizontally and approximately vertically. Therefore, the ring-shaped locking stepped portion 209 is formed on a lower end part of the outer surface of the coupling outer fitting portion 202A, which is displaced downward from an insertion/removal operation position for the lock members 207A. In the fourth embodiment, the protruding portion (an example of a locking stepped portion) 9 according to the first embodiment is not provided on the outer surface of the coupling outer fitting portion 202A of the valve body 202, and the outer surface of the coupling outer fitting portion 202A is formed to have the shape of a straight line that extends approximately vertically in a vertical cross-sectional view.

FIG. 29 shows, from among attachment attaching steps by which the attachment 200B that surrounds the outer circumferential surface side of the bonnet 204 is detachably fitted onto and fixed to the valve body 202, the step of fixing a first attachment 200B1 in the state of being pressed from below, which constitutes the lower side of the attachment 200B, to the ring-shaped locking stepped portion 209 that is formed integrally with the lower end part of the coupling outer fitting portion 202A of the valve body 202, such that an operation to insert/remove the lock members 207A is allowed.

The attachment 200B is provided with: the ring-shaped first attachment 200B1 that has a dividable structure and that is to be pressed against and detachably fixed to the ring-shaped locking stepped portion 209 on the coupling outer fitting portion 202A of the valve body 202 from below; and a ring-shaped second attachment 200B2 that is detachably coupled and fixed to the first attachment 200B1 so as to surround the outer peripheral side of the bonnet 204. The first attachment 200B1 is provided with a pressing means 200C for pressing and fixing a coupling inner fitting portion 204A of the bonnet 204 to the coupling outer fitting portion 202A of the valve body 202 such that a watertight state is achieved, via a pressing member 221 that is detachably attached to the bonnet 204. Note that the configuration of the pressing means 200C is approximately the same as the configuration of the pressing means C according to the first embodiment, and the pressing means 200C is provided with a first pressing jig 200C1 that is installed on the first attachment 200B1 side and a second pressing jig 200C2 that is installed on the second attachment 200B2 side as described below.

The first attachment 200B1 is integrally provided with: two divisional plate portions 215A that are divided from each other at a central position of the coupling outer fitting portion 202A of the valve body 202 in the short side direction and that has an approximately semi-circular shape in plan view; and coupling plate portions 215B that are each provided on either one of the two end portions of each divisional plate portion 215A so as to protrude downward.

A fitting recessed portion 215D that is to be fitted to a half area that has an approximately flat U shape and extends along one long side portion and halves of the two short side portions of the ring-shaped locking stepped portion 209 of the coupling outer fitting portion 202A is formed on the upper surface of each divisional plate portions 215A. The fitting recessed portion 215D is configured such that, in a state where a bottom surface 215d of the fitting recessed portion 215D and a side surface 215a that is continuous therewith and has an approximately flat U shape are in contact with the lower surface and the circumferential surface of the ring-shaped locking stepped portion 209, the two divisional plate portions 215A and the ring-shaped locking stepped portion 209 are prevented from moving relative to each other in the horizontal direction. Also, an approximately flat U-shaped inner circumferential surface 215b of each divisional plate portion 215A is configured to extend along, and come into contact with or come into the vicinity of, the outer circumferential surface of the vertically-oriented valve body portion 202D of the valve body 202.

A ring-shaped fitting groove portion 216B to which a ring-shaped leg portion 231A, which is formed to protrude downward on the outer peripheral end portion of the lower surface of a coupling flange 231 of the second attachment 200B2, is to be fitted, and that prevents the first attachment 200B1 and the coupling flange 231 of the second attachment 200B2 from moving relative to each other in the horizontal direction, is formed on the upper surface of the first attachment 200B1.

A ring-shaped sheet packing 219 that brings the bottom surface 215d of the first attachment 200B1 and the lower surface of the ring-shaped locking stepped portion 209 into a watertight state is attached at the position on the bottom surface 215d of the fitting recessed portion 215D of the first attachment 200B1 corresponding to the lower surface of the locking stepped portion 209 of the valve body 202.

Attachment female screw holes 251 are respectively formed in the parts of the lower surface of each divisional plate portions 215A of the first attachment 200B1 corresponding to the outer side of the two corners (two angular portions) of the fitting recessed portion 215D (two attachment female screw holes 251 for each divisional plate portion 215A). One end side of a double-end bolt 250, which will be described below, can be screwed into each attachment female screw hole 251 from below.

The first attachment 200B1 is provided with a pair of plate-shaped reaction force receiving members 252 on the outer circumferential surface of a horizontally-oriented valve body portion 202C between the vertically-oriented valve body portion 202D and a coupling flange 202B. The pair of plate-shaped reaction force receiving members 252 are attached from above so as to be parallel to the lateral cross section of the horizontally-oriented valve body portion 202C.

Each of the plate-shaped reaction force receiving members 252 is provided with: an arc-shaped lower surface 252*a* that comes into contact with the outer circumferential surface of the horizontally-oriented valve body portion 202C via an elastic member 253; through holes 252*b* that are each formed in either one of the two end portions of the plate-shaped reaction force receiving member 252 at a position that is further on the end portion side than the arc-shaped lower surface 252*a*; double-end bolts 250 that can be inserted into the through holes 252*b*; and pressing nuts 254 that can be screwed onto the double-end bolts 250 inserted into the through holes 252*b*.

In the step of attaching the first attachment 200B1, the first attachment 200B1 is attached such that the arc-shaped lower surface 252*a* of each reaction force receiving member 252 comes into contact with the outer circumferential surface of the horizontally-oriented valve body portion 202C between the vertically-oriented valve body portion 202D and the coupling flange 202B via the elastic member 253. An operation is performed to attach the divisional plate portions 215A to the ring-shaped locking stepped portion 209 formed integrally with the coupling outer fitting portion 202A of the valve body 202 from the short side direction of the ring-shaped locking stepped portion 209 (the pipe axis direction of the water pipes 1) in the state where one end side of a double-end bolt 250 has been screwed into each attachment female screw hole 251 formed in the lower surfaces of the divisional plate portions 215A and a pressing nut 254 has been screwed to the other end side, and the bottom surface 215*d* and the side surface 215*a*, which has an approximately flat U shape, of the fitting recessed portion 215D of each divisional plate portion 215A are brought into contact with the lower surface and the circumferential surface of the ring-shaped locking stepped portion 209. In this regard, a configuration is adopted in which the sheet packing 219 is attached at a position between the bottom surface 215*d* of the fitting recessed portion 215D and the lower surface of the ring-shaped locking stepped portion 209 such that a watertight state can be maintained, and the other end side (below the position to which the pressing nut 254 is screwed) of each double-end bolt 250 screwed into the attachment female screw hole 251 is inserted into the through hole 252*b* of the corresponding reaction force receiving member 252. Note that the order in which the reaction force receiving members 252, the double-end bolts 250, the pressing nuts 254, and the divisional plate portions 215A are attached is not limited to the above-described order and may be changed as appropriate insofar as the members can be reliably attached.

The two coupling plate portions 215B that oppose each other in this state are fastened to each other using bolts 218A and nuts 218B of a third fastening means 218 that are inserted into second bolt insertion holes 215*f* formed in the coupling plate portions 215B, with a sheet packing 215E intervened between the joint surfaces of the two coupling plate portions 215B, and thereafter an operation is performed to screw the pressing nuts 254, which have been screwed onto the two double-end bolts 250, toward the pressing side (in the direction in which the pressing nuts 254 and the two coupling plate portions 215B are separated relative to each other) until the lower surfaces of the pressing nuts 254 come into contact with the upper surfaces of the reaction force receiving members 252 and the bottom surface 215*d* of the fitting recessed portion 215D of each coupling plate portion 215B are reliably pressed and fixed to the lower surface of the ring-shaped locking stepped portion 209 with the sheet packing 219 therebetween in a watertight state.

Next, FIG. 30 and FIG. 31 show: a first pressing step, which is the step of pulling the bonnet 204 and pressing it against the valve body 202 via the pressing member 221 detachably attached to the bonnet 204, using the first pressing jig 200C1 provided for the first attachment 200B1 of the attachment 200B, thereby maintaining a gasket 208 provided between the coupling inner fitting portion 204A of the bonnet 204 and the coupling outer fitting portion 202A of the valve body 202 in a watertight state; and a lock release step, which is the step of pulling out the lock members 207A of the lock means 207 in a state where the removal resistance due to the resilient recovery force of the gasket 208 has been eliminated or reduced, thereby releasing the coupling and fixing of the coupling outer fitting portion 202A of the valve body 202 and the coupling inner fitting portion 204A of the bonnet 204.

The first pressing jig 200C1 is configured such that a pair of first threaded cylinders 225 with a female thread are fixed at the sides of a central portion in the long side direction of the fitting recessed portion 215D on the upper surfaces of the divisional plate portions 215A, bolts 226 that are inserted into fourth bolt insertion holes 221*e* respectively formed at two positions on the pressing member 221 in the circumferential direction are screwed and fixed to the first threaded cylinders 225 using lock nuts 227, and push-on nuts 228 that press and fix the bonnet 204 to the valve body 202 side according to a fastening operation in a state where the push-on nuts 228 are in contact with the upper surface of the pressing member 221, are screwed onto an upper portion of each bolt 226.

In a state where the gasket 208 is compressed between the tapered surface (not shown) of the coupling inner fitting portion 204A of the bonnet 204 and the tapered surface (not shown) of the coupling outer fitting portion 202A of the valve body 202 due to the fastening operation using the push-on nuts 228 of the first pressing jig 200C1, the insertion and removal resistance that acts against the lock members 207A due to the resilient recovery force of the gasket 208 can be eliminated or reduced. In this state, the lock members 207A are pulled out, and the coupling and fixing of the coupling outer fitting portion 202A of the valve body 202 and the coupling inner fitting portion 204A of the bonnet 204 is released.

Next, FIG. 31 shows: the step of attaching the cylindrical second attachment 200B2 that has a height that is sufficient to surround the entire circumference of the bonnet 204, i.e., a height that is greater than the height from the upper surfaces of the divisional plate portions 215A to the upper edge of the rotational operation portion 205*a* of the stem 205, to the first attachment 200B1 of the attachment B such that a watertight state is achieved; a second pressing step, which is the step of, after attaching the second attachment 200B2, pressing and fixing the bonnet 204 in the state of being pressed toward the valve body 202 side, using the second pressing jig 200C2 of the pressing means 200C that is provided for the second attachment 200B2 and that can be operated from the outside; and the step of, after completing the pressing and fixing using the second pressing jig 200C2, releasing the pressing and fixing by the push-on nuts 228 of the first pressing jig 200C1.

Sixth bolt insertion holes 231*a* are formed in the coupling flange 231 formed on the lower end portion of the cylindrical case valve body 230 included in the second attachment 200B2, respectively at positions that correspond to fifth bolt insertion holes 216b formed in the divisional plate portions 215A, and on the outer peripheral side of the sixth bolt insertion holes 231a, the ring-shaped leg portion 231A that is formed to protrude downward from the outer peripheral end portion of the lower surface of the coupling flange 231. Due to a fastening operation using bolts 232A and nuts 232B of a fourth fastening means 232 that are inserted into the fifth bolt insertion holes 216b and the sixth bolt insertion holes 231a, which is performed in a state where the ring-shaped leg portion 231A of the second attachment 200B2 is fitted into the ring-shaped fitting groove portion 216B of the first attachment 200B1, the first attachment 200B1 and the second attachment 200B2 are reliably fixed in a watertight state via an O-ring 233.

The second pressing jig 200C2 of the pressing means 200C is configured by: fixing threaded cylinders 235, which are in communication with the inner space of the cylindrical case valve body 230, to a plurality of positions (four positions in the present embodiment) on the cylindrical case valve body 230 in the circumferential direction such that their screw axes are located on the horizontal axis that passes through the upper surface of the pressing member 221 or the vicinity thereof; and screwing a push-on bolt 236, which is provided with a tapered pressing surface 236a that horizontally comes into contact with a tapered surface 221f formed on the outer peripheral portion of the upper surface of the pressing member 221, into each threaded cylinder 235.

In a state where the bonnet 204 is pressed and fixed to the valve body 202 side by the fastening operation using the plurality of push-on bolts 236 of the second pressing jig 200C2, the watertight state in which the gasket 208 inserted between the tapered surface (not shown) of the coupling inner fitting portion 204A of the bonnet 204 and the tapered surface (not shown) of the coupling outer fitting portion 202A of the valve body 202 is compressed is maintained even if the pressing force of the pressing nuts 228 of the first pressing jig 200C1 is released.

Subsequently, although not shown in the drawings, in the same manner as in the first embodiment, after the pressing and fixing operation using the second pressing jig 200C2 is complete, an operation is performed to release the pressing and fixing by the push-on nuts 228 of the first pressing jig 200C1, from the upper opening of the cylindrical case valve body 230, a work target part of the gate valve V6 is sealed by attaching the work housing, which is provided with the work open/close valve and the elevation transport means that is to be coupled to the bonnet 204, to the second attachment 200B2 of the attachment 200B such that a watertight state is achieved, the bonnet 204 is removed from the valve body 202 without stopping the flow of water, and thereafter a short pipe provided with an inner plug is attached to a disc attaching port of the valve body 202 in a watertight state.

Other Embodiments (1) In the embodiments above, the ring-shaped protruding portion 9 to which the ring-shaped attachment B can be attached in a clamping state is formed integrally with the lower end part of the outer circumferential surface of the coupling outer fitting portion 2A of the valve body 2, which is displaced downward from the insertion/removal operation position for the lock members 7A. However, the protruding portion 9 may be intermittently formed in the circumferential direction of the coupling outer fitting portion 2A of the valve body 2.

(2) In the embodiments above, the lock members 7A of the lock means 7 are each formed to have a plate-like squared U shape. However, the configuration of the lock members 7A is not limited to this configuration, and any configuration may be adopted insofar as the lock members 7A allow an operation to insert and remove the lock members 7A to and from the outer engagement holes 7B formed in the coupling outer fitting portion 2A of the valve body 2 and the inner engagement recessed portions 7C formed in the coupling inner fitting portion 4A of the bonnet 4.

(3) In the embodiments above, the ring-shaped attachment B that is to be attached to the valve body 2 so as to allow an operation to insert/remove the lock members 7A is configured with separated bodies, namely the first attachment B1 that is to be attached to the valve body 2 at a position that is located lower than the insertion/removal operation position for the lock members 7A in a watertight state, and the second attachment B2 that is to be attached to the first attachment B1 in a watertight state and that surrounds at least part of the outer peripheral side of the bonnet 4. However, the first attachment B1 and the second attachment B2 may be formed integrally with each other.

(4) In the embodiments above, the first pressing jig C1 provided for the first attachment B1 is configured to be operated in the inner space of the attachment B. However, the first pressing jig C1 may be configured to allow an operation from the outside of the first attachment B1.

(5) In the embodiments above, the pressing means C that presses the bonnet 4 against the valve body 2 is configured with the first pressing jig C1 provided for the first attachment B1 and the second pressing jig C2 provided for the second attachment B2. However, the pressing means C may be configured with the first pressing jig C1 or the second pressing jig C2 alone.

(6) In the embodiments above, a configuration is adopted in which the inner plug 60 can be detachably attached to the short pipe 61 using the bayonet mechanism configured with the locking portions 60A formed at one or more positions on the inner plug 60 in the circumferential direction and the attachment/detachment channels 61f and the locking channels 61g formed in the inner circumferential surface 61e of the plug attaching port 61D of the short pipe 61. However, the configuration is not limited to this bayonet coupling structure, and a screw coupling structure, a snap coupling structure, a magnetic coupling structure or the like may be adopted to allow the inner plug 60 to be detachably attached to the short pipe 61.

Furthermore, an elastic valve body provided for the inner plug 60 may be inserted into the short pipe 61 in a compressed state, and the inner plug 60 may be detachably attached to the short pipe 61 in a retained state by using the resilient recovery force of the elastic valve body.

(7) In the embodiments above, the coupling position of the coupling flange portion 61B of the short pipe 61 (the arrangement of the bolts 65) and the coupling position of the lower flange portion 80B of the repair valve V3 (the arrangement of the bolt insertion holes) are different, and therefore the second short pipe 77 provided with the lower flange portion 77A corresponding to the coupling flange portion 61B of the short pipe 61 and the upper flange portion 77C corresponding to the lower flange portion 80B of the repair valve V3 are used. However, in the case where the coupling mode of the coupling flange portion 61B of the short pipe 61 and that of the lower flange portion 80B of the repair valve V3 match, the second short pipe 77 can be omitted.

(8) In the embodiments above, the flange joint type gate valve V1 provided with coupling flanges 2B for the upstream and downstream water pipes 1 has been described as an example. However, the gate valve may be a gate valve V1 having at least one end portion side that is configured as a reception port or an insertion port.

(9) The shape of the fitting coupling portion A of the valve body 2 and the bonnet 4, the shape of the attachment B, the shape of the pressing means C, the shape of the housing H, the shape of the elevation transport means D, and the shape of the work open/close valve V2 may each be modified as appropriate depending on various conditions.

(10) In the embodiments above, the protruding portion 9 formed on the outer surface of the valve body 2 or the ring-shaped locking stepped portion 209 formed on the outer surface of the valve body 202 are adopted as a locking stepped portion. However, a locking stepped portion having any other configuration may be adopted insofar as the configuration allows an operation to insert/remove the lock members on the outer surface of the valve body.

Fifth Embodiment

Figure 32:
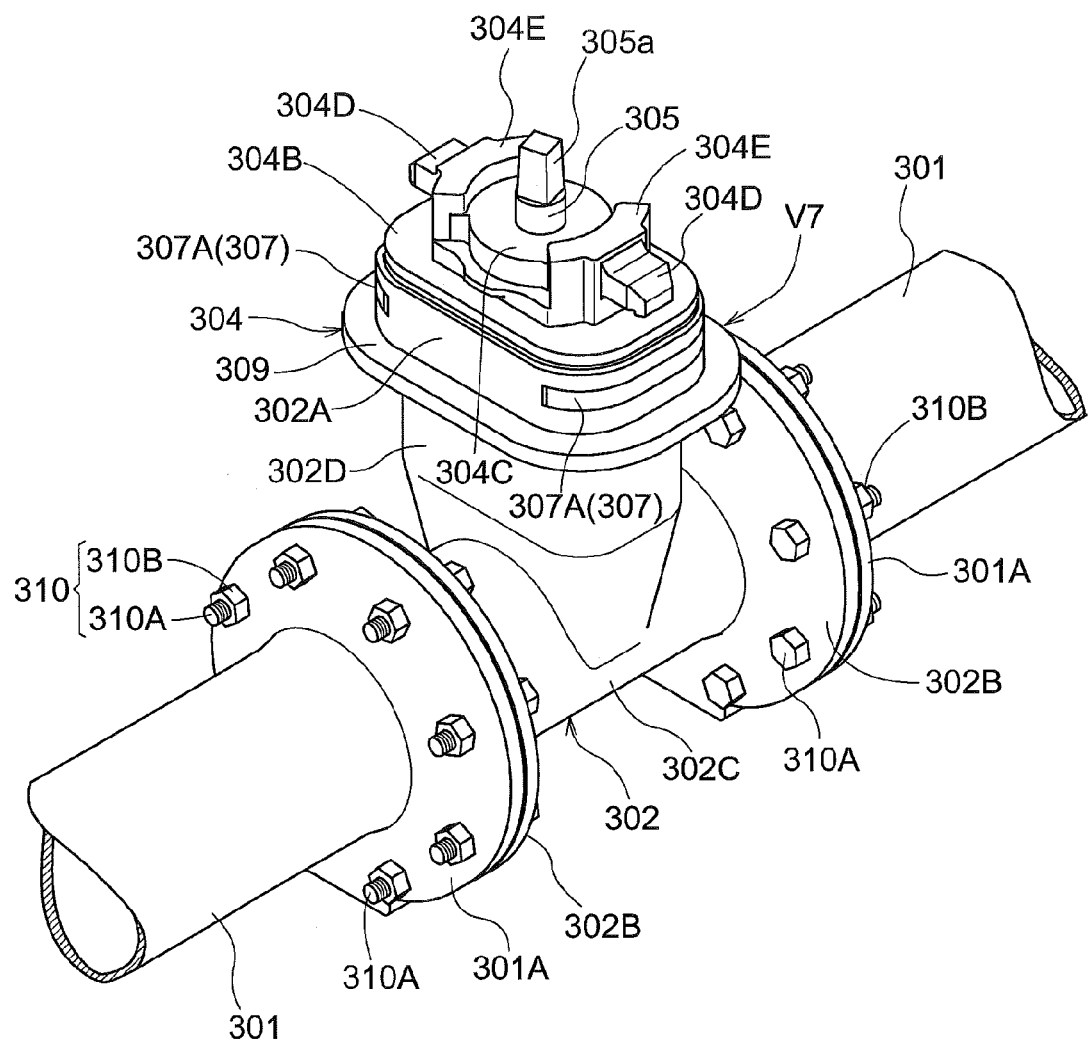
FIG. 32 is a perspective view of a gate valve of a water piping system showing a fifth embodiment of the present invention.
Figure 33:
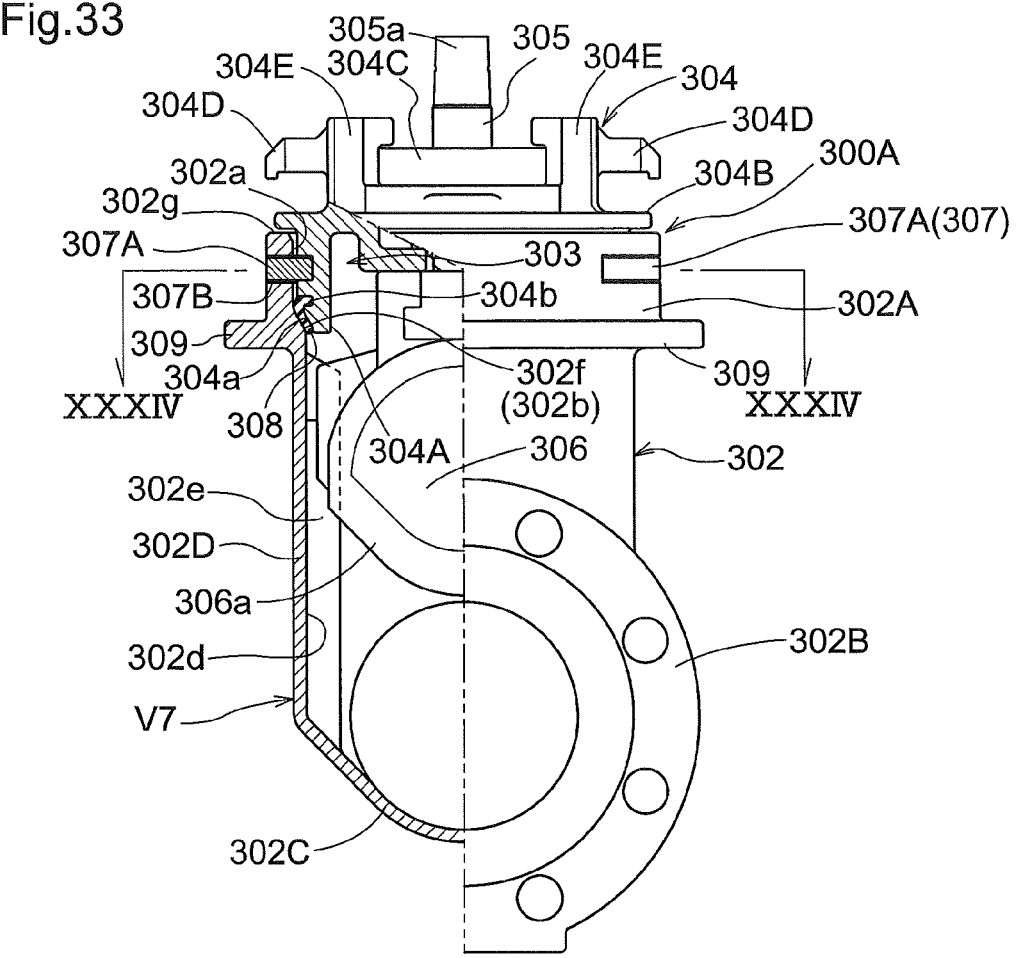
FIG. 33 is a partially cut-out front view of the gate valve.
Figure 34:
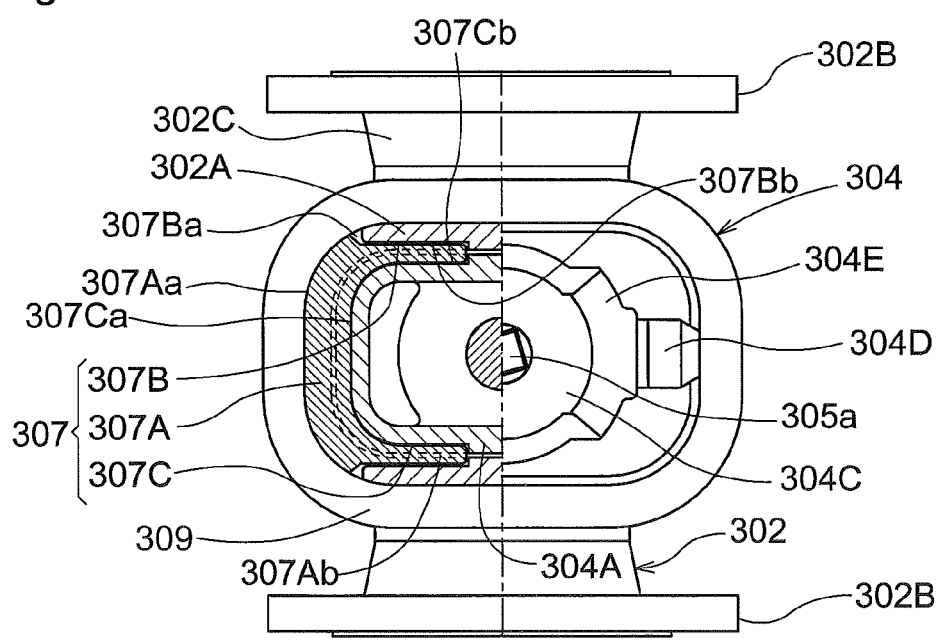
FIG. 34 is a partially cut-out plan view of the gate valve along the line XXXIV-XXXIV in FIG. 33.

FIG. 32 to FIG. 34 show a gate valve V7 that is flange-joined to a midpoint of a water pipe 301 of a water piping system, which is an example of a fluid pipe that constitutes a fluid piping system.

The gate valve V7 includes: a cast-iron valve body 302 that is to be connected to upstream and downstream water pipes 301 and is configured to have an approximately inverted T shape in side view; a cast-iron bonnet 304 that is to be fitted and connected from above to a disc attaching port 303 formed to be open in an upper end portion of the valve body 302; a disc 306 to which rubber lining has been applied and that is detachably attached to the gate valve V7 from the disc attaching port 303 of the valve body 302 via a stem 305 provided to penetrate the bonnet 304; and a lock means 307 that includes a pair of lock members 307A that can be externally and laterally inserted into and removed from a coupling outer fitting portion 302A on the valve body 302 side and a coupling inner fitting portion 304A on the bonnet 304 side, which constitute a fitting coupling portion 300A of the valve body 302 and the bonnet 304, and that, in an engaged state where the lock members 307A are inserted, couples and fixes the valve body 302 and the bonnet 304 to each other such that a watertight state is achieved.

The valve body 302 is configured with: a horizontally-oriented valve body portion 302C that has a circular horizontal cross section and is provided with a pair of coupling flanges 302B that are to be coupled and fixed to a coupling flange 301A of the two water pipes 301 such that a watertight state is achieved using bolts 310A and nuts 310B, which are examples of a first fastening means 310; and a vertically-oriented valve body portion 302D that has an approximately rectangular horizontal cross-sectional shape (the shape of a rectangle with rounded corners) and is formed integrally with the horizontally-oriented valve body portion 302C so as to be orthogonal to a central portion thereof in the direction of the axis of the flow channel.

A sliding guide portion 302e that slides and guides the disc 306 screwed to a screw shaft portion of the stem 305, between a flow channel open position (valve open position) and a flow channel blocking position (valve close position) such that the disc 306 is not rotatable; and a seat that comes into contact with a rubber lining portion 306a of the disc 306 that has been moved to the flow channel blocking position due to the rotational operation of a rotational operation portion 305a that has a square shaft shape and is formed on an upper end portion of the stem 305, are formed on the inner surface of the valve body 302.

Also, the ring-shaped coupling outer fitting portion 302A with which the disc attaching port 303 is formed and that has an approximately rectangular horizontal cross-sectional shape (the shape of a rectangle with rounded corners) is formed integrally with an upper end side peripheral wall portion of the vertically-oriented valve body portion 302D.

The coupling outer fitting portion 302A is configured to have a length that is at least equivalent to a depth for fitting to the coupling inner fitting portion 304A of the bonnet 304 in the disc attachment direction, a diameter that is greater than that of the inner circumferential surface of the vertically-oriented valve body portion 302D, and a plate thickness that is also greater than that of the vertically-oriented valve body portion 302D, and a level difference portion 302b with which a sealing portion is to be configured is formed on a depth-side equivalent part that is on the side of the boundary, with an inner circumferential surface 302d of the vertically-oriented valve body portion 302D, of an inner circumferential surface 302a of the coupling outer fitting portion 302A.

A ring-shaped protruding portion (an example of a locking stepped portion) 309 to which a ring-shaped attachment base material B, which will be described below, can be attached in a clamping state is formed integrally with a lower end part of the outer circumferential surface of the coupling outer fitting portion 302A, which is displaced downward from an insertion/removal operation position for the lock members 307A, so as to be oriented parallel or approximately parallel to an upper end surface 302g of the coupling outer fitting portion 302A, and the protruding portion 309 is configured to have a plate thickness that is the same or approximately the same as the plate thickness of the coupling outer fitting portion 302A.

The bonnet 304 is provided with: a bonnet main valve body 304B that has a plate shape that is approximately similar to, and that can come into contact with, the upper end surface 302g of the coupling outer fitting portion 302A of the valve body 302; and the coupling inner fitting portion 304A having a cylindrical shape that protrudes from the inner surface of the bonnet main valve body 304B and has fitting dimensions that are slightly smaller than the inner surface dimensions of the coupling outer fitting portion 302A of the valve body 302; and a shaft bearing portion 304C that supports the stem 305 such that the stem 305 penetrates through the shaft bearing portion 304C and can be operated to rotate in a watertight state. Also, a pair of arc-shaped attachment brackets 304E provided with a suspension hook 304D for transporting the bonnet 304 provided with the disc 306 and the stem 305 upward and downward are formed integrally with a portion of the outer surface of the bonnet main valve body 304B around the shaft bearing portion 304C.

Tapered surfaces 304a and 302f that have the same or approximately the same inclination and that are further inward in the diameter direction at a position that is further on the internal flow channel side of the horizontal valve body portion 302C of the valve body 302 are formed on a tip-side part of the outer circumferential surface of the coupling inner fitting portion 304A of the bonnet 304 and on the level difference portion 302b of the coupling outer fitting portion 302A of the valve body 302 on the depth side of the inner circumferential surface 302a that corresponds to the tip-side part in the disc attachment direction. A gasket 308, which is an example of a ring-shaped sealing material that is to be compressed between the tapered surfaces 304a and 302*f* to the extent in which the tapered surfaces 304*a* and 302*f* become watertight when the coupling inner fitting portion 304A of the bonnet 304 is operated to be fitted to a predetermined attachment position relative to the coupling outer fitting portion 302A of the valve body 302, is attached to a seal attachment groove 304*b* that is formed in the outer circumferential surface of the coupling inner fitting portion 304A of the bonnet 304.

The lock means 307 are configured with: plate-shaped lock members 307A that are each formed to have an approximately squared U shape in plan view; outer engagement holes (outer engaged portions) 307B that are respectively formed to penetrate the wall portions of the coupling outer fitting portion 302A of the valve body 302 that oppose each other in the long-side direction; and inner engagement recessed portions 307C (inner engaged portions) that are respectively formed in the outer surfaces of the wall portions of the coupling inner fitting portion 304A of the bonnet 304 that oppose each other in the long-side direction.

Each outer engagement hole 307B in the coupling outer fitting portion 302A of the valve body 302 is configured to have hole dimensions that allow a lock member 307A to be inserted and removed, from the lateral outside in the long-side direction, and each inner engagement recessed portion 307C in the coupling inner fitting portion 304A of the bonnet 304 is configured to have hole dimensions that allow the tip side of a lock member 307A, which has been operated to be inserted into the corresponding outer engagement hole 307B of the coupling outer fitting portion 302A of the valve body 302, to engage therewith.

The lock members 307A are each configured with: a center lock plate portion 307Aa that extends along the short side direction of the coupling outer fitting portion 302A and the coupling inner fitting portion 304A; and side lock plate portions 307Ab that extend integrally from the two end portions of the center lock plate portion 307Aa along the long-side direction of the coupling outer fitting portion 302A and the coupling inner fitting portion 304A toward the central position side in the long-side direction.

The outer surface of the center lock plate portion 307Aa of each lock member 307A is flush or approximately flush with the outer surface of the coupling outer fitting portion 302A of the valve body 302 when the lock member 307A is in the locked state in which the lock member 307A is engaged with the outer engagement hole 307B of the coupling outer fitting portion 302A of the valve body 302 and the inner engagement recessed portion 307C of the coupling inner fitting portion 304A of the bonnet 304.

The outer surface of the lock member 307A that comes out of the outer engagement hole 307B of the coupling outer fitting portion 302A of the valve body 302 is formed to have an approximately flat U shape or squared U shape provided with a portion that extends along the short side direction and a portion that extends along the long-side direction of the coupling outer fitting portion 302A, and it is therefore easy to grip the outer surface of the lock member 307A that comes out of the outer engagement hole 307B of the coupling outer fitting portion 302A, and it is possible to efficiently and smoothly perform an operation to pull out the lock member 307A.

The outer engagement holes 307B are each configured with: a center through hole portion 307Ba through which the center lock plate portion 307Aa of a lock member 307A penetrates; and side engagement groove portions 307Bb with which the two side lock plate portions 307Ab of the lock member 307A engage, which are formed to be in communication with each other.

The inner engagement recessed portions 307C are each configured with: a center engagement groove portion 307Ca with which the center lock plate portion 307Aa of a lock member 307A engages; and side engagement groove portions 307Cb with which the two side lock plate portions 307Ab of the lock member 307A engage, which are formed to have a squared U shape and to be in communication with each other.

As shown in FIG. 33, when the lock member 307A is in the locked state in which the lock member 307A is engaged with the outer engagement hole 307B of the coupling outer fitting portion 302A of the valve body 302 and the inner engagement recessed portion 307C of the coupling inner fitting portion 304A of the bonnet 304, the gasket 308 is compressed to the extent in which a watertight state is achieved between the tapered surface 304*a* of the coupling inner fitting portion 304A of the bonnet 304 and the tapered surface 302*f* of the coupling outer fitting portion 302A of the valve body 302, and therefore the resilient recovery force of the gasket 308 acts as the removal resistance (the insertion and removal resistance) of the lock member 307A, and the lock member 307A is maintained in the locked state.

When pulling out a lock member 307A in the locked state, it is necessary to press the bonnet 304 toward the valve body 302 side in the direction in which the gasket 308 is compressed, and eliminate or reduce the removal resistance of the lock member 307A generated by the resilient recovery force of the gasket 308.

Therefore, a gap that allows the bonnet 304 to be pressed and moved toward the compressed side of the gasket 308, which is the side toward which the removal resistance of the lock member 307A generated by the resilient recovery force of the gasket 308 is eliminated or reduced, is formed between the upper end surface 302*g* of the coupling outer fitting portion 302A and the lower surface of the bonnet main valve body 304B of the bonnet 304, even in the locked state.

Next, a description is given of a bonnet removal method for removing the bonnet 304 provided with the disc 306 and the stem 305 from the valve body 302 of the gate valve V7 connected to the upstream and downstream water pipes 301 of the water piping system without stopping the flow of water when the disc 306, which has a shorter lifespan than the valve body 302, reaches the end of the rated useful life thereof or when an operation failure of the disc 306 occurs, for example.

Figure 35:
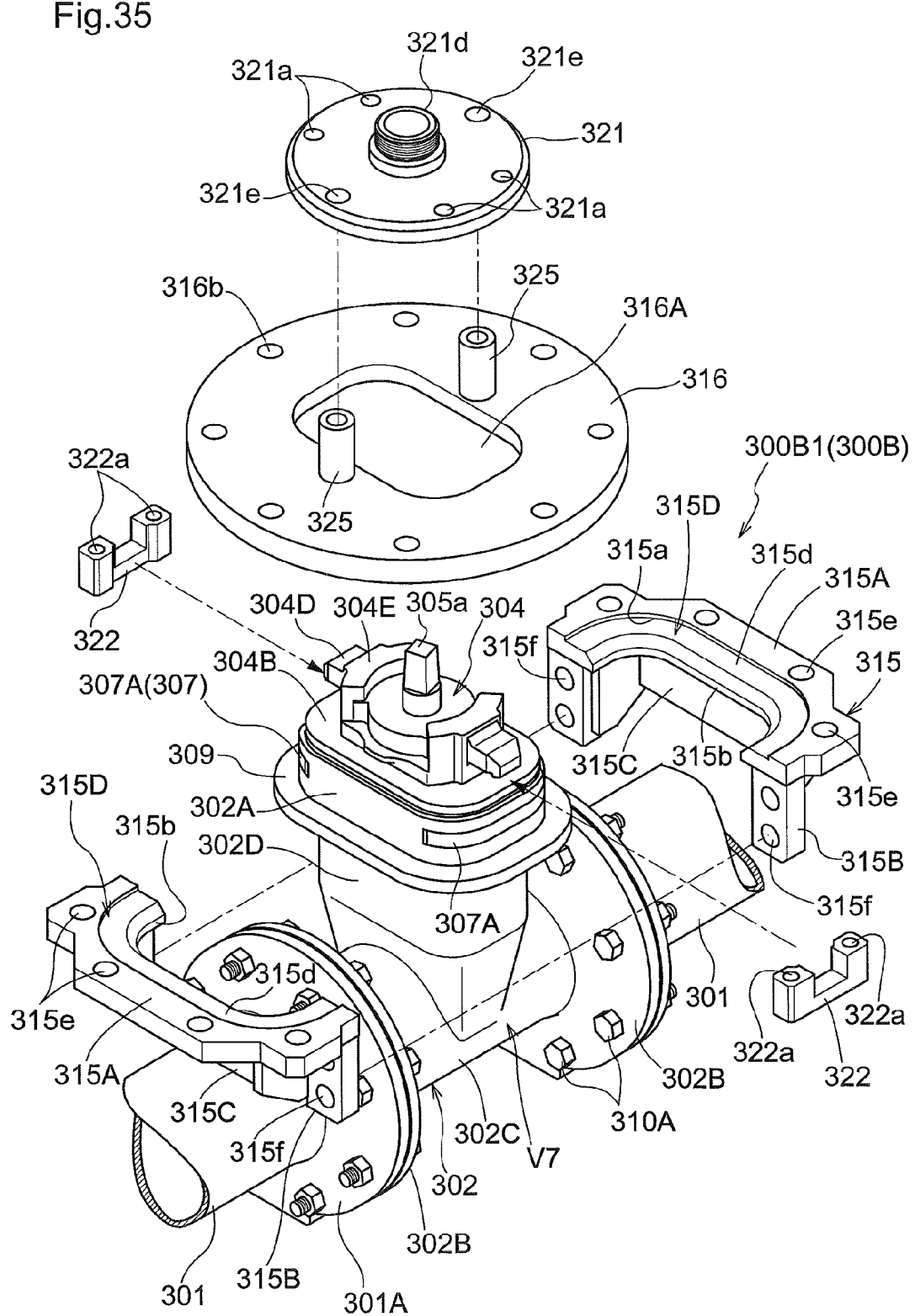
FIG. 35 is a perspective view at the time an attachment base portion of an attachment base material is to be attached.
Figure 36:
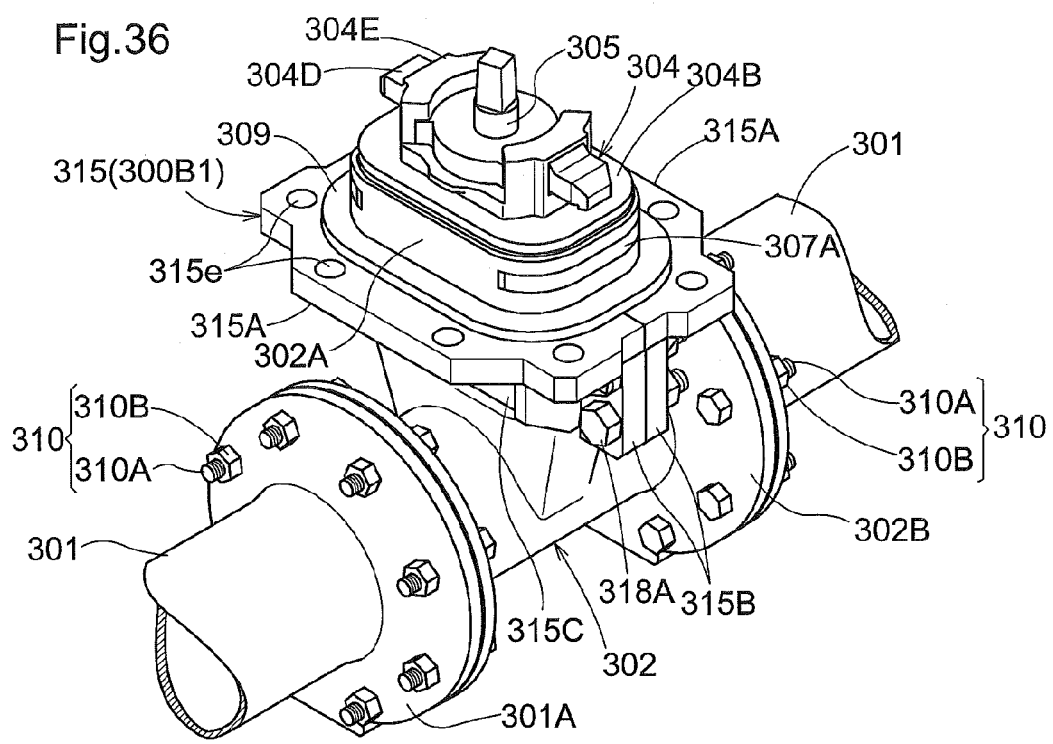
FIG. 36 is a perspective view at the time a lower base member of the attachment base portion has been attached.
Figure 37:
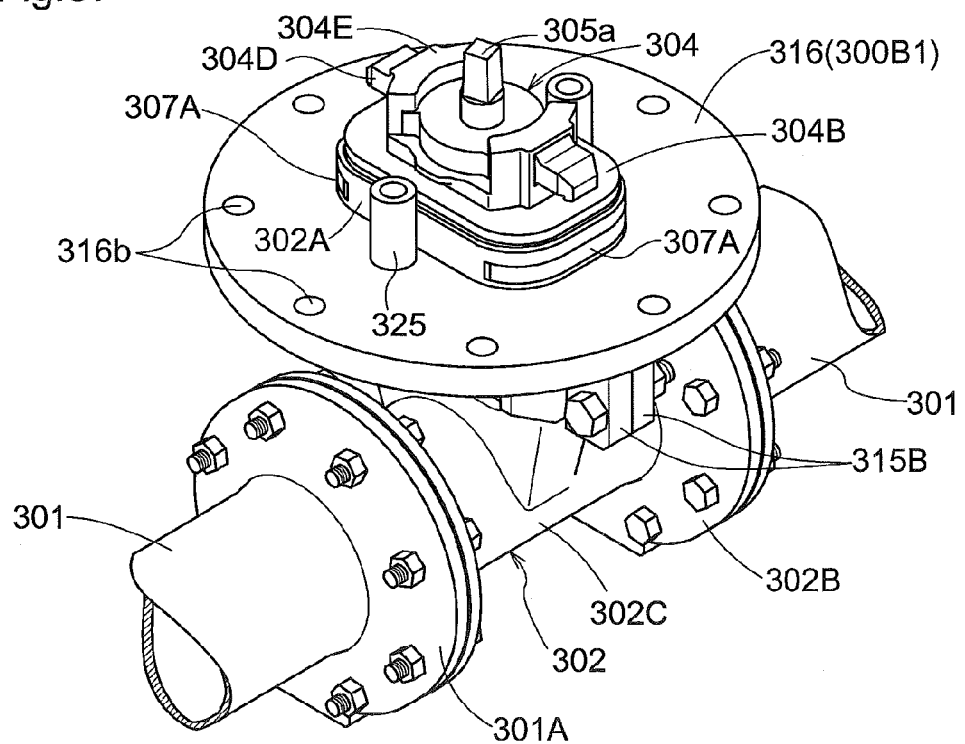
FIG. 37 is a perspective view at the time an upper base member of the attachment base portion has been attached.

[1] FIG. 35 to FIG. 37 show a base portion attachment step, which is the step of attaching an attachment base portion 300B1 of a ring-shaped attachment base material 300B to the ring-shaped protruding portion 309 formed integrally with the coupling outer fitting portion 302A of the valve body 302 in a watertight state such that an operation to insert/remove the lock members 307A is allowed.

The attachment base material 300B is configured with: the attachment base portion 300B1 that is to be attached to the valve body 302 at a position that is located lower than an insertion/removal operation position for the lock members 307A in a watertight state; and a ring-shaped attachment frame 300B2 that is to be attached to the attachment base portion 300B1 in a watertight state and that surrounds at least part of the bonnet 304.

The attachment base portion 300B1 is configured with: a lower base member 315 that has a dividable structure and that is to be pressed from below the protruding portion 309; a disc-shaped upper base member 316 that is to be pressed from above the protruding portion 309; and a second fastening means 317 that fixes the base members 315 and 316 to the protruding portion 309 that is clamped therebetween by fastening the base members 315 and 316 while pulling them toward each other.

Furthermore, the lower base member 315 is configured with: two lower divisional plate portions 315A that are divided from each other at a central position of the coupling outer fitting portion 302A of the valve body 302 in the short side direction and that has an approximately squared U shape or C shape in plan view; coupling plate portions 315B that are each provided on either one of the two end portions of each lower divisional plate portion 315A so as to protrude downward; and reinforcing plate portions 315C that are each continuously provided along two coupling plate portions 315B and a lower divisional plate portion 315A.

As shown in FIG. 35, a fitting recessed portion 315D that is to be fitted to a half area that has an approximately flat U shape and extends along one long side portion and halves of the two short side portions of the protruding portion 309 is formed on the upper surface of each lower divisional plate portion 315A of the lower base member 315. The fitting recessed portion 315D is configured such that, in a state where a bottom surface 315d of the fitting recessed portion 315D and a side surface 315a that is continuous therewith and has an approximately flat U shape are in contact with the lower surface and the circumferential surface of the protruding portion 309, the two lower divisional plate portions 315A and the protruding portion 309 are prevented from moving relative to each other in the horizontal direction.

Also, an approximately flat U-shaped inner circumferential surface 315b of each lower divisional plate portion 315A of the lower base member 315 is configured to extend along, and come into contact with or come into the vicinity of, the outer circumferential surface of the vertically-oriented valve body portion 302D of the valve body 302.

An attachment hole 316A that has an approximately rectangular shape (the shape of a rectangle with rounded corners) is formed to penetrate a central portion of the upper base member 316 so as to be fittable onto the coupling outer fitting portion 302A of the valve body 302 from above. Also, at parts of the lower surface of the upper base member 316 that respectively correspond to a plurality of first bolt insertion holes 315e formed in the lower divisional plate portions 315A of the lower base member 315, screw holes 317B for bolts 317A of the second fastening means 317 that are respectively inserted into the first bolt insertion holes 315e from below are formed as shown in FIG. 39.

Furthermore, as shown in FIG. 39, an O-ring 319, which is an example of a seal material that brings the lower surface of the upper base member 316 and the upper surface of the protruding portion 309 to be in a watertight state according to a fastening operation using the bolts 317A of the second fastening means 317, is attached to a seal attachment groove 316a that is formed at a part that is on the bottom surface of the upper base member 316 and that corresponds to the upper surface of the protruding portion 309.

In the base portion attachment step, as shown in FIG. 35, an operation is performed to attach the two lower divisional plate portions 315A of the lower base member 315 to the ring-shaped protruding portion 309 formed integrally with the coupling outer fitting portion 302A of the valve body 302 from the short side direction (the pipe axis direction of the water pipes 301), and the bottom surface 315d and the approximately flat U-shaped side surface 315a of the fitting recessed portion 315D of each lower divisional plate portion 315A are brought into contact with the lower surface and the circumferential surface of the protruding portion 309.

The coupling plate portions 315B of the two lower divisional plate portions 315A that oppose each other in this state are fastened to each other using bolts 318A and nuts 318B of a third fastening means 318 that are inserted into second bolt insertion holes 315f formed in the coupling plate portions 315B, and thereafter the attachment hole 316A of the upper base member 316 is fitted onto the coupling outer fitting portion 302A of the valve body 302, the bolts 317A inserted into the first bolt insertion holes 315e of the lower base member 315 from below are screwed into the screw holes 317B of the upper base member 316, and then the upper base member 316 and the lower base member 315 are fastened to the protruding portion 309, in the clamping state.

[2] FIG. 38, FIG. 40, and FIGS. 41A and 41B show: a first pressing step, which is the step of pressing the bonnet 304 against the valve body 302 via the pressing member 321 detachably attached to the bonnet 304, using a first pressing jig 300C1 of a pressing means 300C provided for the attachment base portion 300B1 of the attachment base material 300B, thereby maintaining the gasket 308 provided between the coupling inner fitting portion 304A of the bonnet 304 and the coupling outer fitting portion 302A of the valve body 302 in a watertight state; and a lock release step, which is the step of pulling out the lock members 307A of the lock means 307 in a state where the removal resistance due to the resilient recovery force of the gasket 308 has been eliminated or reduced, thereby releasing the coupling and fixing of the coupling outer fitting portion 302A of the valve body 302 and the coupling inner fitting portion 304A of the bonnet 304.

Note that in FIG. 39 to FIG. 41B and FIG. 43, the shapes shown in FIG. 32 to FIG. 38 are partially simplified.

A bonnet pressing step performed with the pressing means 300C includes: a first pressing step, which is the step of, before attaching the ring-shaped attachment frame 300B2, pressing and fixing the bonnet 304 to the valve body 302 side using the first pressing jig 300C1 provided in an area of the attachment base portion 300B1 that corresponds to the inner space of the ring-shaped attachment frame 300B2; and a second pressing step, which is the step of, after attaching the ring-shaped attachment frame 300B2, pressing and fixing the bonnet 304 to the valve body 302 side using the second pressing jig 300C2 that is provided for the ring-shaped attachment frame 300B2 and that can be operated from the outside.

The pressing member 321 used in the bonnet pressing step is configured to have a disc shape that can be stably attached in a horizontal orientation that is parallel to the upper surfaces of the pair of attachment brackets 304E of the bonnet 304 that protrude upward from the attachment hole 316A of the upper base member 316. Third bolt insertion holes 321a for fastening and fixing two end portions of each contact member 322 that has an approximately squared U shape and that is pressed against a suspension hook 304D of the bonnet 304 from below, using bolts 323, are respectively formed at four positions of the pressing member 321 in the circumferential direction.

On the lower surface of the pressing member 321, contact protrusions 321b that come into contact with the upper surfaces of the suspension hooks 304D are formed, and screw holes 322a for the bolts 323 are each formed in either end portion of each pressing member 322.

A through hole 321c from which the rotational operation portion 305a of the stem 305 protrudes is formed in the central portion of the pressing member 321, and a coupling target portion 321d that is to be detachably coupled to a coupling portion 351 on the side of an elevation transport means 300D that transports, for example, the bonnet 304 provided with the disc 306 and the stem 305 upward and downward is formed on the peripheral portion of the through hole 321c on the upper surface of the pressing member 321.

The coupling portion 351 on the elevation transport means 300D side is configured as a coupling cylinder portion having a female thread on the inner circumferential surface, and the coupling target portion 321d of the pressing member 321 is configured as a coupled cylinder portion having a male thread on the outer circumferential surface.

Figure 38:
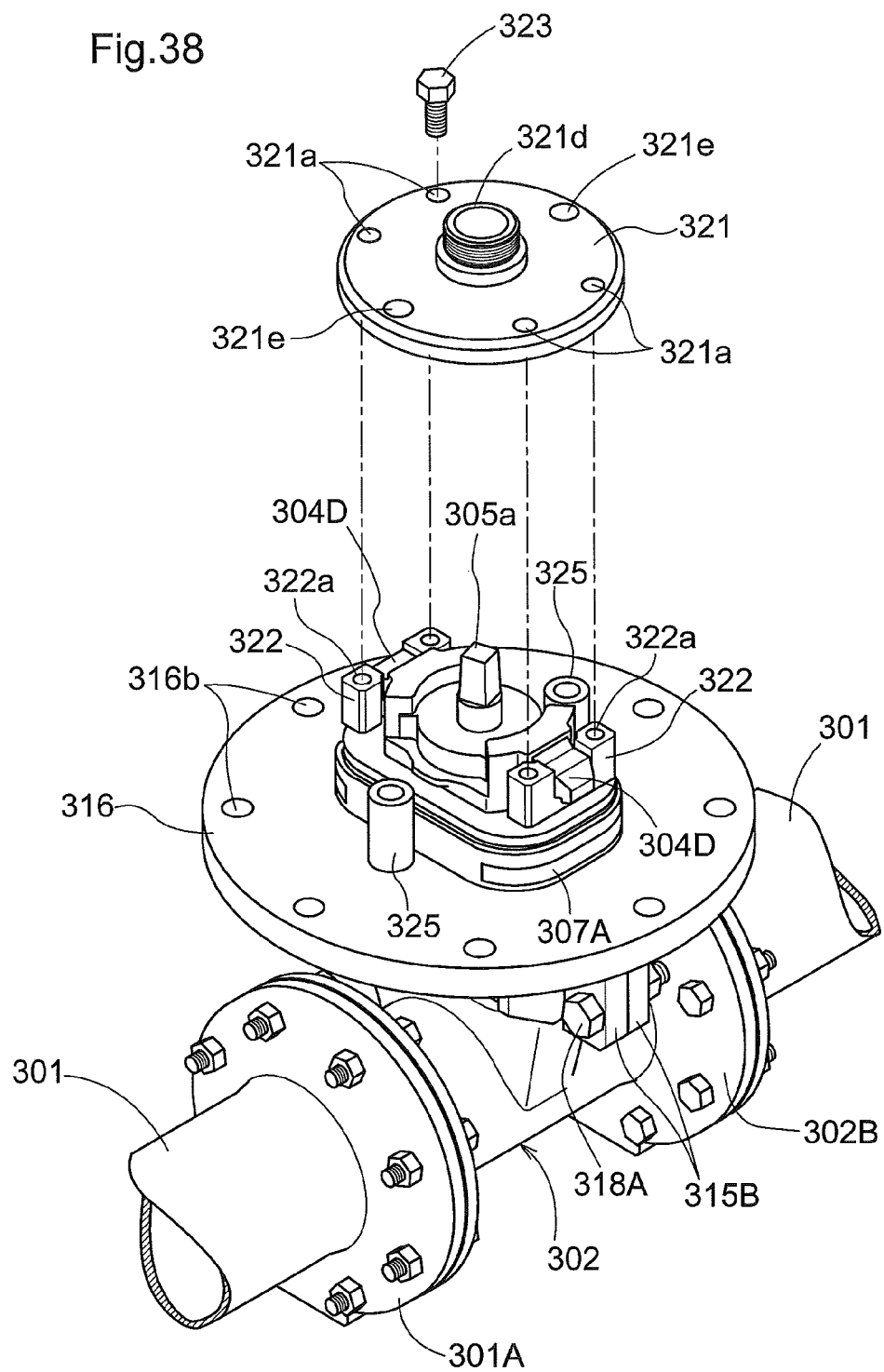
FIG. 38 is a perspective view at the time a pressing member is to be attached.
Figure 41A:
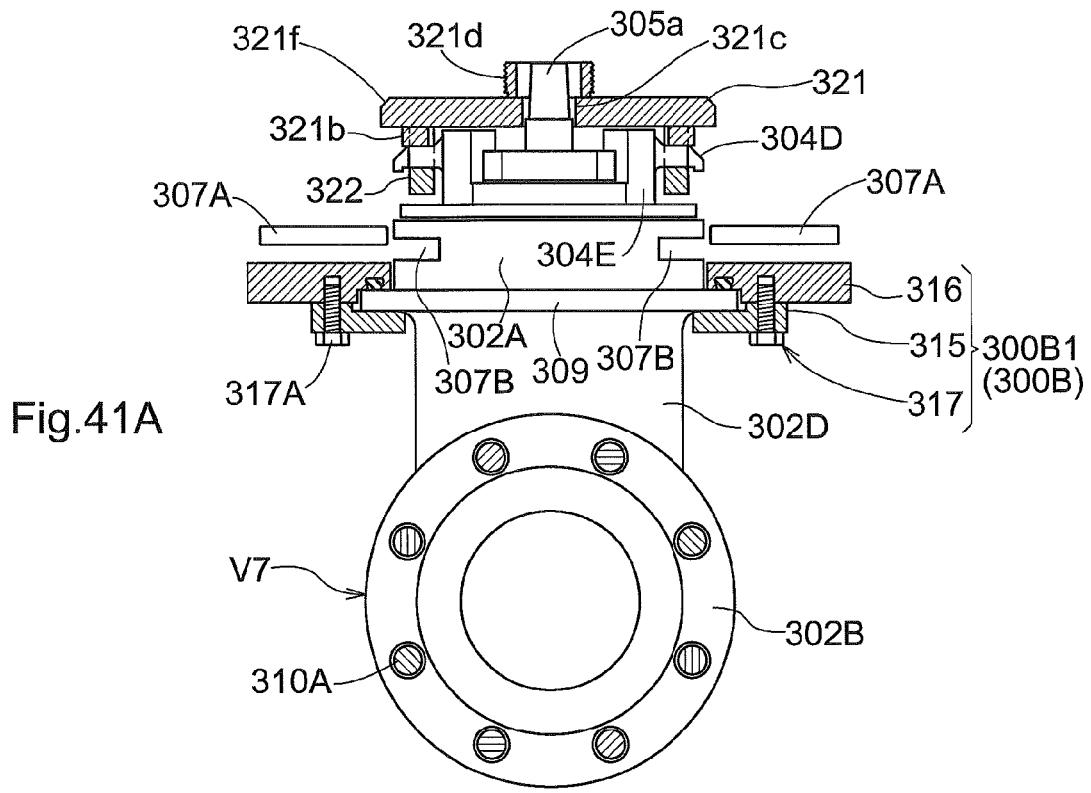
FIG. 41A is a partially cut-out front view at the time an operation has been performed to pull out the lock member.
Figure 41B:
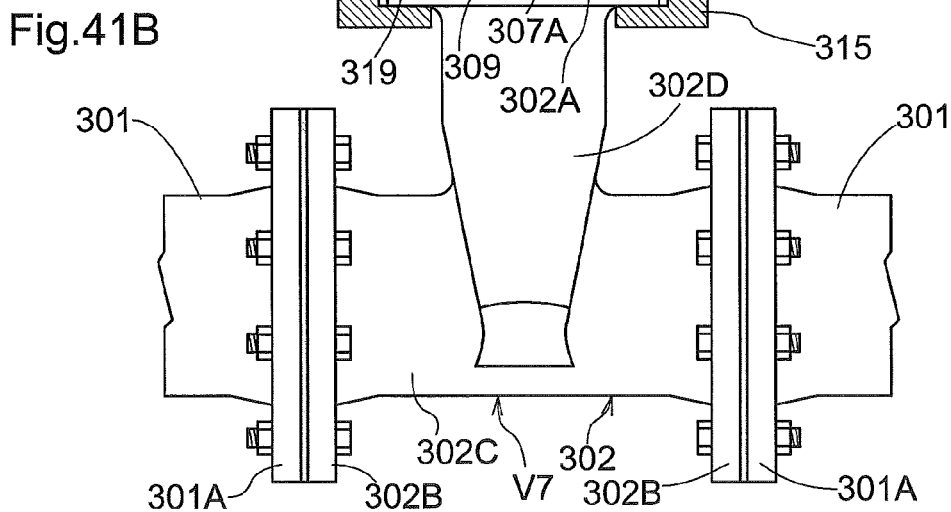
FIG. 41B is a partially cut-out side view that is orthogonal to FIG. 41A.

As shown in FIG. 38 and FIG. 41B, the first pressing jig 300C1 of the pressing means 300C is configured such that a pair of first threaded cylinders 325 with a female thread are fixed at both sides of a central portion in the long side direction of the attachment hole 316A in the upper surface of the upper base member 316, bolts 326 that are inserted into fourth bolt insertion holes 321e respectively formed at two positions on the pressing member 321 in the circumferential direction are screwed and fixed to the first threaded cylinders 325 using lock nuts 327, and a push-on nut 328 that presses and fixes the bonnet 304 to the valve body 302 side according to a fastening operation in a state where the push-on nut 328 is in contact with the upper surface of the pressing member 321, is screwed to an upper portion of each bolt 326.

The maximum range of the pressing movement of the bonnet 304 caused by the push-on nuts 328 of the first pressing jig 300C1 is, as shown in FIG. 33, set to have a gap size that allows the gasket 308, which is formed between the upper end surface 302g of the coupling outer fitting portion 302A and the lower surface of the bonnet main valve body 304B of the bonnet 304, to be compressed in the locked state where the lock members 307A are engaged with the outer engagement holes 307B in the coupling outer fitting portion 302A of the valve body 302 and the inner engagement recessed portions 307C in the coupling inner fitting portion 304A of the bonnet 304.

In a state where the gasket 308 is compressed between the tapered surface 304a of the coupling inner fitting portion 304A of the bonnet 304 and the tapered surface 302f of the coupling outer fitting portion 302A of the valve body 302 due to the fastening operation using the push-on nuts 328 of the first pressing jig 300C1, the insertion and removal resistance that acts against the lock members 307A due to the resilient recovery force of the gasket 308 can be eliminated or reduced.

In addition, as shown in FIG. 41A, the lower edges of the outer engagement holes 307B in the coupling outer fitting portion 302A of the valve body 302 are flush with or located above the upper surface of the upper base member 316, and the outer surfaces of the lock members 307A that come out of the outer engagement holes 307B of the coupling outer fitting portion 302A of the valve body 2 have an approximately flat U or squared U easy-to-grip shape that is provided with a portion extending along the direction of the short sides and portions extending along the direction of the long sides of the coupling outer fitting portion 302A. Therefore, it is possible to reliably and smoothly pull out the lock members 307A with a small amount of operation force.

Figure 42:
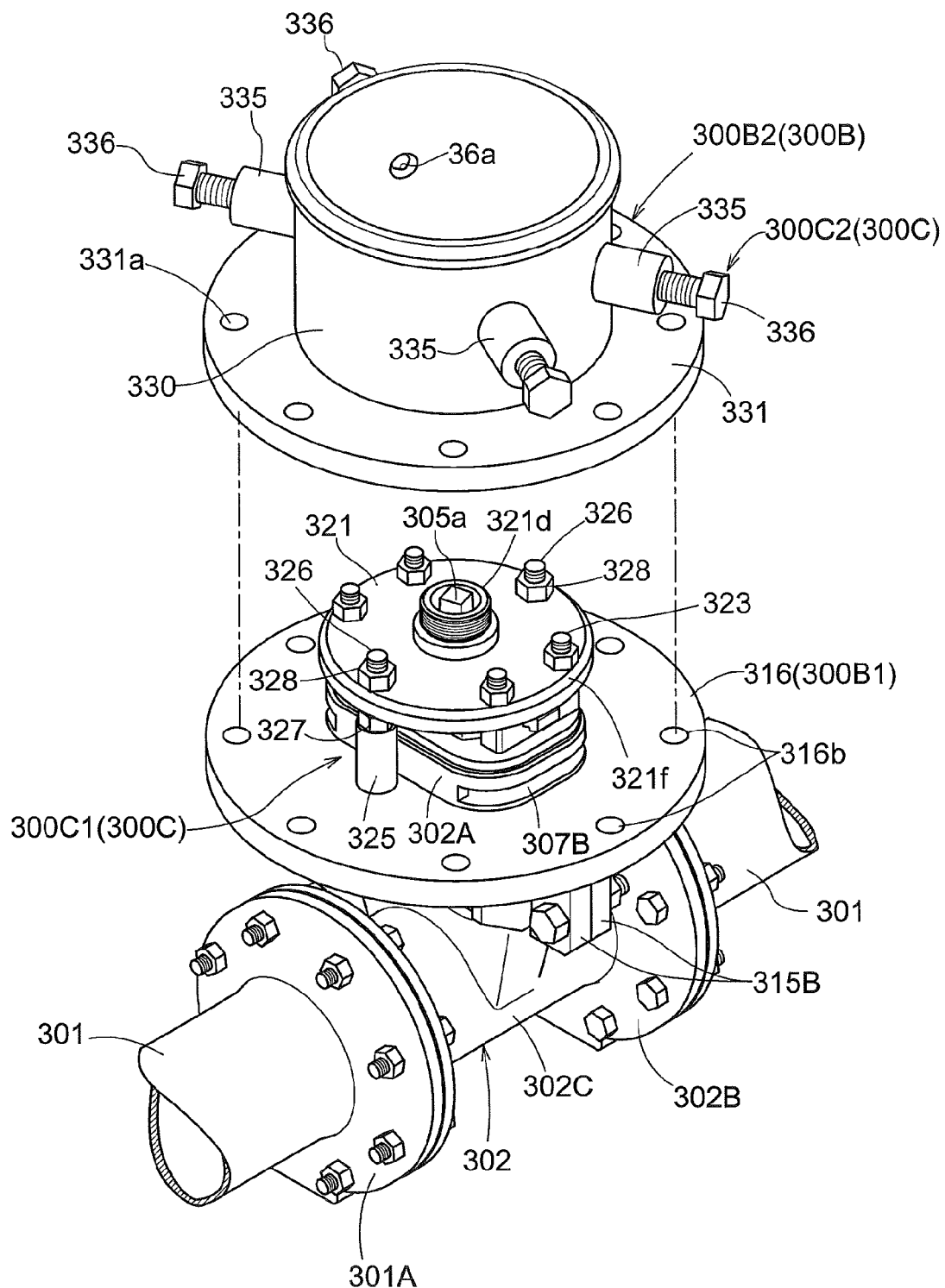
FIG. 42 is a perspective view at the time a ring-shaped attachment frame of the attachment base material is to be attached.
Figure 43:
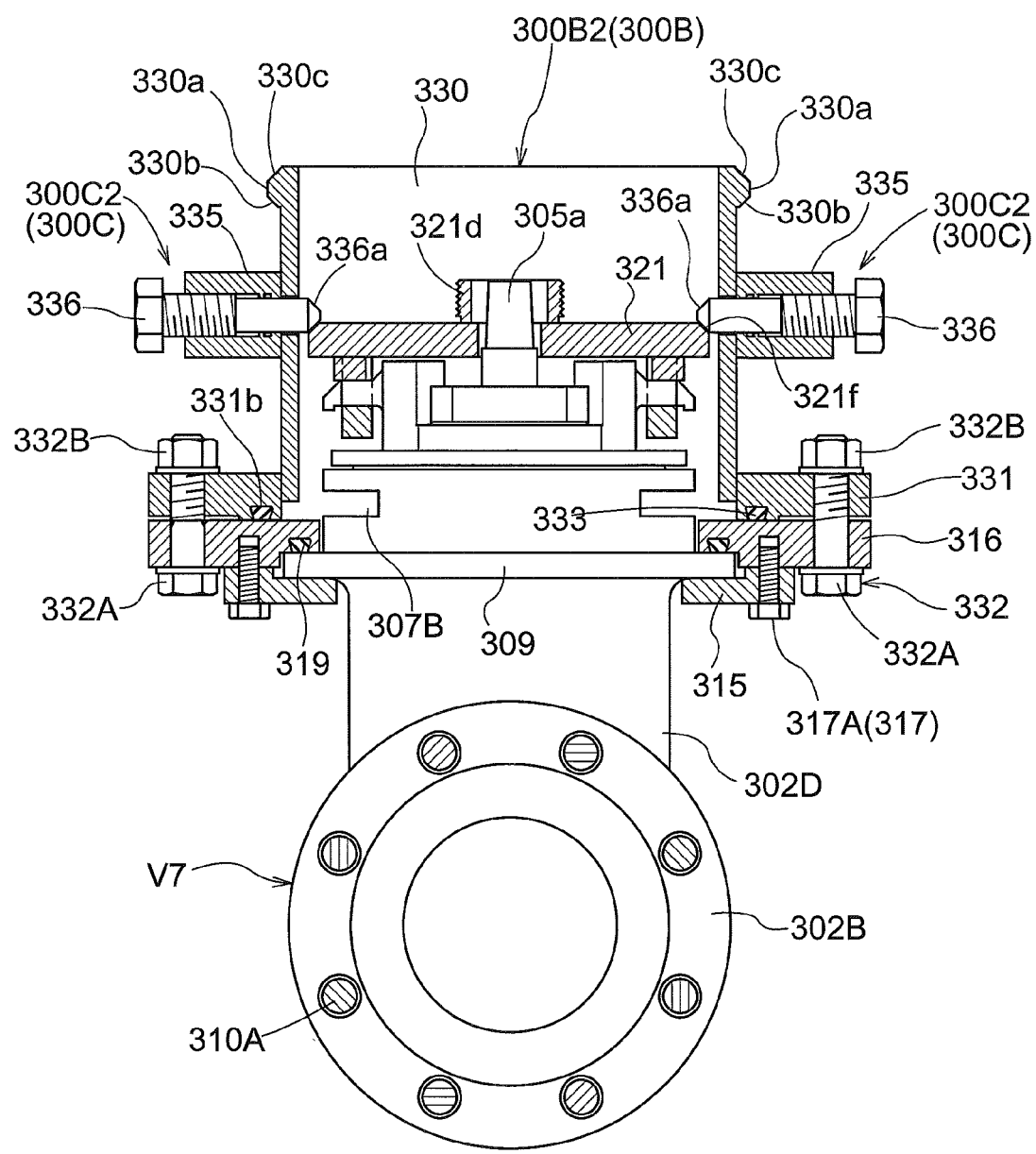
FIG. 43 is a partially cut-out front view at the time the ring-shaped attachment frame of the attachment base material has been attached.

[3] FIG. 42 and FIG. 43 show: the step of attaching the cylindrical ring-shaped attachment frame 300B2 that has a height that is sufficient to surround the entire circumference of the bonnet 304, i.e., a height that is greater than the height from the upper surface of the upper base member 316 to the upper edge of the rotational operation portion 305a of the stem 305, to the upper base member 316 of the attachment base portion 300B1 of the attachment base material 300B such that a watertight state is achieved; a second pressing step, which is the step of, after attaching the ring-shaped attachment frame 300B2, pressing and fixing the bonnet 304 to the valve body 302 side, using the second pressing jig 300C2 of the pressing means 300C that is provided for the ring-shaped attachment frame 300B2 and that can be operated from the outside; and the step of, after completing the pressing and fixing using the second pressing jig 300C2, releasing the pressing and fixing by the push-on nuts 328 of the first pressing jig 300C1.

Although transition is made from the first pressing jig 300C1 to the second pressing jig 300C2, the pressing and fixing of the bonnet 304 is continuously performed by the pressing means 300C.

Sixth bolt insertion holes 331a are formed in the coupling flange 331 formed on the lower end portion of the cylindrical case valve body 330 included in the ring-shaped attachment frame 300B2, respectively at positions that correspond to fifth bolt insertion holes 316b formed in the upper base member 316, and an O-ring 333, which is an example of a seal material that brings the upper surface of the upper base member 316 and the lower surface of the coupling flange 331 to be in a watertight state according to a fastening operation using bolts 332A and nuts 332B of a fourth fastening means 332 that are inserted into the fifth bolt insertion holes 316b and the sixth bolt insertion holes 331a, is attached to a seal attachment groove 331b that is formed in the lower surface of the coupling flange 331.

The second pressing jig 300C2 of the pressing means 300C is configured by: fixing threaded cylinders 335, which are in communication with the inner space of the cylindrical case valve body 330, to a plurality of positions (four positions in the present embodiment) on the cylindrical case valve body 330 in the circumferential direction such that their screw axes are located on the horizontal axis that passes through the upper surface of the pressing member 321 or the vicinity thereof; and screwing a push-on bolt 336, which is provided with a tapered pressing surface 336a that horizontally comes into contact with a tapered surface 321f formed on the outer peripheral portion of the upper surface of the pressing member 321, to each threaded cylinder 335.

In a state where the bonnet 304 is pressed and fixed to the valve body 302 side by the fastening operation using the plurality of push-on bolts 336 of the second pressing jig 300C2, the watertight state in which the gasket 308 inserted between the tapered surface 304a of the coupling inner fitting portion 304A of the bonnet 304 and the tapered surface 302f of the coupling outer fitting portion 302A of the valve body 302 is compressed is maintained even if the pressing force of the pressing nuts 328 of the first pressing jig 300C1 is released.

Therefore, after the pressing and fixing using the second pressing jig 300C2 is complete, an operation is performed to release the pressing and fixing by the push-on nuts 328 of the first pressing jig 300C1, from the upper opening of the cylindrical case valve body 330.

Figure 44:
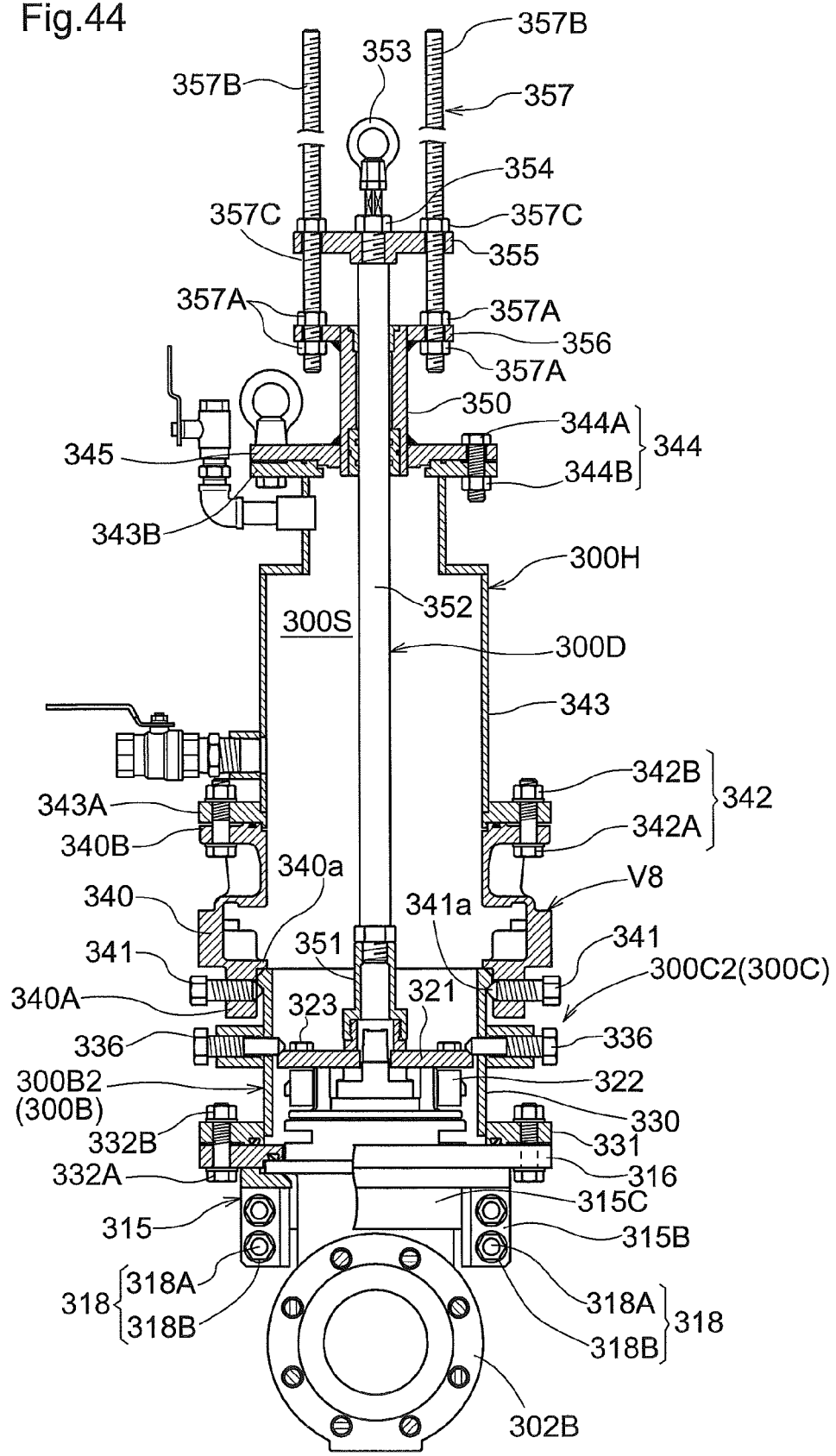
FIG. 44 is a partially cut-out front view at the time the work housing has been attached.

[4] FIG. 44 shows a housing attachment step, which is the step of attaching a work housing 300H, which is provided with a work open/close valve V8 and the elevation transport means 300D that is to be coupled to the bonnet 304, to the ring-shaped attachment frame 300B2 of the attachment base material 300B such that a watertight state is achieved.

A fitting position regulating ring-shaped protrusion 340a that comes into contact with the upper end surface of the cylindrical case valve body 330 from above is formed integrally with the inner surface of a fitting cylinder portion 340A of a valve case 340 of the work open/close valve V8, the fitting cylinder portion 340A being fitted onto and attached to the cylindrical case valve body 330 of the ring-shaped attachment frame 300B2 from above, and as shown in FIG. 43, a pulling bolt 341, which is provided with a tapered pressing surface 341a that horizontally comes into contact with a lower tapered surface 330b of a ring-shaped protrusion 330a formed to protrude on the upper end portion of the outer circumferential surface of the cylindrical case valve body 330, is screwed to a plurality of positions on the fitting cylinder portion 340A of the valve case 340 in the circumferential direction.

Also, an O-ring (not shown), which is an example of a seal material, is attached between opposing surfaces, namely an inner corner portion that is formed with the inner surface of the fitting cylinder portion 340A and the fitting position regulating ring-shaped protrusion 340a of the valve case 340, and an upper tapered surface 330c of the ring-shaped protrusion 330a of the cylindrical case valve body 330, and a configuration is adopted in which the fitting position regulating ring-shaped protrusion 340a of the valve case 340 is pulled and fixed to the upper end surface of the cylindrical case valve body 330 of the ring-shaped attachment frame 300B2 while the O-ring is compressed to be watertight by a fastening operation using the pulling bolt 341.

The work housing 300H is configured with: a work housing main valve body 343 provided with a lower coupling flange 343A that is to be coupled and fixed to an upper coupling flange 340B of the valve case 340 using bolts 342A and nuts 342B of a fifth fastening means 342 such that a watertight state is achieved; and a canopy 345 that is to be coupled and fixed to an upper flange 343B of the work housing main valve body 343 using bolts 344A and nuts 344B of a sixth fastening means 344 such that a watertight state is achieved.

A storage space 300S in which the bonnet 304 provided with the disc 306 and the stem 305 can be housed is formed within the work housing main valve body 343.

The elevation transport means 300D is configured such that an elevation shaft 352 penetrates through and is supported by a cylindrical shaft bearing portion 350 provided in a central portion of the canopy 345 of the work housing 300H so as to be slidable in the vertical direction, the coupling portion 351 that is detachably screwed and coupled to the coupling target portion 321d of the pressing member 321 is provided on the lower end portion of the elevation shaft 352, and a suspension ring 353 for moving up the bonnet 304 provided with the disc 306 and the stem 305 to the inside of the storage space 300S of the work housing main valve body 343 using a crane or the like, or suspending and transporting the work housing main valve body 343 in which the bonnet 304 is housed to a predetermined position using a crane or the like, is provided on the upper end portion of the elevation shaft 352.

Also, in order to attach another bonnet 304, a new covering body 360, or the like to the valve body 302 after the bonnet 304 has been removed, screw-type forcible feeding mechanisms 357 that lower another bonnet 304 or a new covering body 360 located at a predetermined storage position within the storage space 300S of the work housing main valve body 343 against water pressure, are provided between: two end portions of an elevation operation lever 355 that is fastened to the upper portion of the elevation shaft 352 using a nut 354; and two end portions of an attaching plate portion 356 that is formed on the upper end portion of the shaft bearing portion 350 so as to oppose the two end portions of the elevation operation lever 355 in the vertical direction.

The screw-type forcible feeding mechanisms 357 are configured with: elongated bolts 357B that are fastened to two end portions of the attaching plate portion 356 of the shaft bearing portion 350 using a pair of nuts 357A; and feeding nuts 357C that are respectively screwed onto the elongated bolts 357B so as to be in contact with the upper surfaces of the two end portions of the elevation operation lever 355.

In this housing attachment step, the bonnet 304 has been pressed and fixed to the valve body 302 side by performing a fastening operation using the plurality of push-on bolts 336 of the second pressing jig 300C2.

Note that, as shown in FIG. 44, it is possible to press and fix the bonnet 304 to the valve body 302 side by fastening the feeding nuts 357C of the screw-type forcible feeding mechanisms 357.

Figure 45:
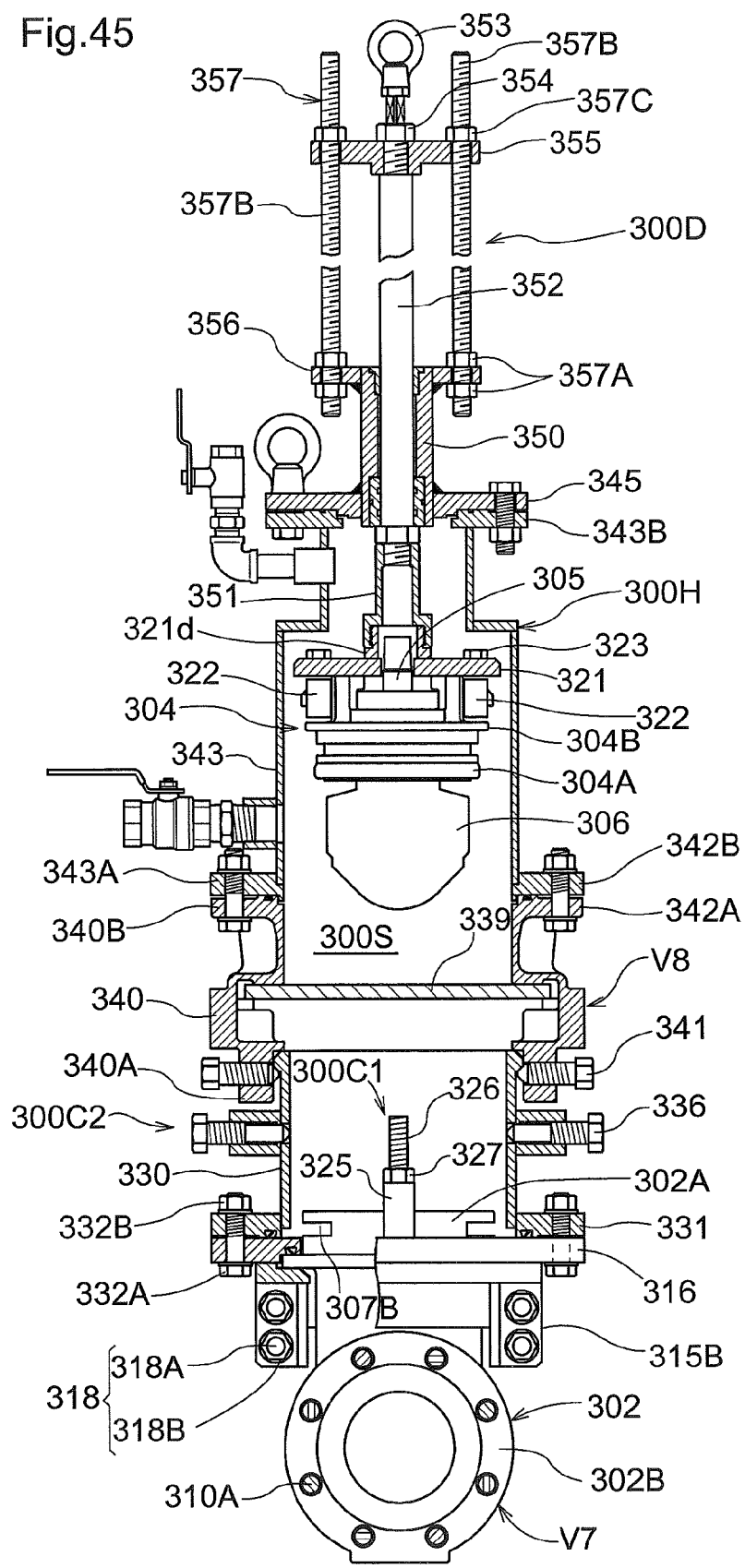
FIG. 45 is a partially cut-out front view at the time the bonnet is taken out to the storage space of the work housing.

[5] FIG. 45 shows the step of releasing the pressing and fixing by the second pressing jig 300C2 of the pressing means 300C, taking out the bonnet 304 to the inside of the storage space 300S of the work housing 300H using the elevation transport means 300D, and thereafter performing an operation to close the work open/close valve V8.

Specifically, an operation is performed to loosen the plurality of push-on bolts 336 of the second pressing jig 300C2, and the tapered pressing surface 336a of each push-on bolt 336 is removed outward in the radial direction from the tapered surface 321f formed on the outer peripheral portion of the upper surface of the pressing member 321.

Then, the bonnet 304 that is fitted to the valve body 302 is moved up to a predetermined storage position within the storage space 300S of the work housing main valve body 343 using a crane or the like coupled to the elevation shaft 352 of the elevation transport means 300D, and thereafter an operation is performed to close the disc 339 of the work open/close valve V8.

Figure 46:
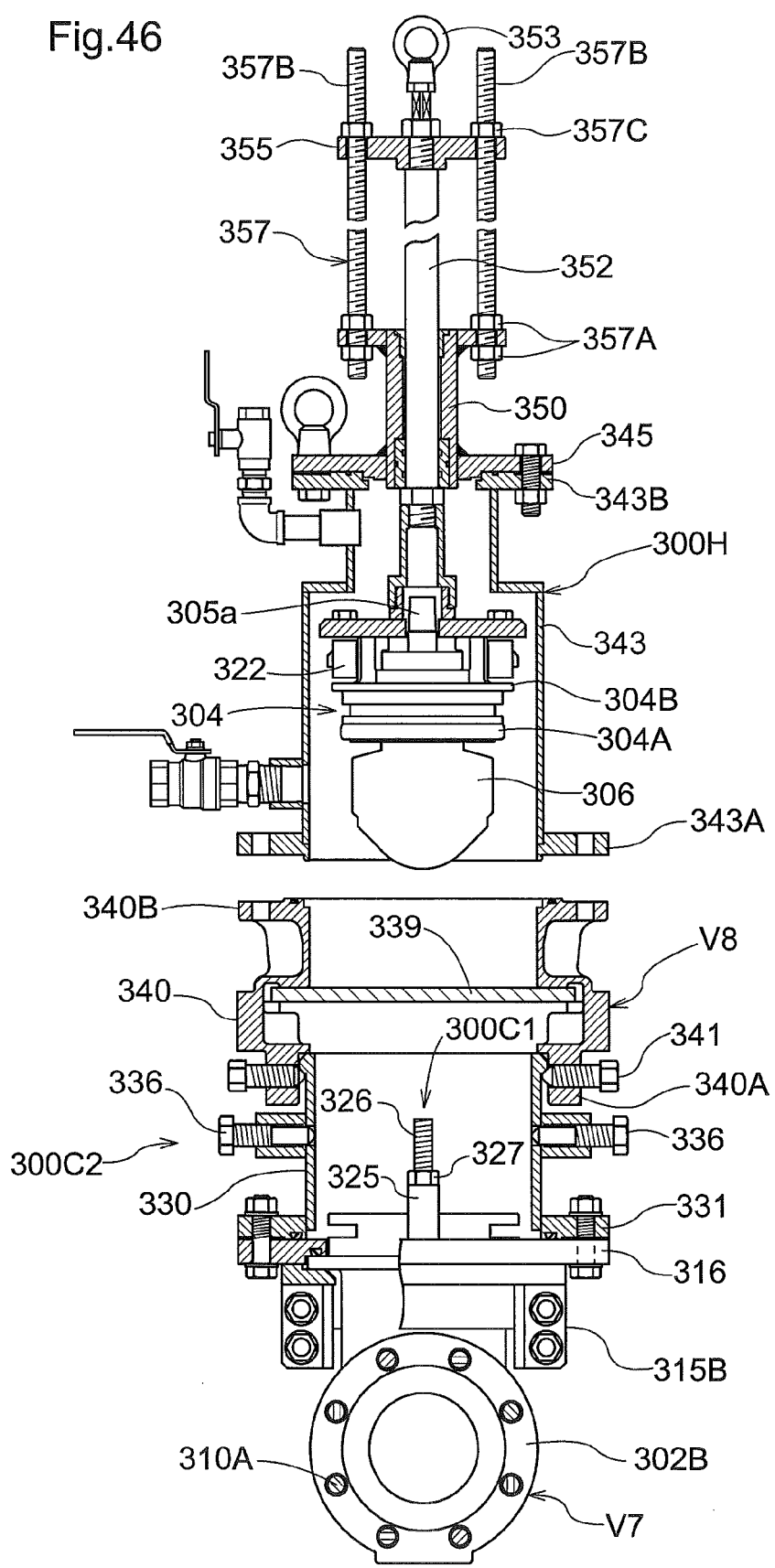
FIG. 46 is a partially cut-out front view at the time the work housing is divided and moved up from a work open/close valve.

[6] FIG. 46 shows the step of removing the bonnet 304 taken out to the inside of the storage space 300S of the work housing 300H.

In this removal step, the bolts 342A and the nuts 342B of the fifth fastening means 342 that couple and fix the upper coupling flange 340B of the valve case 340 and the lower coupling flange 343A of the work housing main valve body 343 to each other is removed, and the bonnet 304 that has been removed and the work housing main valve body 343 provided with the elevation transport means 300D are suspended and transported to a predetermined position using a crane or the like, and are removed.

[7] After the step of removing the bonnet 304, in the case of attaching another bonnet 304 to which at least a new disc 306 has been installed, the removal work steps described above are to be performed in an almost reverse order.

Specifically, after the step of removing the bonnet 304, the following steps are performed:

the step of coupling the coupling target portion 321d of another bonnet 304 to which at least a new disc 306 has been installed to the coupling portion 351 of the elevation shaft 352 of the elevation transport means 300D provided for the work housing 300H;

the step of coupling and fixing the lower coupling flange 343A of the work housing main valve body 343 of the work housing 300H and the upper coupling flange 340B of the valve case 340 of the work open/close valve V8 to each other in a watertight state using the bolts 342A and the nuts 342B of the fifth fastening means 342;

the step of performing an operation to open the disc 339 of the work open/close valve V8, thereafter performing an operation to fasten the feeding nuts 357C of the screw-type forcible feeding mechanisms 357, lowering the other bonnet 304 located within the storage space 300S of the work housing 300H toward the valve body 302 side together with the elevation shaft 352, and fitting and connecting the coupling inner fitting portion 304A of the other bonnet 304 to the coupling outer fitting portion 302A of the valve body 302;

the step of pressing and fixing the other bonnet 304 to the valve body 302 side using the second pressing jig 300C2 of the pressing means 300C;

the step of performing an operation to rotate the elevation shaft 352 to the unscrewing side to release the coupling of the coupling portion 351 of the elevation shaft 352 and the coupling target portion 321d of the other bonnet 304, thereafter performing an operation to unfix the pulling bolt 341 that couples and fixes the cylindrical case valve body 330 of the ring-shaped attachment frame 300B2 and the valve case 340 of the work open/close valve V8 to each other, and removing the work housing 300H, which is provided with the work open/close valve V8 and the elevation transport means 300D, from the cylindrical case valve body 330 of the ring-shaped attachment frame 300B2;

the step of coupling and fixing the coupling inner fitting portion 304A of the other bonnet 304 and the coupling outer fitting portion 302A of the valve body 302, which have been fitted and connected to each other, to each other using the lock members 307A of the lock means 307;

the step of releasing the pressure on the other bonnet 304 applied by the push-on bolts 336 of the second pressing jig 300C2, performing an operation to unfix the fourth fastening means 332 that couples and fixes the coupling flange 331 of the cylindrical case valve body 330 of the ring-shaped attachment frame 300B2 and the upper base member 316 of the attachment base portion 300B1 to each other, and removing the ring-shaped attachment frame 300B2 from the attachment base portion 300B1;

the step of performing an operation to unfix the bolts 323 that couple and fix the pressing member 321 and the contact member 322 to each other so as to clamp the pressing member 321 and the contact member 322 with the suspension hooks 304D of the other bonnet 304, and removing the pressing member 321 and the contact member 322 from the other bonnet 304; and the step of performing an operation to unfix the bolts 317A of the second fastening means 317 that couple and fix the upper base member 316 and the lower base member 315 of the attachment base portion 300B1 to each other, and removing the upper base member 316 and the lower base member 315 from the protruding portion 309 of the valve body 302.

In the fifth embodiment, it is possible to efficiently restore the gate valve V7 provided with the disc 306 that has reached the end of the rated useful life thereof, the disc 6 that has caused an operation failure, or the like while reducing the cost of work by fitting and connecting the coupling inner fitting portion 304A of another bonnet 304 to which at least a new disc 306 has been installed to the coupling outer fitting portion 302A of the valve body 302, and performing an operation to insert the lock members 307A of the lock means 307 and thereby coupling and fixing the coupling inner fitting portion 304A of the other bonnet 304 and the coupling outer fitting portion 302A of the valve body 302 to each other.

Note that after an operation is performed to lower the other bonnet 304 coupled to the elevation transport means 300D of the work housing 300H and the coupling inner fitting portion 304A thereof is fitted and connected to the coupling outer fitting portion 302A of the valve body 302, the removal work steps according to the above-described fifth embodiment may be performed in the reverse order, and an operation may be performed to insert the lock members 307A of the lock means 307, along the coupling inner fitting portion 304A of the other bonnet 304 and the coupling outer fitting portion 302A of the valve body 302 that are fitted and connected to each other. However, if it is possible to press and fix the other bonnet 304 to the valve body 302 in a watertight state using the elevation transport means 300D, and if a work window, a work arm, or the like that is for performing an operation to insert the lock members 307A from the outside of the attachment base material 300B has been installed to the attachment base material 300B, it is possible to couple and fix the coupling inner fitting portion 304A of the other bonnet 304 and the coupling outer fitting portion 302A of the valve body 302, which have been fitted and connected to each other, to each other using the lock members 307A when the other bonnet 304 is pressed and fixed to the valve body 302 in a watertight state using the elevation transport means 300D, without performing the steps according to the above-described fifth embodiment in the reverse order.

Sixth Embodiment

Figure 47:
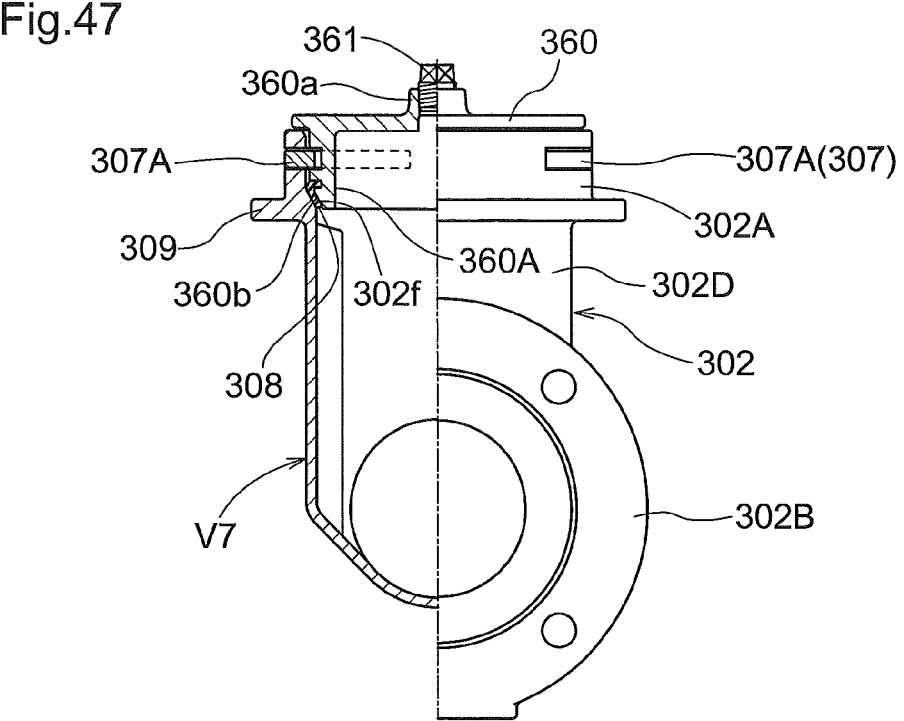
FIG. 47 is a partially cut-out front view showing a sixth embodiment of the present invention

In the fifth embodiment above, another bonnet 304 to which at least a new disc 306 has been installed is attached to the valve body 302. However, as shown in FIG. 47, the covering body 360 that closes the disc attaching port 303 of the valve body 302 in a watertight state may be attached instead of the other bonnet 304.

In the sixth embodiment, after the step of removing the bonnet 304 according to the fifth embodiment, the following steps are performed:

the step of coupling the coupling target portion of the covering body 360, in which a plug 361 has been attached to cylindrical portion 360a of the central portion, to the coupling portion of the elevation shaft 352 of the elevation transport means 300D provided for the work housing 300H;

the step of coupling and fixing the lower coupling flange 343A of the work housing main valve body 343 of the work housing 300H and the upper coupling flange 340B of the valve case 340 of the work open/close valve V8 to each other in a watertight state using the bolts 342A and the nuts 342B of the fifth fastening means 342;

the step of performing an operation to open the disc 339 of the work open/close valve V8, thereafter performing an operation to fasten the feeding nuts 357C of the screw-type forcible feeding mechanisms 357, lowering the covering body 360 located within the storage space 300S of the work housing 300H toward the valve body 302 side together with the elevation shaft 352, and fitting and connecting a coupling inner fitting portion 360A of the covering body 360 to the coupling outer fitting portion 302A of the valve body 302;

the step of pressing and fixing the covering body 360 to the valve body 302 side using the second pressing jig 300C2 of the pressing means 300C;

the step of releasing the coupling of the coupling portion of the elevation shaft 352 and the coupling target portion of the covering body 360, thereafter performing an operation to unfix the pulling bolt 341 that couples and fixes the cylindrical case valve body 330 of the ring-shaped attachment frame 300B2 and the valve case 340 of the work open/close valve V8 to each other, and removing the work housing 300H, which is provided with the work open/close valve V8 and the elevation transport means 300D, from the cylindrical case valve body 330 of the ring-shaped attachment frame 300B2;

the step of coupling and fixing the coupling inner fitting portion 360A of the covering body 360 and the coupling outer fitting portion 302A of the valve body 302, which have been fitted and connected to each other, to each other using the lock members 307A of the lock means 307;

the step of releasing the pressure on the covering body 360 applied by the push-on bolts 336 of the second pressing jig 300C2, performing an operation to unfix the fourth fastening means 332 that couples and fixes the coupling flange 331 of the cylindrical case valve body 330 of the ring-shaped attachment frame 300B2 and the upper base member 316 of the attachment base portion 300B1 to each other, and removing the ring-shaped attachment frame 300B2 from the attachment base portion 300B1; and the step of performing an operation to unfix the bolts 317A of the second fastening means 317 that couple and fix the upper base member 316 and the lower base member 315 of the attachment base portion 300B1 to each other, and removing the upper base member 316 and the lower base member 315 from the protruding portion 309 of the valve body 302.

The gasket 308, which is an example of a ring-shaped sealing material that is to be compressed between the tapered surfaces 360b and 302f to the extent in which the tapered surfaces 360b and 302f become watertight when the coupling inner fitting portion 360A of the covering body 360 is operated to be fitted to a predetermined attachment position relative to the coupling outer fitting portion 302A of the valve body 302, is attached to a seal attachment groove that is formed in the outer circumferential surface of the coupling inner fitting portion 360A of the covering body 360.

Note that the other configurations are the same as the configurations described in the fifth embodiment, and the same configuration parts are given the same numbers as in the fifth embodiment and the description thereof is omitted.

After an operation is performed to lower the coupling inner fitting portion 360A of the covering body 360 coupled to the elevation transport means 300D of the work housing 300H, and the coupling inner fitting portion 360A is fitted and connected to the coupling outer fitting portion 302A of the valve body 302, the steps according to the above-described fifth embodiment may be performed in an almost reverse order, and an operation may be performed to insert the lock members 307A of the lock means 307, along the coupling inner fitting portion 360A of the covering body 360 and the coupling outer fitting portion 302A of the valve body 302 that are fitted and connected to each other. However, if it is possible to press and fix the covering body 360 to the valve body 302 in a watertight state using the elevation transport means 300D, and if a work window, a work arm, or the like that is for performing an operation to insert the lock members 307A from the outside of the attachment base material 300B has been installed to the attachment base material 300B, it is possible to couple and fix the coupling inner fitting portion 360A of the covering body 360 and the coupling outer fitting portion 302A of the valve body 302, which have been fitted and connected to each other, to each other using the lock members 307A when the covering body 360 is pressed and fixed to the valve body 302 in a watertight state using the elevation transport means 300D, without performing the steps according to the above-described fifth embodiment in an almost reverse order.

Seventh Embodiment

Figure 48:
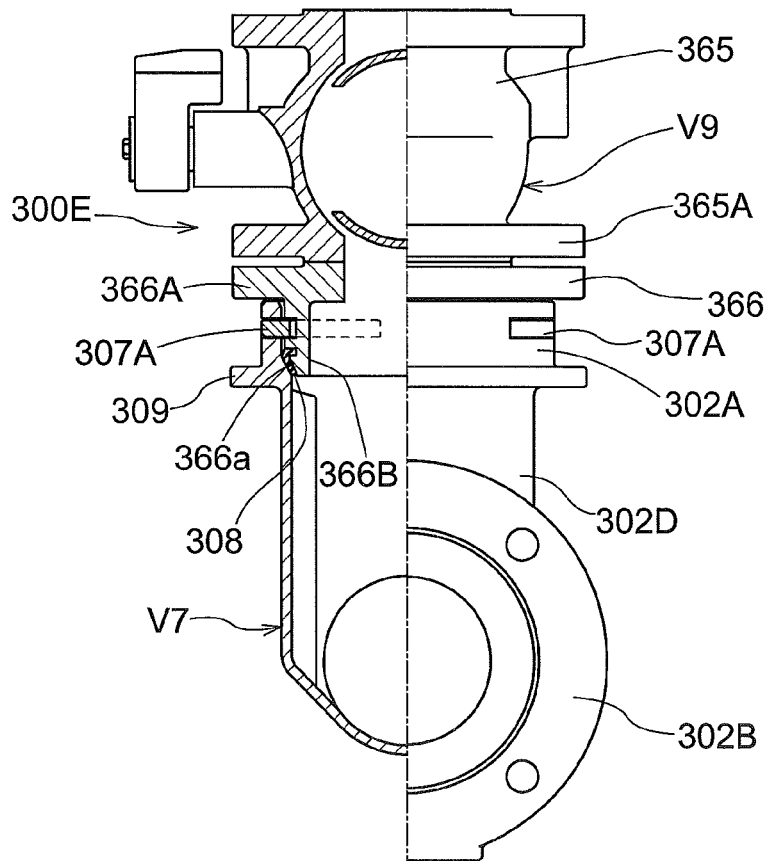
FIG. 48 is a partially cut-out front view showing a seventh embodiment of the present invention.

In the fifth embodiment above, another bonnet 304 to which at least a new disc 306 has been installed is attached to valve body 302. However, as shown in FIG. 48, a combined part 300E including a repair valve V9 and a valve attaching member 366 that is provided with a coupling inner fitting portion 366B that can be fitted and connected to the coupling outer fitting portion 302A of the valve body 302 may be attached instead of the other bonnet 304.

In this combined part 300E, a lower coupling flange 365A of a valve case 365 of the repair valve V9 and a coupling flange 366A of the valve attaching member 366 are coupled and fixed to each other in a watertight state using the bolts and nuts of a fastening means not shown in the drawing.

In the seventh embodiment, after the step of removing the bonnet 304 according to the fifth embodiment, the following steps are performed:

the step of coupling the coupling target portion provided for the repair valve V9 of the combined part 300E to the coupling portion of the elevation shaft 352 of the elevation transport means 300D provided for the work housing 300H;

the step of coupling and fixing the lower coupling flange 343A of the work housing main valve body 343 of the work housing 300H and the upper coupling flange 340B of the valve case 340 of the work open/close valve V8 to each other in a watertight state using the bolts 342A and the nuts 342B of the fifth fastening means 342;

the step of performing an operation to open the disc 339 of the work open/close valve V8, thereafter performing an operation to fasten the feeding nuts 357C of the screw-type forcible feeding mechanisms 357, lowering the combined part 300E located within the storage space 300S of the work housing 300H toward the valve body 302 side together with the elevation shaft 352, and fitting and connecting the coupling inner fitting portion 366B of the valve attaching member 366 to the coupling outer fitting portion 302A of the valve body 302;

the step of pressing and fixing the valve attaching member 366 to the valve body 302 side using the second pressing jig 300C2 of the pressing means 300C;

the step of releasing the coupling of the coupling portion of the elevation shaft 352 and the coupling target portion of the combined part 300E, thereafter performing an operation to unfix the pulling bolts 341 that couple and fix the cylindrical case valve body 330 of the ring-shaped attachment frame 300B2 and the valve case 340 of the work open/close valve V8 to each other, and removing the work housing 300H, which is provided with the work open/close valve V8 and the elevation transport means 300D, from the cylindrical case valve body 330 of the ring-shaped attachment frame 300B2;

the step of coupling and fixing the coupling inner fitting portion 366B of the valve attaching member 366 and the coupling outer fitting portion 302A of the valve body 302, which have been fitted and connected to each other, to each other using the lock members 307A of the lock means 307;

the step of releasing the pressure on the valve attaching member 366 applied by the push-on bolts 336 of the second pressing jig 300C2, performing an operation to unfix the fourth fastening means 332 that couples and fixes the coupling flange 331 of the cylindrical case valve body 330 of the ring-shaped attachment frame 300B2 and the upper base member 316 of the attachment base portion 300B1 to each other, and removing the ring-shaped attachment frame 300B2 from the attachment base portion 300B1; and the step of performing an operation to unfix the bolts 317A of the second fastening means 317 that couple and fix the upper base member 316 and the lower base member 315 of the attachment base portion 300B1 to each other, and removing the upper base member 316 and the lower base member 315 from the protruding portion 309 of the valve body 302.

The gasket 308, which is an example of a ring-shaped sealing material that is to be compressed between the tapered surfaces 366a and 302f to the extent in which the tapered surfaces 366a and 302f become watertight when the coupling inner fitting portion 366B of the valve attaching member 366 is operated to be fitted to a predetermined attachment position relative to the coupling outer fitting portion 302A of the valve body 302, is attached to a seal attachment groove that is formed in the outer circumferential surface of the coupling inner fitting portion 366B of the valve attaching member 366.

Note that the other configurations are the same as the configurations described in the fifth embodiment, and the same configuration parts are given the same numbers as in the fifth embodiment and the description thereof is omitted.

After an operation is performed to lower the combined part 300E including the repair valve V9 and the valve attaching member 366 and coupled to the elevation transport means 300D of the work housing 300H, and the coupling inner fitting portion 366B of the valve attaching member 366 is fitted and connected to the coupling outer fitting portion 302A of the valve body 302, the steps according to the above-described fifth embodiment may be performed in an almost reverse order, and an operation may be performed to insert the lock members 307A of the lock means 307, along the coupling inner fitting portion 366B of the valve attaching member 366 and the coupling outer fitting portion 302A of the valve body 302 that are fitted and connected to each other. However, if it is possible to press and fix the valve attaching member 366 to the valve body 302 in a watertight state using the elevation transport means 300D, and if a work window, a work arm, or the like that is for performing an operation to insert the lock members 307A from the outside of the attachment base material 300B has been installed to the attachment base material 300B, it is possible to couple and fix the coupling inner fitting portion 366B of the valve attaching member 366 and the coupling outer fitting portion 302A of the valve body 302, which have been fitted and connected to each other, to each other using the lock members 307A when the valve attaching member 366 is pressed and fixed to the valve body 302 in a watertight state using the elevation transport means 300D, without performing the steps according to the above-described fifth embodiment in an almost reverse order.

Eighth Embodiment

Figure 49:
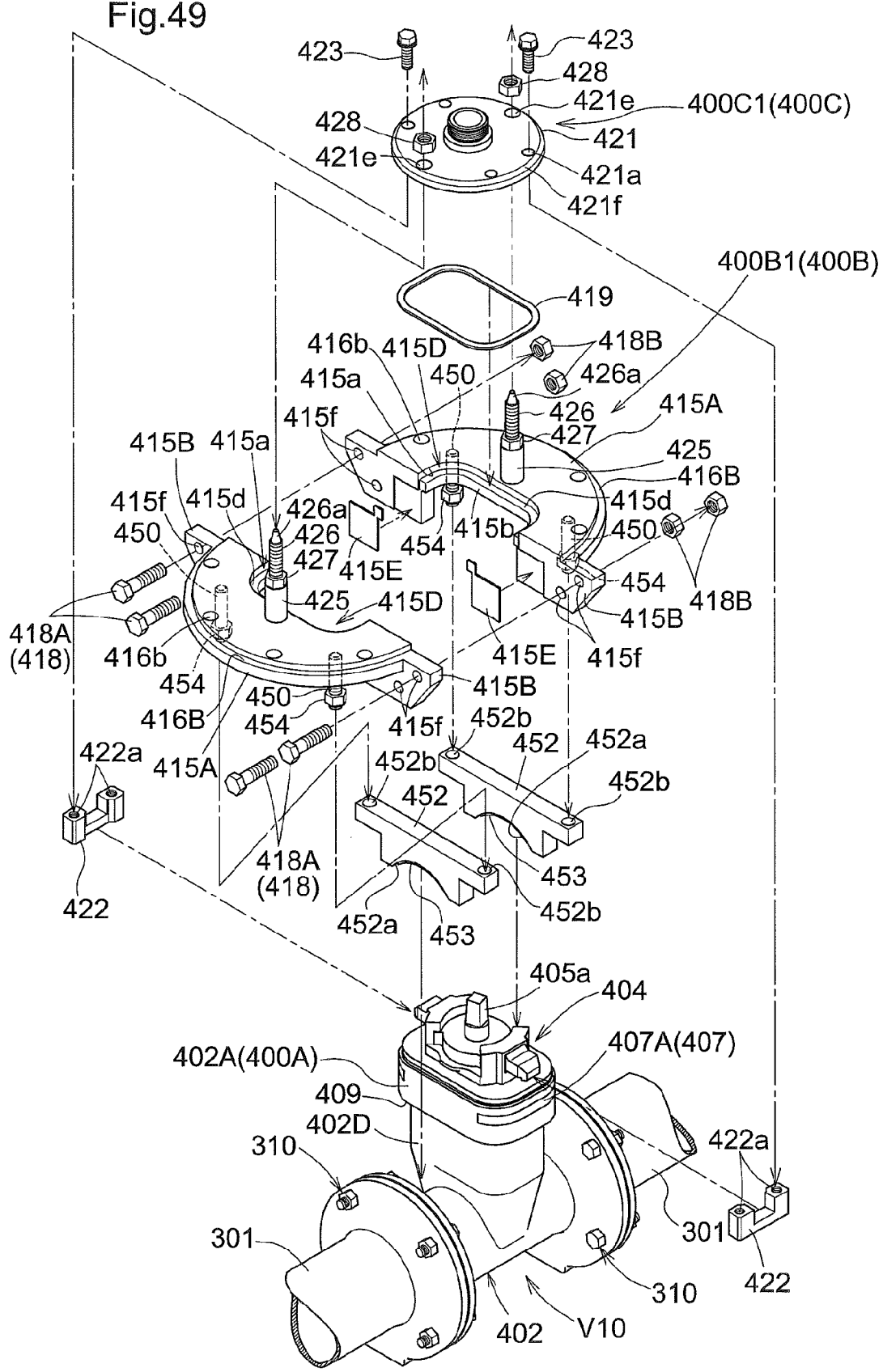
FIG. 49 is an exploded perspective view at the time an attachment base portion showing an eighth embodiment of the present invention is to be attached.
Figure 50:
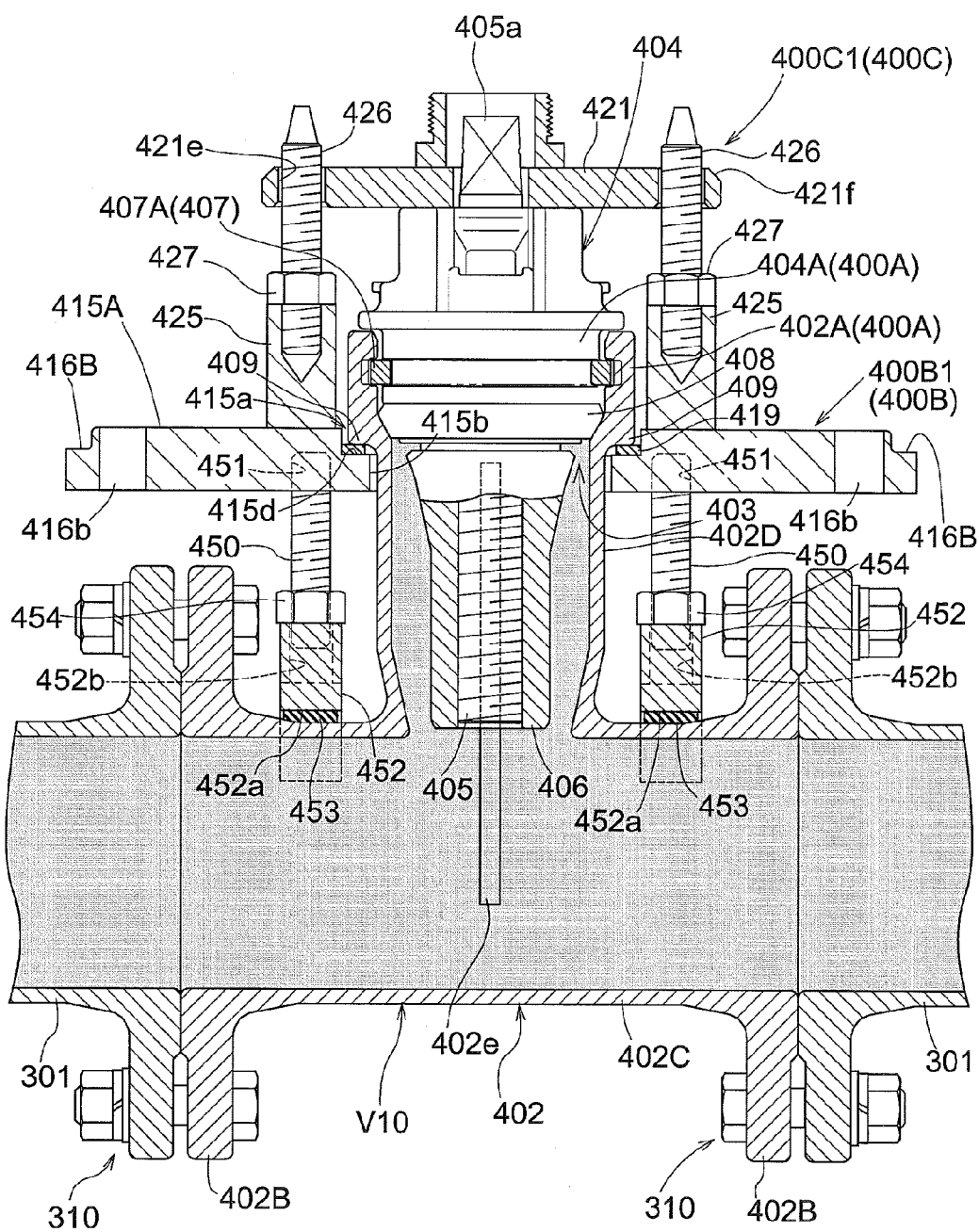
FIG. 50 is a vertical cross-sectional view at the time the attachment base portion has been attached.
Figure 51:
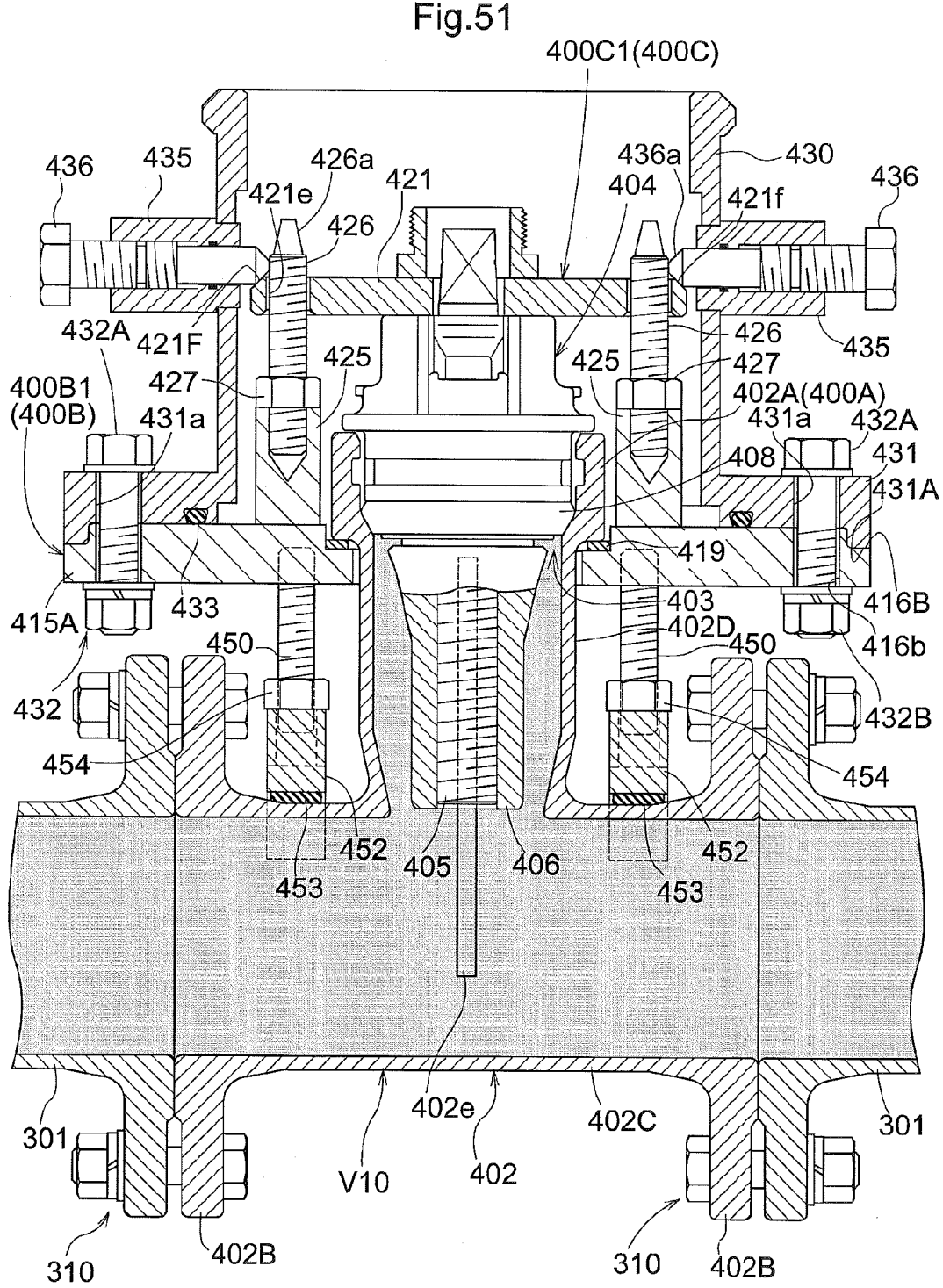
FIG. 51 is a vertical cross-sectional view at the time the ring-shaped attachment frame has been attached.

FIG. 49 to FIG. 51 show a bonnet removal method for removing a bonnet 404 of a gate valve V10 having a configuration that is slightly different from that of the gate valve V7 according to the fifth embodiment by using an attachment base material 400B having a configuration that is slightly different from that of the ring-shaped attachment base material B according to the fifth embodiment.

The gate valve V10 is provided with a valve body 402, a disc attaching port 403, the bonnet 404, a stem 405, and a disc 406 which have basically the same configurations as those of the gate valve V10 in the fifth embodiment. The gate valve V10 has a lock means 407 that is an example of a coupling means for coupling and fixing the valve body 402 and the bonnet 404 to each other so as to be detachable, that includes a pair of lock members 407A that can be externally and laterally inserted into and removed from a coupling outer fitting portion 402A on the valve body 402 side and a coupling inner fitting portion 404A on the bonnet 404 side, which constitute a fitting coupling portion 400A of the valve body 402 and the bonnet 404, and that, in an engaged state where the lock members 407A are inserted, couples and fixes the valve body 402 and the bonnet 404 to each other such that a watertight state is achieved.

Also, a ring-shaped locking stepped portion (an example of a locking stepped portion) 409 that has an approximately L shape in a vertical cross-sectional view is formed on the outer surface (outer circumferential surface) of the valve body 402 of the gate valve V10. Specifically, the ring-shaped locking stepped portion 409 is formed as a ring-shaped locking stepped portion 409 that has an approximately L shape such that the outer surface of the coupling outer fitting portion 402A of the valve body 402 is formed to protrude further outward than a vertically-oriented valve body portion 402D along the entire circumference, and an outer portion on the lower end side of the coupling outer fitting portion 402A extends approximately horizontally and approximately vertically. Therefore, the ring-shaped locking stepped portion 409 is formed on a lower end part of the outer surface of the coupling outer fitting portion 402A, which is displaced downward from an insertion/removal operation position for the lock members 407A. In the eighth embodiment, the protruding portion (an example of a locking stepped portion) 309 according to the fifth embodiment is not provided on the outer surface of the coupling outer fitting portion 402A of the valve body 402, and the outer surface of the coupling outer fitting portion 402A is formed to have the shape of a straight line that extends approximately vertically in a vertical cross-sectional view.

FIG. 49 shows, from among attachment base material attaching steps by which the attachment base material 400B that surrounds the outer circumferential surface side of the bonnet 404 is detachably fitted onto and fixed to the valve body 402, the step of fixing an attachment base portion 400B1 in the state of being pressed from below, which constitutes the lower side of the attachment base material 400B, to the ring-shaped locking stepped portion 409 that is formed integrally with the lower end part of the coupling outer fitting portion 402A of the valve body 402, such that an operation to insert/remove the lock members 407A is allowed.

The attachment base material 400B is provided with: the ring-shaped attachment base portion 400B1 that has a dividable structure and that is to be pressed against and detachably fixed to the ring-shaped locking stepped portion 409 on the coupling outer fitting portion 402A of the valve body 402 from below; and a ring-shaped attachment frame 400B2 that is detachably coupled and fixed to the attachment base portion 400B1 so as to surround the outer peripheral side of the bonnet 404. The attachment base portion 400B1 is provided with a pressing means 400C for pressing and fixing a coupling inner fitting portion 404A of the bonnet 404 to the coupling outer fitting portion 402A of the valve body 402 such that a watertight state is achieved, via a pressing member 421 that is detachably attached to the bonnet 404. Note that the configuration of the pressing means 400C is approximately the same as the configuration of the pressing means 300C according to the fifth embodiment, and the pressing means 400C is provided with a first pressing jig 400C1 that is installed on the attachment base portion 400B1 side and a second pressing jig 400C2 that is installed on the ring-shaped attachment frame 400B2 side as described below.

The attachment base portion 400B1 is integrally provided with: two divisional plate portions 415A that are divided from each other at a central position of the coupling outer fitting portion 402A of the valve body 402 in the short side direction and that has an approximately semi-circular shape in plan view; and coupling plate portions 415B that are each provided on either one of the two end portions of each divisional plate portion 415A so as to protrude downward.

A fitting recessed portion 415D that is to be fitted to a half area that has an approximately flat U shape and extends along one long side portion and halves of the two short side portions of the ring-shaped locking stepped portion 409 of the coupling outer fitting portion 402A is formed on the upper surface of each divisional plate portions 415A. The fitting recessed portion 415D is configured such that, in a state where a bottom surface 415d of the fitting recessed portion 415D and a side surface 415a that is continuous therewith and has an approximately flat U shape are in contact with the lower surface and the circumferential surface of the ring-shaped locking stepped portion 409, the two divisional plate portions 415A and the ring-shaped locking stepped portion 409 are prevented from moving relative to each other in the horizontal direction. Also, an approximately flat U-shaped inner circumferential surface 415b of each divisional plate portion 415A is configured to extend along, and come into contact with or come into the vicinity of, the outer circumferential surface of the vertically-oriented valve body portion 402D of the valve body 402.

A ring-shaped fitting groove portion 416B to which a ring-shaped leg portion 431A, which is formed to protrude downward on the outer peripheral end portion of the lower surface of a coupling flange 431 of the ring-shaped attachment frame 400B2, is to be fitted, and that prevents the attachment base portion 400B1 and the coupling flange 431 of the ring-shaped attachment frame 400B2 from moving relative to each other in the horizontal direction, is formed on the upper surface of the attachment base portion 400B1.

A ring-shaped sheet packing 419 that brings the bottom surface 415d of the attachment base portion 400B1 and the lower surface of the ring-shaped locking stepped portion 409 into a watertight state is attached at the position on the bottom surface 415d of the fitting recessed portion 415D of the attachment base portion 400B1 corresponding to the lower surface of the locking stepped portion 409 of the valve body 402.

Attachment female screw holes 451 are respectively formed in the parts of the lower surface of each divisional plate portions 415A of the attachment base portion 400B1 corresponding to the outer side of the two corners (two angular portions) of the fitting recessed portion 415D (two attachment female screw holes 451 for each divisional plate portion 415A). One end side of a double-end bolt 450, which will be described below, can be screwed into each attachment female screw hole 451 from below.

The attachment base portion 400B1 is provided with a pair of plate-shaped reaction force receiving members 452 on the outer circumferential surface of a horizontally-oriented valve body portion 402C between the vertically-oriented valve body portion 402D and a coupling flange 402B. The pair of plate-shaped reaction force receiving members 452 are attached from above so as to be parallel to the lateral cross section of the horizontally-oriented valve body portion 402C.

Each of the plate-shaped reaction force receiving members 452 is provided with: an arc-shaped lower surface 452a that comes into contact with the outer circumferential surface of the horizontally-oriented valve body portion 402C via an elastic member 453; through holes 452b that are each formed in either one of the two end portions of the plate-shaped reaction force receiving member 452 at a position that is further on the end portion side than the arc-shaped lower surface 452a; the double-end bolts 450 that can be inserted into the through holes 452b; and pressing nuts 454 that can be screwed to the double-end bolts 450 inserted into the through holes 452b.

In the step of attaching the attachment base portion 400B1, the attachment base portion 400B1 is attached such that the arc-shaped lower surface 452a of each reaction force receiving member 452 comes into contact with the outer circumferential surface of the horizontally-oriented valve body portion 402C between the vertically-oriented valve body portion 402D and the coupling flange 402B via the elastic member 453. An operation is performed to attach the divisional plate portions 415A to the ring-shaped locking stepped portion 409 formed integrally with the coupling outer fitting portion 402A of the valve body 402 from the short side direction of the ring-shaped locking stepped portion 409 (the pipe axis direction of the water pipes 301) in the state where one end side of a double-end bolt 450 has been screwed into each attachment female screw hole 451 formed in the lower surfaces of the divisional plate portions 415A and a pressing nut 454 has been screwed to the other end side, and the bottom surface 415d and the side surface 415a, which has an approximately flat U shape, of the fitting recessed portion 415D of each divisional plate portion 415A are brought into contact with the lower surface and the circumferential surface of the ring-shaped locking stepped portion 409. In this regard, a configuration is adopted in which the sheet packing 419 is attached at a position between the bottom surface 415d of the fitting recessed portion 415D and the lower surface of the ring-shaped locking stepped portion 409 such that a watertight state can be maintained, and the other end side (below the position to which the pressing nut 454 is screwed) of each double-end bolt 450 screwed into the attachment female screw hole 451 is inserted into the through hole 452b of the corresponding reaction force receiving member 452. Note that the order in which the reaction force receiving members 452, the double-end bolts 450, the pressing nuts 454, and the divisional plate portions 415A are attached is not limited to the above-described order and may be changed as appropriate insofar as the members can be reliably attached.

The two coupling plate portions 415B that oppose each other in this state are fastened to each other using bolts 418A and nuts 418B of a third fastening means 418 that are inserted into second bolt insertion holes 415f formed in the coupling plate portions 415B, with a sheet packing 415E intervened between the joint surfaces of the two coupling plate portions 415B, and thereafter an operation is performed to screw the pressing nuts 454, which have been screwed to the two double-end bolts 450, toward the pressing side (in the direction in which the pressing nuts 454 and the two coupling plate portions 415B are separated relative to each other) until the lower surfaces of the pressing nuts 454 come into contact with the upper surfaces of the reaction force receiving members 452 and the bottom surface 415d of the fitting recessed portion 415D of each coupling plate portion 415B are reliably pressed and fixed to the lower surface of the ring-shaped locking stepped portion 409 with the sheet packing 419 therebetween in a watertight state.

Next, FIG. 50 and FIG. 51 show: a first pressing step, which is the step of pulling the bonnet 404 and pressing it against the valve body 402 via the pressing member 421 detachably attached to the bonnet 404, using the first pressing jig 400C1 provided for the attachment base portion 400B1 of the attachment base material 400B, thereby maintaining a gasket 408 provided between the coupling inner fitting portion 404A of the bonnet 404 and the coupling outer fitting portion 402A of the valve body 402 in a watertight state; and a lock release step, which is the step of pulling out the lock members 407A of the lock means 407 in a state where the removal resistance due to the resilient recovery force of the gasket 408 has been eliminated or reduced, thereby releasing the coupling and fixing of the coupling outer fitting portion 402A of the valve body 402 and the coupling inner fitting portion 404A of the bonnet 404.

The first pressing jig 400C1 is configured such that a pair of first threaded cylinders 425 with a female thread are fixed at the sides of a central portion in the long side direction of the fitting recessed portion 415D on the upper surfaces of the divisional plate portions 415A, bolts 426 that are inserted into fourth bolt insertion holes 421e respectively formed at two positions on the pressing member 421 in the circumferential direction are screwed and fixed to the two first threaded cylinders 425 using lock nuts 427, and a push-on nut 428 that presses and fixes the bonnet 404 to the valve body 402 side according to a fastening operation in a state where the push-on nut 428 is in contact with the upper surface of the pressing member 421, is screwed to an upper portion of each bolt 426.

In a state where the gasket 408 is compressed between the tapered surface (not shown) of the coupling inner fitting portion 404A of the bonnet 404 and the tapered surface (not shown) of the coupling outer fitting portion 402A of the valve body 402 due to the fastening operation using the push-on nuts 428 of the first pressing jig 400C1, the insertion and removal resistance that acts against the lock members 407A due to the resilient recovery force of the gasket 408 can be eliminated or reduced. In this state, the lock members 407A are pulled out, and the coupling and fixing of the coupling outer fitting portion 402A of the valve body 402 and the coupling inner fitting portion 404A of the bonnet 404 is released.

Next, FIG. 51 shows: the step of attaching the cylindrical ring-shaped attachment frame 400B2 that has a height that is sufficient to surround the entire circumference of the bonnet 404, i.e., a height that is greater than the height from the upper surfaces of the divisional plate portions 415A to the upper edge of the rotational operation portion 405a of the stem 405, to the attachment base portion 400B1 of the attachment base material 400B such that a watertight state is achieved; a second pressing step, which is the step of, after attaching the ring-shaped attachment frame 400B2, pressing and fixing the bonnet 404 in the state of being pressed toward the valve body 402 side, using the second pressing jig 400C2 of the pressing means 400C that is provided for the ring-shaped attachment frame 400B2 and that can be operated from the outside; and the step of, after completing the pressing and fixing using the second pressing jig 400C2, releasing the pressing and fixing by the push-on nuts 428 of the first pressing jig 400C1.

Sixth bolt insertion holes 431a are formed in the coupling flange 431 formed on the lower end portion of the cylindrical case valve body 430 included in the ring-shaped attachment frame 400B2, respectively at positions that correspond to fifth bolt insertion holes 416b formed in the divisional plate portions 415A, and on the outer peripheral side of the sixth bolt insertion holes 431a, the ring-shaped leg portion 431A that is formed to protrude downward from the outer peripheral end portion of the lower surface of the coupling flange 431. Due to a fastening operation using bolts 432A and nuts 432B of a fourth fastening means 432 that are inserted into the fifth bolt insertion holes 416b and the six bolt insertion holes 431a, which is performed in a state where the ring-shaped leg portion 431A of the ring-shaped attachment frame 400B2 is fitted into the ring-shaped fitting groove portion 416B of the attachment base portion 400B1, the attachment base portion 400B1 and the ring-shaped attachment frame 400B2 are reliably fixed in a watertight state via an O-ring 433.

The second pressing jig 400C2 of the pressing means 400C is configured by: fixing threaded cylinders 435, which are in communication with the inner space of the cylindrical case valve body 430, to a plurality of positions (four positions in the present embodiment) on the cylindrical case valve body 430 in the circumferential direction such that their screw axes are located on the horizontal axis that passes through the upper surface of the pressing member 421 or the vicinity thereof; and screwing a push-on bolt 436, which is provided with a tapered pressing surface 436a that horizontally comes into contact with a tapered surface 421f formed on the outer peripheral portion of the upper surface of the pressing member 421, to each threaded cylinder 435.

In a state where the bonnet 404 is pressed and fixed to the valve body 402 side by the fastening operation using the plurality of push-on bolts 436 of the second pressing jig 400C2, the watertight state in which the gasket 408 inserted between the tapered surface (not shown) of the coupling inner fitting portion 404A of the bonnet 404 and the tapered surface (not shown) of the coupling outer fitting portion 402A of the valve body 402 is compressed is maintained even if the pressing force of the push-on nuts 428 of the first pressing jig 400C1 is released.

Subsequently, although not shown in the drawings, in the same manner as in the fifth embodiment, after the pressing and fixing operation using the second pressing jig 400C2 is complete, an operation is performed to release the pressing and fixing by the push-on nuts 428 of the first pressing jig 400C1, from the upper opening of the cylindrical case valve body 430, a work target part of the gate valve V10 is sealed by attaching the work housing, which is provided with the work open/close valve and the elevation transport means that is to be coupled to the bonnet 404, to the ring-shaped attachment frame 400B2 of the attachment base material 400B such that a watertight state is achieved, the bonnet 404 is removed from the valve body 402 without stopping the flow of water, and thereafter another bonnet 402 is attached to a disc attaching port of the valve body 402 in a watertight state.

Other Embodiments (1) In the embodiments above, the ring-shaped protruding portion 309 to which the ring-shaped attachment base material 300B can be attached in a clamping state is formed integrally with the lower end part of the outer circumferential surface of the coupling outer fitting portion 302A of the valve body 302, which is displaced downward from the insertion/removal operation position for the lock members 307A. However, the protruding portion 309 may be intermittently formed in the circumferential direction of the coupling outer fitting portion 302A of the valve body 302.

(2) In the embodiments above, the lock means 307 is formed with: the plate-shaped lock members 307A; the outer engagement holes formed in the coupling outer fitting portion 302A of the valve body 302; and the inner engagement recessed portions 307C formed in the coupling inner fitting portion 304A of the bonnet 304. However, the configuration of the lock means 307 is not limited to this configuration, and any configuration may be adopted insofar as the lock members 307A allow an operation to insert and remove the lock members 307A to and from the outer engaged portions formed in the coupling outer fitting portion 302A of the valve body 302 and the inner engaged portions formed in the coupling inner fitting portion 304A of the bonnet 304.

(3) In the embodiments above, the ring-shaped attachment base material 300B that is to be attached to the valve body 302 so as to allow an operation to insert/remove the lock members 307A is configured with separated bodies, namely the attachment base portion 300B1 that is to be attached to a part of the valve body 302 that is located lower than the insertion/removal operation position for the lock members 307A, in a watertight state, and the ring-shaped attachment frame 300B2 that is to be attached to the attachment base portion 300B1 in a watertight state and that surrounds at least part of the bonnet 304. However, the attachment base portion 300B1 and the ring-shaped attachment frame 300B2 may be formed integrally with each other.

(4) In the embodiments above, the pressing means 300C that presses the bonnet 304 against the valve body 302 is configured with: the first pressing jig 300C1 that is provided within an area of the attachment base portion 300B1 that corresponds to the inner space of the ring-shaped attachment frame 300B2; and the second pressing jig 300C2 that is provided for the ring-shaped attachment frame 300B2 and that can be operated from the outside. However, the pressing means 300C may be configured with a single pressing jig.

(5) In the embodiments above, the flange joint type gate valve V7 provided with coupling flanges 302B for the upstream and downstream water pipes 301 has been described as an example. However, the gate valve may be a gate valve V7 having at least one end portion side that is configured as a reception port or an insertion port.

(6) The shape of the fitting coupling portion 300A of the valve body 302 and the bonnet 304, the shape of the attachment base material 300B, the shape of the pressing means 300C, the shape of the housing 300H, the shape of the elevation transport means 300D, and the shape of the work open/close valve V8 may each be modified as appropriate depending on various conditions.

(7) In the embodiments above, the protruding portion 309 formed on the outer surface of the valve body 302 or the ring-shaped locking stepped portion 409 formed on the outer surface of the valve body 402 are adopted as a locking stepped portion. However, a locking stepped portion having any other configuration may be adopted insofar as the configuration allows an operation to insert/remove the lock members on the outer surface of the valve body.

INDUSTRIAL APPLICABILITY

As described above, it is possible to provide: a gate valve bonnet removal method that makes it possible to reduce the cost of the work for removing a bonnet provided with a disc and a stem without stopping the flow of water, and to also efficiently and easily perform the work to install a repair valve or the like at a later date; a valve removal method; and a bonnet removal attachment that is useful for the bonnet removal method. Also, as described above, it is possible to provide a method for removing a bonnet of a gate valve that makes it possible to efficiently and easily perform the work to remove a bonnet provided with a disc and a stem without stopping the flow of water while reducing the cost of work, and a gate valve that contributes to the efficiency and the easiness of the removal work.

REFERENCE SIGNS LIST

B: attachment
B1: first attachment
B2: second attachment
C: pressing means
C1: first pressing jig
C2: second pressing jig
D: elevation transport means
E: attachment jig
H: work housing
S: storage space
V1: gate valve
V2: work open/close valve
V3: repair valve
V4: air valve
V5: gate valve
2: valve body
2A: coupling outer fitting portion
3: disc attaching port
4: bonnet
4A: coupling inner fitting portion
5: stem
6: disc
7: coupling means (lock means)
7A: lock member
9: protruding portion (locking stepped portion)
21: pressing member
21e: bolt insertion hole (fourth bolt insertion hole)
26: bolt
26a: tip portion (insertion guide portion)
28: nut (push-on nut)
60: inner plug
61: short pipe
67: second coupling means
70: second pressing member
73: engaging portion
74: engaged portion
75: operation rod
90: coupling means (ninth fastening means)
300A: fitting coupling portion
300B: attachment base material
300B1: attachment base portion
300B2: ring-shaped attachment frame
300C: pressing means
300C1: first pressing jig
300C2: second pressing jig
300D: elevation transport means
300E: combined part
300H: work housing
300S: storage space
V7: gate valve
V8: work open/close valve
V9: repair valve
302: valve body
302A: coupling outer fitting portion
303: disc attaching port
304: bonnet 304A: coupling inner fitting portion
305: stem
306: disc
307: lock means
307A: lock member
309: protruding portion (locking stepped portion)
321: pressing member
360: covering body
360A: coupling inner fitting portion
366: valve attaching member
366A: coupling inner fitting portion

The invention claimed is:

1. A gate valve bonnet removal method for removing a bonnet provided with a disc and a stem from a valve body of a gate valve while maintaining a flow of fluid in a fluid piping system, the gate valve being provided with; the valve body that is connected to the fluid piping system; the bonnet that is detachably coupled and fixed to the valve body by a coupling means; and the disc that is detachably attached to the gate valve from a disc attaching port of the valve body via the stem that is provided to penetrate the bonnet, the gate valve bonnet removal method comprising:
   a step of detachably fixing an attachment to the valve body, the attachment surrounding an outer peripheral side of the bonnet;
   a step of pressing and fixing the bonnet to the valve body in a sealed state by using a pressing means provided for the attachment;
   a step of releasing the coupling means from coupling, in a state where the bonnet is being pressed and fixed by the pressing means;
   a step of attaching a work housing to the attachment and sealing a work target part of the gate valve, the work housing being provided with a work open/close valve and an elevation transport means that is to be connected to the bonnet;
   a step of releasing the pressing and fixing by the pressing means, taking out the bonnet provided with the disc and the stem to an inside of a storage space of the work housing by using the elevation transport means, and thereafter performing an operation to close the work open/close valve and removing the bonnet thus taken out;
   a step of attaching a short pipe to the elevation transport means of the work housing, the short pipe having a flow channel that is in communication with the disc attaching port of the valve body and to which an inner plug has been detachably attached;
   a step of performing an operation to open the work open/close valve, attaching the short pipe to the valve body by using the elevation transport mean and pressing and fixing the short pipe to the valve body in a sealed state by using the pressing means provided for the attachment; and
   a step of removing the work housing provided with the work open/close valve and the elevation transport means from the attachment, coupling and fixing the short pipe and the valve body, which have been pressed and fixed to each other by the pressing means, to each other by using a second coupling means, and thereafter removing the attachment provided with the pressing means from the valve body.

2. The gate valve bonnet removal method according to claim 1, wherein
   a step of coupling and fixing a repair valve to the short pipe or a second short pipe coupled to the short pipe, the repair valve being provided with a flow channel through which the inner plug can pass;
   a step of coupling and fixing a work case to the repair valve, the work case being able to house the inner plug;
   a step of removing the inner plug from the short pipe by using an operation rod connected to the inner plug of the short pipe, and collecting the inner plug thus removed to an inside of the work case via the repair valve that is open; and
   a step of performing an operation to close the repair valve and removing the work case in which the inner plug has been collected
   are performed after the step of removing the attachment.

3. The gate valve bonnet removal method according to claim 2, wherein
   a step of installing an air valve to the repair valve is performed after the step of removing the work case.

4. A valve removal method for, after the air valve is installed to the repair valve using the gate valve bonnet removal method according to claim 3, removing the air valve and the repair valve without stopping a flow of fluid, and sealing a flow channel of the short pipe with the inner plug, the valve removal method comprising:
   a step of performing an operation to close the repair valve, and removing the air valve from the repair valve;
   a step of coupling and fixing the work case provided with the operation rod to the repair valve from which the air valve has been removed, the operation rod having a tip to which the inner plug has been detachably attached;
   a step of performing an operation to open the repair valve, thereafter performing an operation to push in the operation rod, and attaching the inner plug from the work case to the short pipe in a sealed state via the repair valve or via the repair valve and air inside of the second short pipe; and
   a step of, after attaching the inner plug, removing the repair valve and the work case, or the second short pipe, the repair valve, and the work case from the short pipe.

5. The gate valve bonnet removal method according to claim 1, wherein
   the coupling means is configured with a lock means that has a lock member that can be externally inserted into and removed from a fitting connection part between a coupling outer fitting portion of the valve body and a coupling inner fitting portion of the bonnet, and that, in an engaged state where the lock member is inserted, couples and fixes the coupling outer fitting portion of the valve body and the coupling inner fitting portion of the bonnet to each other in a sealed state, and in the step of releasing the coupling means from coupling, the lock member of the lock means is removed and the coupling and fixing of the coupling outer fitting portion of the valve body and the coupling inner fitting portion of the bonnet is released.

6. The attachment for bonnet removal used in the gate valve bonnet removal method according to claim 1, comprising: a first attachment configured to be detachably fixed to a locking stepped portion formed on an outer surface of the valve body; and a second attachment configured to be detachably coupled and fixed to the first attachment so as to surround an outer peripheral side of the bonnet, wherein the attachment is provided with the pressing means that presses and fixes a coupling target portion of the bonnet to a coupling portion of the valve body in a sealed state via a pressing member detachably attached to the bonnet.

7. The attachment for bonnet removal according to claim 6, wherein the first attachment is detachably fixed to a protruding portion serving as the locking stepped portion, in a clamping state.

8. The attachment for bonnet removal according to claim 6, wherein the pressing means is configured with: a first pressing jig that is provided for the first attachment so as to allow an operation to press and fix the pressing member to the first attachment's side; and a second pressing jig that is provided for the second attachment so as to allow an operation to press and fix the pressing member to the first attachment's side from an outside.

9. The attachment for bonnet removal according to claim 8, wherein the second pressing jig is configured with: a plurality of bolts provided for the first attachment; bolt insertion holes formed in a plurality of positions on the pressing member that correspond to the bolts; and nuts that are screwed onto the bolts that are inserted into the bolt insertion holes the bolts are configured to also serve as attaching bolts that fix a second pressing member by pulling the second pressing member toward the first attachment's side, the second pressing member being provided for an attachment jig for attaching the short pipe to the elevation transport means, and tip portions of the bolts are configured as tapered insertion guide portions that are inserted, into, and guide, bolt insertion holes that are formed in the second pressing member.

10. The attachment for bonnet removal according to claim 6, wherein an engaging portion and an engaged portion are formed on opposing parts of the pressing member or a second pressing member and of an inner circumferential surface of the second attachment, the second pressing member being provided for an attachment jig for attaching the short pipe to the elevation transport means, and the engaging portion and the engaged portion engaging with each other in a vertical direction only when the pressing member or the second pressing member, which is moved up/down by the elevation transport means, is in a set orientation, and moving and guiding the pressing member or the second pressing member along an inside of the second attachment such that the pressing member or the second pressing member is not relatively rotatable.

11. A gate valve bonnet removal method for removing a bonnet provided with a disc and a stem from a valve body of gate valve without stopping a flow of water, the gate valve being provided with: the valve body that is connected to a fluid piping system; the bonnet that is fitted and coupled to the valve body; the disc that is detachably attached to the gate valve from a disc attaching port of the valve body via the stem provided to penetrate the bonnet; and a lock means that has a lock member that can be externally inserted into and removed from a coupling outer fitting portion on the valve body's side and a coupling inner fitting portion on the bonnet's side, which constitute a fitting connection part of the valve body and the bonnet, and that, in an engaged state where the lock member is inserted, couples and fixes the valve body and the bonnet to each other in a watertight state, the gate valve bonnet removal method comprising:

a step of attaching a ring-shaped attachment base material to the valve body in a watertight state such that an operation to insert/remove the lock member is allowed;
 a step of maintaining the coupling inner fitting portion of the bonnet and the coupling outer fitting portion of the valve body in a watertight state by pushing the bonnet to the valve body using a pressing provided for the attachment base material;
 a step of pulling out the lock member of the lock means and releasing the coupling and fixing of the coupling outer fitting portion of the valve body and the coupling inner fitting portion of the bonnet;
 a step of attaching a work housing to the attachment base material in a watertight stag, the work housing being provided with a work open/close valve and an elevation transport means that is to be coupled to the bonnet;
 a step of releasing the pressing and fixing by the pressing means, taking out the bonnet to an inside of a storage space of the work housing by using the elevation transport means, and thereafter performing an operation to close the work open/close valve; and
 a step of removing the bonnet taken out to the inside of the storage space of the work housing.

12. The gate valve bonnet removal method according to claim 11, wherein the pressing means is configured to press the bonnet against the valve body via a pressing member that is detachably attached to the bonnet.

13. The gate valve bonnet removal method according to claim 11, wherein the attachment base material is fixed to a locking stepped portion that is formed on a part of the valve body that is located lower than an insertion/removal operation position for the lock member.

14. The gate valve bonnet removal method according to claim 13, wherein the attachment base material clamps and is fixed to a protruding portion that serves as the locking stepped portion that is formed to protrude on a part of the valve body that is located lower than the insertion/removal operation position for the lock member.

15. The gate vale bonnet removal method according to claim 11, wherein the attachment base material is configured with: an attachment base portion that is to be attached to a part of the valve body that is located lower than an insertion/removal operation position for the lock member, in a watertight state; and a ring-shaped attachment frame that is to be attached to the attachment base portion in a watertight state and that surrounds at least part of the bonnet, and the step of pushing using the pressing means includes: a step of, before attaching the ring-shaped attachment frame, pressing and fixing the bonnet to the valve body's side using a first pressing jig provided in an area of the attachment base portion that corresponds to an inner space of the ring-shaped attachment frame; and a step of, after attaching the rind-shaped attachment frame, pressing and fixing the bonnet to the valve body's side using a second pressing jig that is provided for the ring-shaped attachment frame and that can be operated from an outside.

16. The gate valve bonnet removal method according to claim 11, further comprising:

a step of coupling another bonnet to the elevation transport means provided for the work housing, the other bonnet being provided with at least new disc;
 a step of performing an operation to open the work open/close valve, lowering the other bonnet located within the storage space of the work housing to the valve body's side using the elevation transport means, and fitting and connecting the coupling inner fitting portion of the other bonnet to the coupling outer fitting portion of the valve body; and
 a step of coupling and fixing the coupling inner fitting portion of the other bonnet and the coupling outer fitting portion of the valve body, which have been fitted and connected to each other, to each other using the lock member of the lock means,
 which are performed after the step of removing the bonnet.

17. The gate valve bonnet removal method according to claim 11, further comprising:
- a step of coupling a covering body to the elevation transport means provided for the work housing, the covering body closing the disc attaching port of the valve body in a watertight state;
- a step of performing an operation to open the work open/close valve, lowering the covering body located within the storage space of the work housing to the valve body's side using the elevation transport means, and fitting and connecting, a coupling inner fitting portion of the covering body to the coupling outer filling portion of the valve body; and
- a step of coupling and fixing the coupling inner fitting portion of the covering body and the coupling outer fitting portion of the valve body, which have been fitted and connected to each other, to each other using the lock member of the lock means, which are performed after e step of removing the bonnet.

18. The gate valve bonnet removal method according to claim 11, further comprising:
- a step of coupling a combined part to the elevation transport means provided for the work housing, the combined part including a repair valve and a valve attaching member that is provided with a coupling inner fitting portion that can be fitted and connected to the coupling outer fitting portion of the valve body;
- a step of performing an operation to open the work open/close valve, lowering the combined part located within the storage space of the work housing to the valve body's side using the elevation transport means, and fitting and connecting the coupling inner fitting portion of the valve attaching member to the coupling outer fitting portion of the valve body; and
- a step of coupling and fixing the coupling inner fitting portion of the valve at g member and the coupling outer fitting portion of the valve body, which have been fitted and connected to each other, to each other using the lock member of the lock means, which are performed er the step of removing the bonnet.

19. A gate valve comprising: a valve body that is connected to a fluid piping system; a bonnet that is fitted and coupled to the valve body; and a disc that is detachably attached to the gate valve from a disc attaching port of the valve body via a stem that is provided to penetrate the bonnet, wherein
- a fitting coupling portion of the valve body and the bonnet is provided with, a lock means that has a lock member that can be externally inserted into and removed from a coupling outer fitting portion on the valve body's side and a coupling inner fitting portion on the bonnet's side, which constitute the fitting coupling portion, and that, in an engaged state where the lock member is inserted, couples and fixes the valve body and the bonnet to each other in a watertight state, and a locking stepped portion to which a ring-shaped attachment base material can be attached is formed integrally with a part of the valve body, the part being displaced downward from an insertion/re oval operation position for the lock member.

20. The gate valve according to claim 19, wherein the locking stepped portion is a protruding portion that is formed integrally with a part of an outer surface of the valve body so as, to protrude therefrom, the part being displaced downward from the insertion/removal operation position for the lock member.

* * * * *